April 27, 1965 J. S. MORREL ETAL 3,181,144
COLLISION AVOIDANCE SYSTEM
Filed Nov. 18, 1960 55 Sheets-Sheet 1
FIG. A.
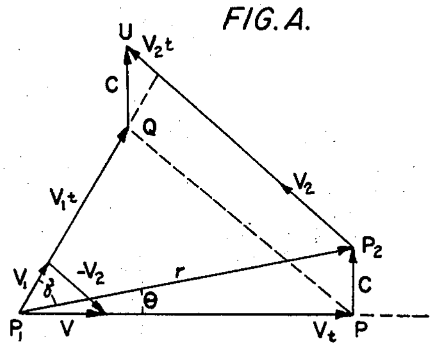
FIG. B.
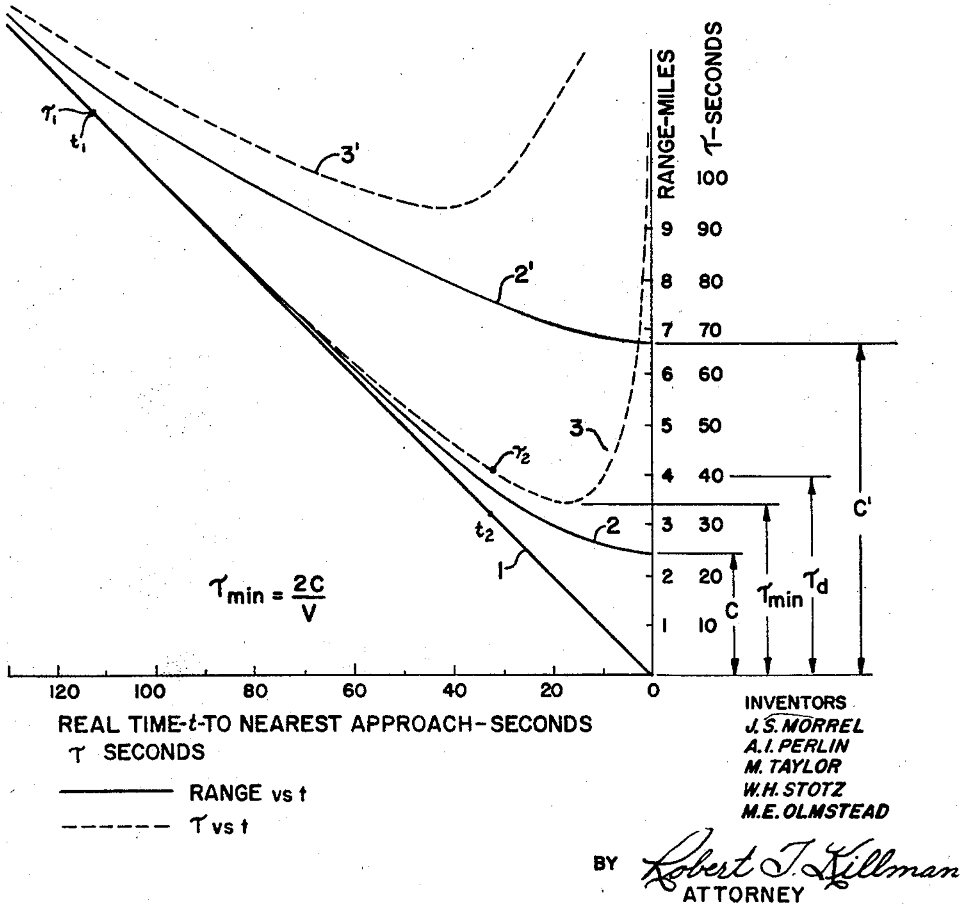
INVENTORS
J. S. MORREL
A. I. PERLIN
M. TAYLOR
W. H. STOTZ
M. E. OLMSTEAD
BY Robert T. Killman
ATTORNEY FIG. C.
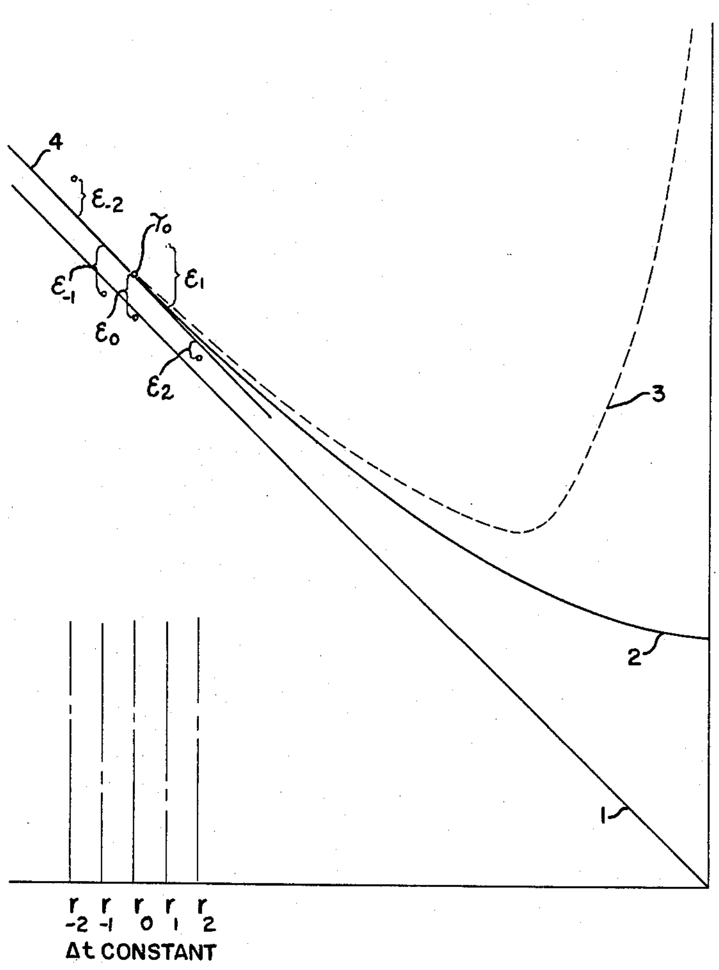
INVENTOR.
JOHN S. MORREL ET AL.
BY
Robert T. Gillman
ATTORNEY

COLLISION AVOIDANCE SYSTEM

Filed Nov. 18, 1960 55 Sheets-Sheet 3

INVENTOR.
JOHN S. MORREL ET AL.
BY Robert T. Gillman
ATTORNEY

FIG. 1A.

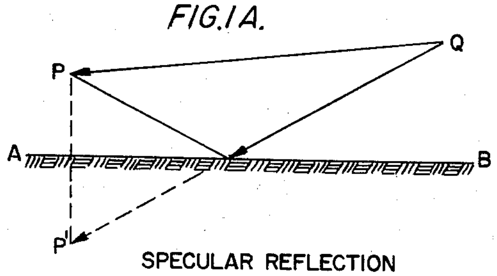

SPECULAR REFLECTION
THERE IS ONLY ONE

FIG. 1B.

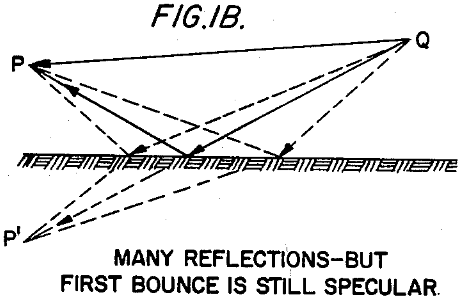

MANY REFLECTIONS–BUT
FIRST BOUNCE IS STILL SPECULAR.

FIG. 1C.

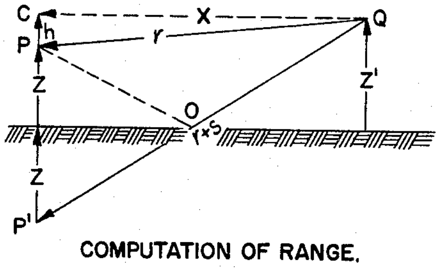

COMPUTATION OF RANGE.

FIG. 1D.

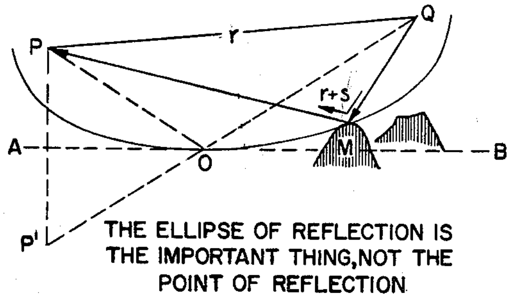

THE ELLIPSE OF REFLECTION IS
THE IMPORTANT THING, NOT THE
POINT OF REFLECTION.

FIG. 1E.

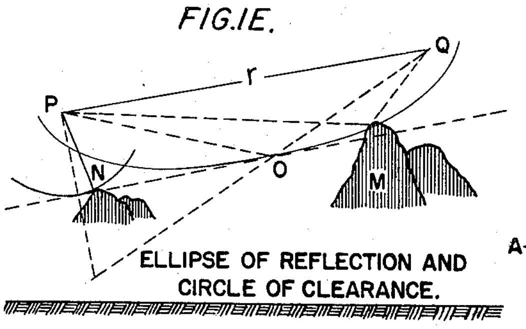

ELLIPSE OF REFLECTION AND
CIRCLE OF CLEARANCE.

FIG. 1F.

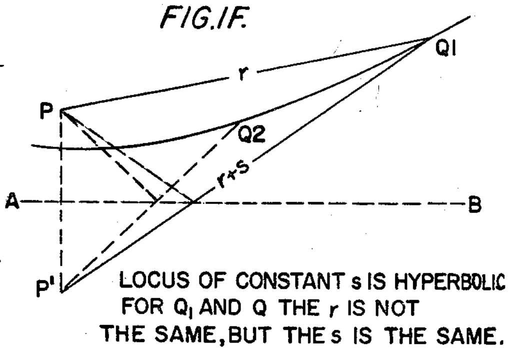

LOCUS OF CONSTANT s IS HYPERBOLIC
FOR $Q_1$ AND Q THE r IS NOT
THE SAME, BUT THE s IS THE SAME.

FIG. 1G.

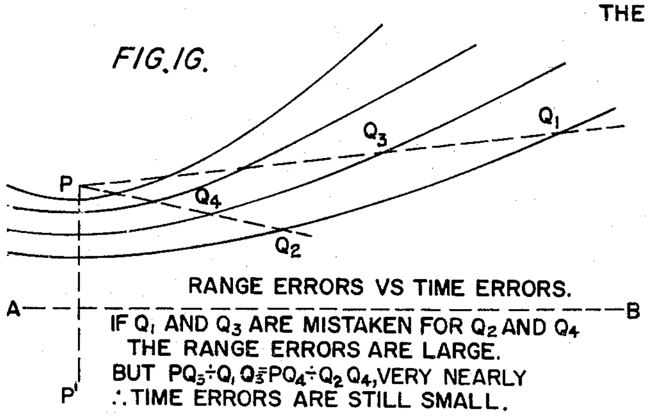

RANGE ERRORS VS TIME ERRORS.
IF $Q_1$ AND $Q_3$ ARE MISTAKEN FOR $Q_2$ AND $Q_4$
THE RANGE ERRORS ARE LARGE.
BUT $PQ_3 \div Q_1Q_3 = PQ_4 \div Q_2Q_4$, VERY NEARLY
$\therefore$ TIME ERRORS ARE STILL SMALL.

INVENTOR.
JOHN S. MORREL ET AL.
BY
Robert T. Gillman
ATTORNEY

INVENTOR.
JOHN S. MORREL ET AL.
BY
Robert T. Zillman
ATTORNEY

COLLISION AVOIDANCE SYSTEM

Filed Nov. 18, 1960

55 Sheets-Sheet 6

INVENTOR.
JOHN S. MORREL ET AL.
BY Robert T. Tillman
ATTORNEY

INVENTOR.
JOHN S. MORREL ET AL.
BY Robert T. Killman
ATTORNEY

INVENTOR.
JOHN S. MORREL ET AL.
BY Robert T. Tillman
ATTORNEY

INVENTOR.
JOHN S. MORREL ET AL.
BY Robert T. Hillman
ATTORNEY

INVENTOR.
JOHN S. MORREL ET AL.
BY Robert T. Killman
ATTORNEY

INVENTOR.
JOHN S. MORREL ET AL.
BY Robert T. Tillman
ATTORNEY

April 27, 1965 J. S. MORREL ETAL 3,181,144
COLLISION AVOIDANCE SYSTEM
Filed Nov. 18, 1960 55 Sheets-Sheet 12

INVENTOR.
JOHN S. MORREL ET AL.
BY Robert T. Killman
ATTORNEY

INVENTOR
JOHN S. MORREL ET AL.

BY Robert T. Fillman
ATTORNEY

April 27, 1965 J. S. MORREL ETAL 3,181,144
COLLISION AVOIDANCE SYSTEM
Filed Nov. 18, 1960 55 Sheets-Sheet 15
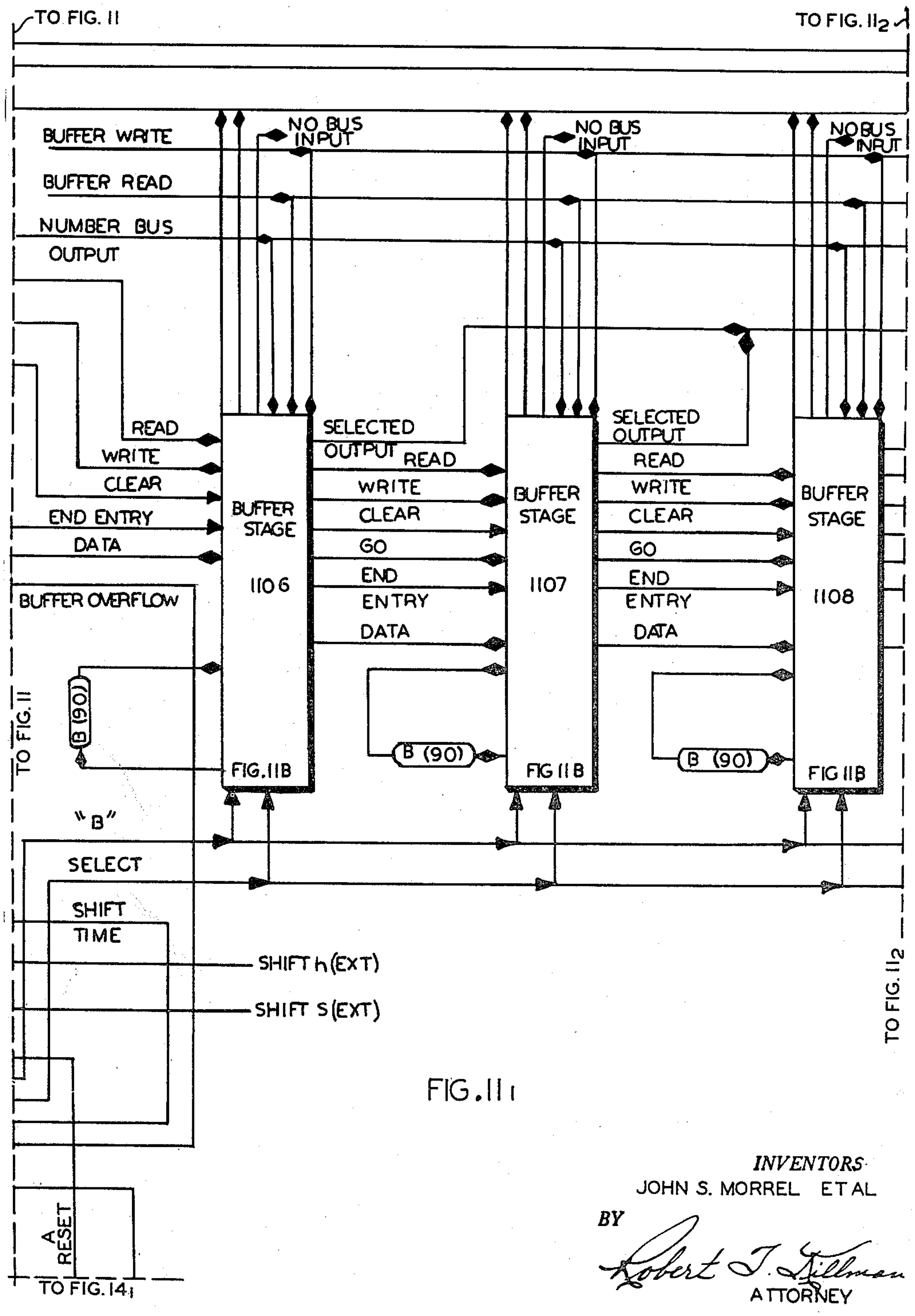
FIG. $11_1$
INVENTORS
JOHN S. MORREL ET AL
BY Robert T. Dillman
ATTORNEY

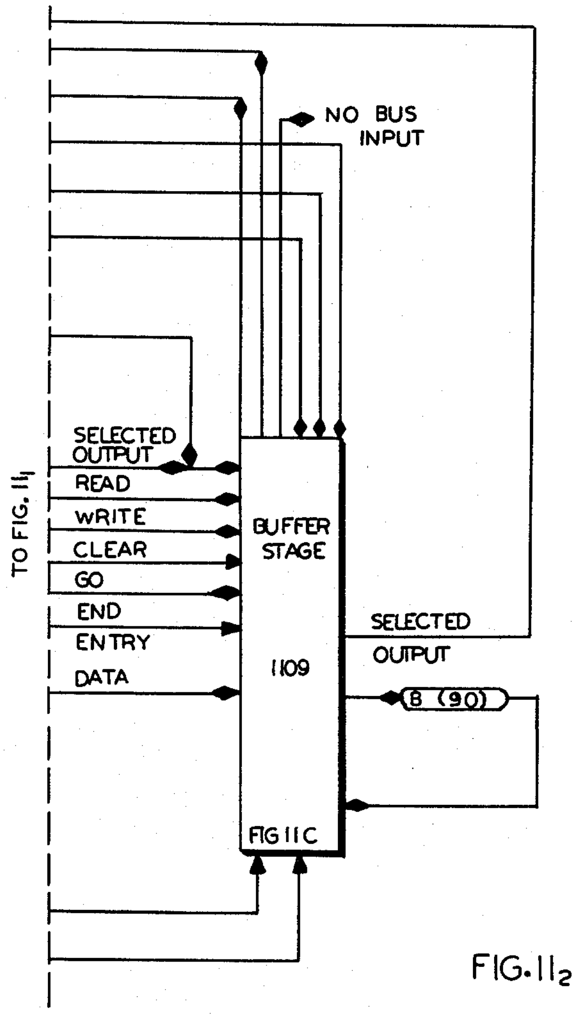
FIG. $11_2$
INVENTORS
JOHN S. MORREL ET AL
BY Robert T. Gillman
ATTORNEY

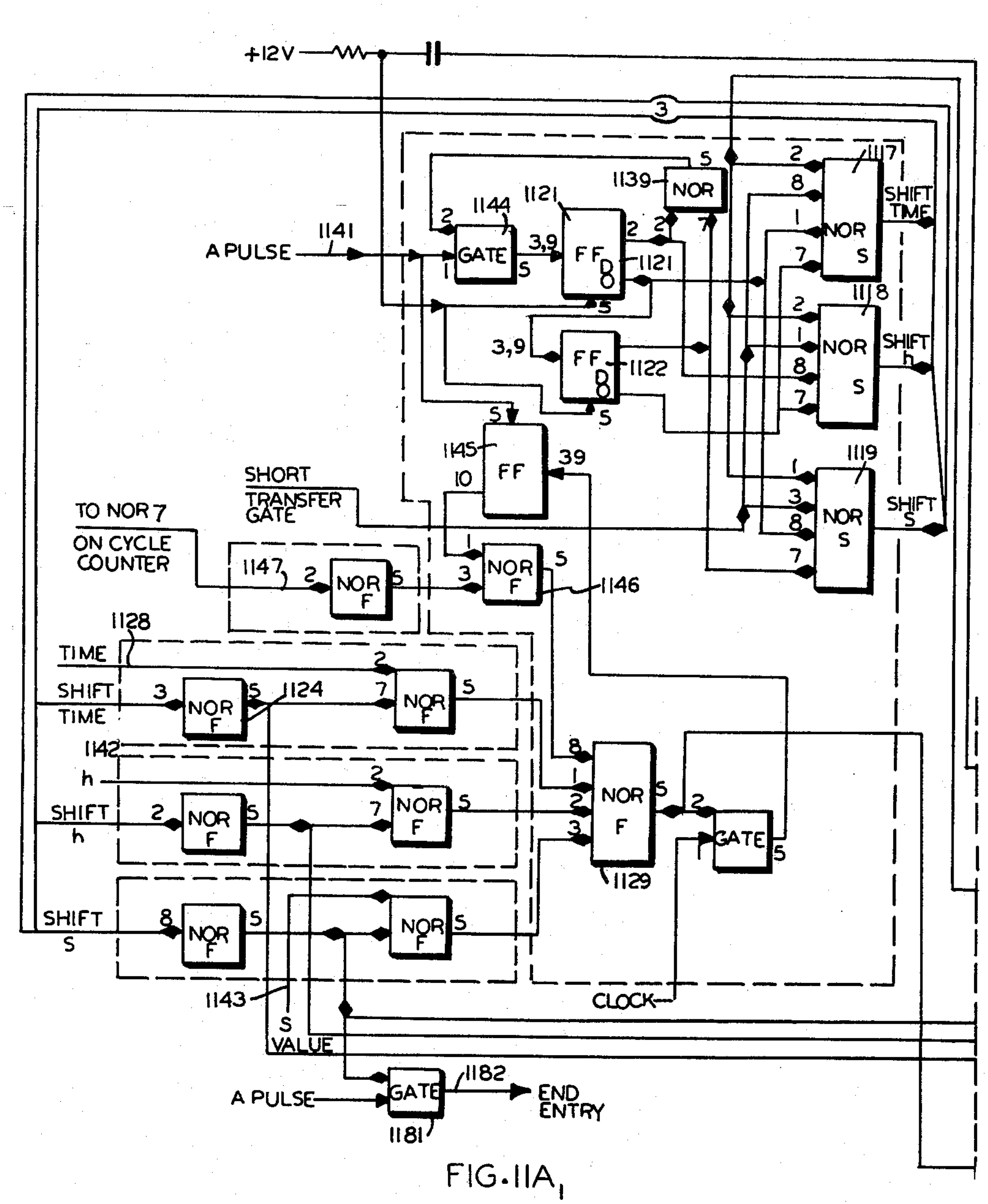
FIG. 11A1
INVENTORS
JOHN S. MORREL ET AL
BY Robert T. Tillman
ATTORNEY April 27, 1965 J. S. MORREL ET AL 3,181,144
COLLISION AVOIDANCE SYSTEM
Filed Nov. 18, 1960 55 Sheets-Sheet 18
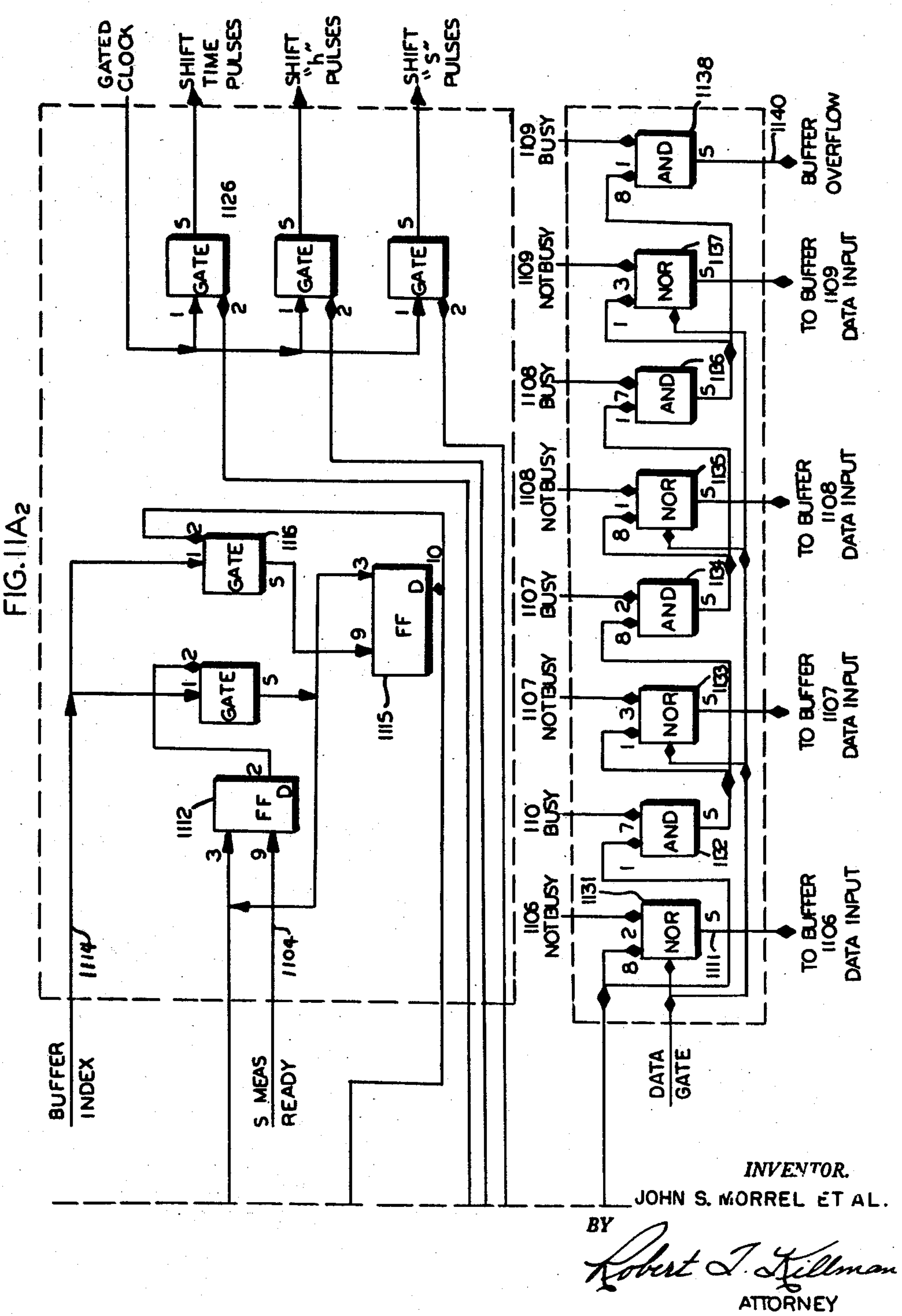
FIG. 11A2
INVENTOR.
JOHN S. MORREL ET AL.
BY
ATTORNEY

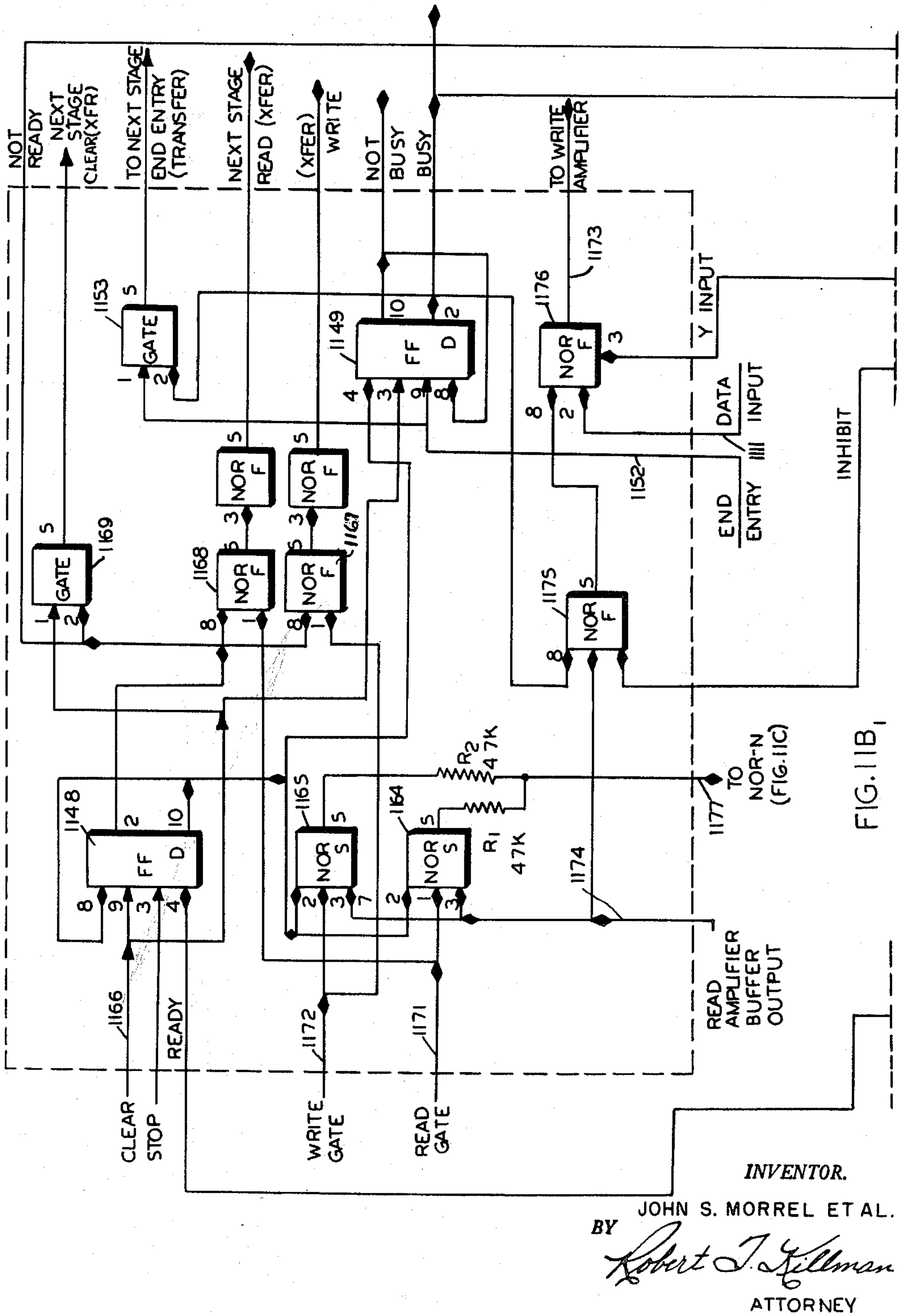
FIG. 11B1
INVENTOR.
JOHN S. MORREL ET AL.
BY Robert T. Killman
ATTORNEY April 27, 1965 J. S. MORREL ET AL 3,181,144
COLLISION AVOIDANCE SYSTEM
Filed Nov. 18, 1960 55 Sheets-Sheet 20
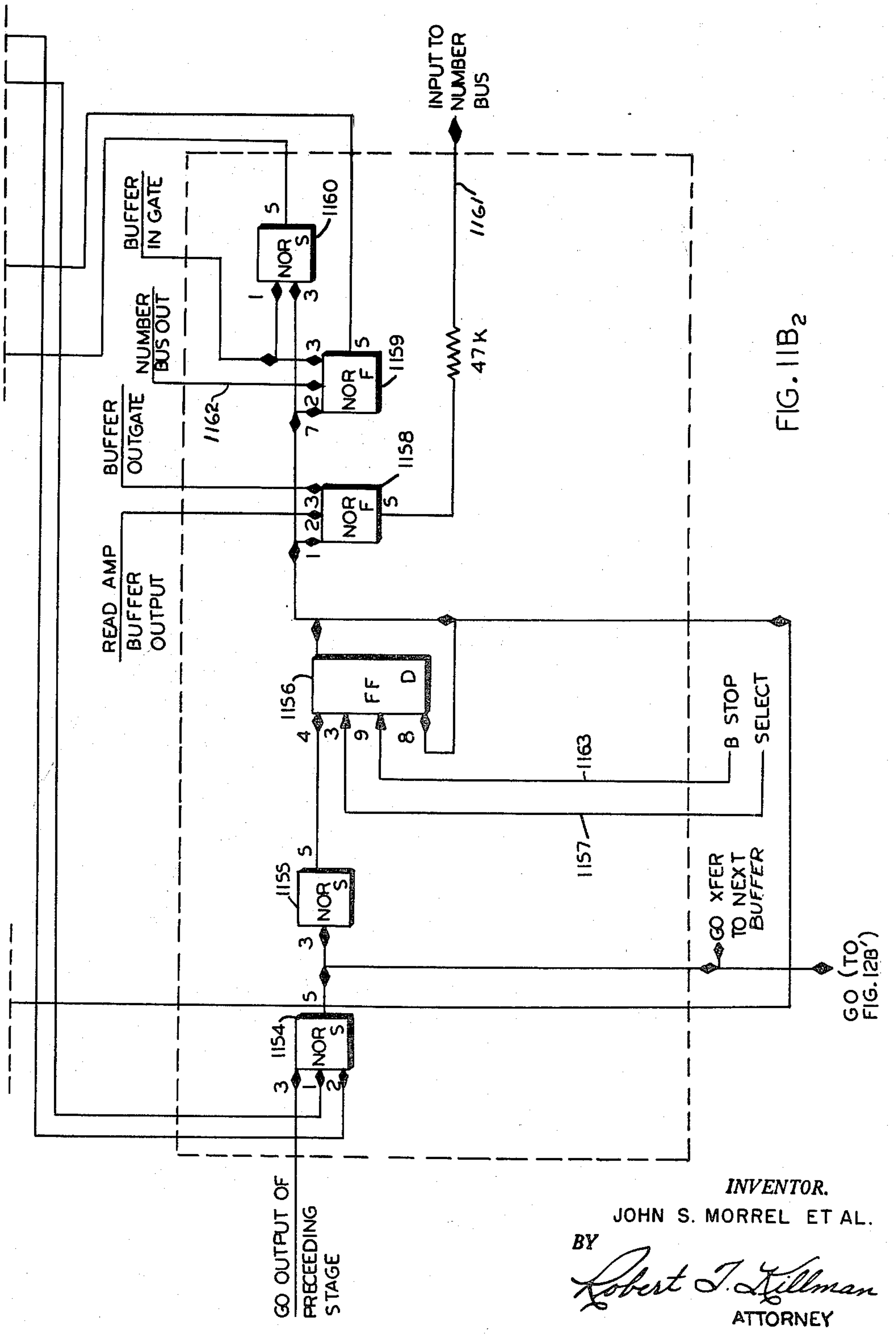
FIG. 11B2
INVENTOR.
JOHN S. MORREL ET AL.
BY Robert T. Killman
ATTORNEY

COLLISION AVOIDANCE SYSTEM

INVENTORS
JOHN S. MORREL ETAL
BY Robert T. Dillman
ATTORNEY

INVENTORS
JOHN S. MORREL ET AL
Robert T. Gillman
ATTORNEY

April 27, 1965 J. S. MORREL ET AL 3,181,144

COLLISION AVOIDANCE SYSTEM

Filed Nov. 18, 1960 55 Sheets-Sheet 23

INVENTOR.
JOHN S. MORREL ET AL.
BY Robert T. Tillman
ATTORNEY

INVENTOR.
JOHN S. MORREL ET AL.
BY Robert T. Gillman
ATTORNEY

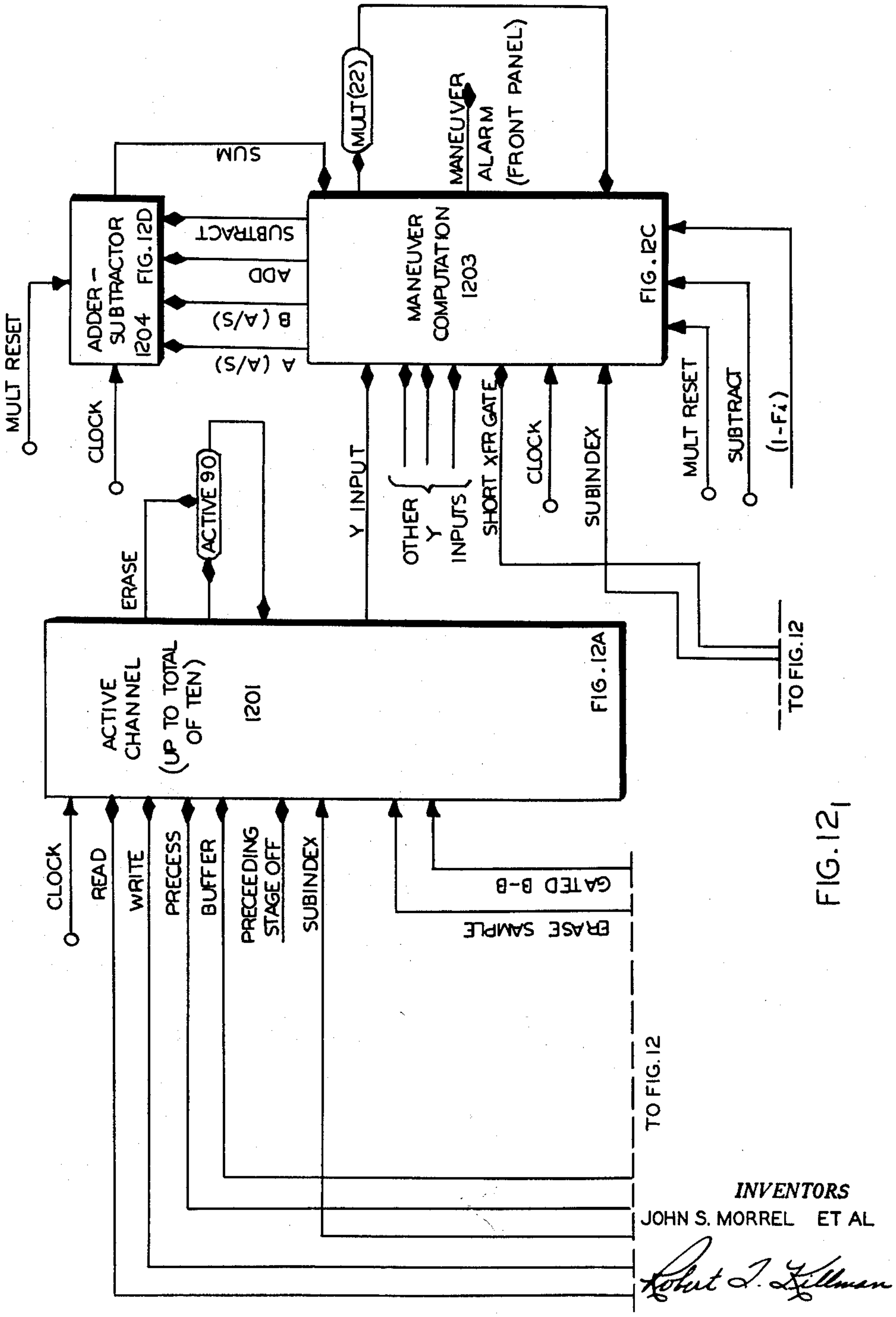
FIG. 12₁
INVENTORS
JOHN S. MORREL ET AL
BY Robert T. Killman
ATTORNEY INVENTOR.
JOHN S. MORREL ET AL.
BY Robert T. Killman
ATTORNEY

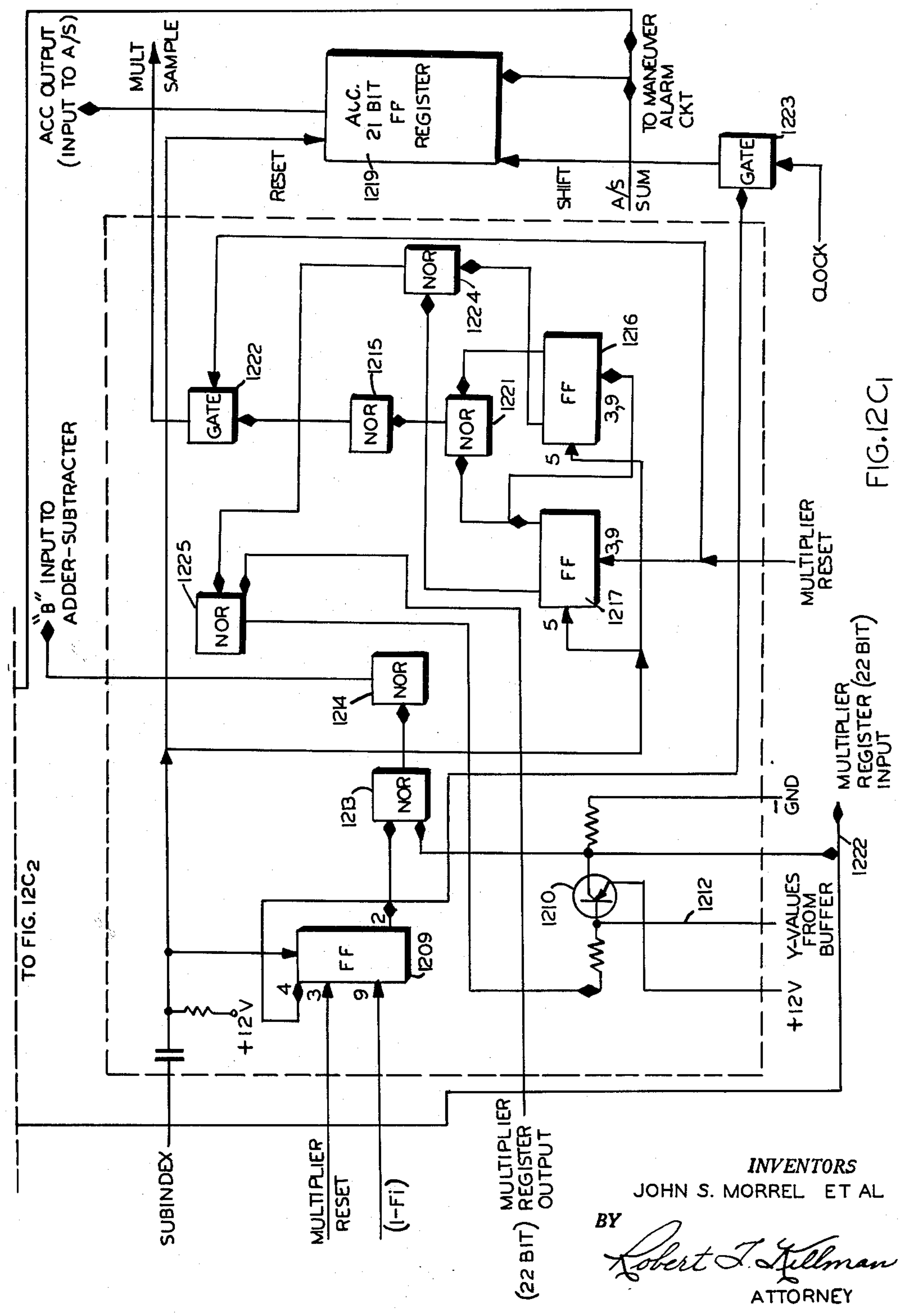
FIG. 12C1
INVENTORS
JOHN S. MORREL ET AL
BY Robert T. Kellman
ATTORNEY

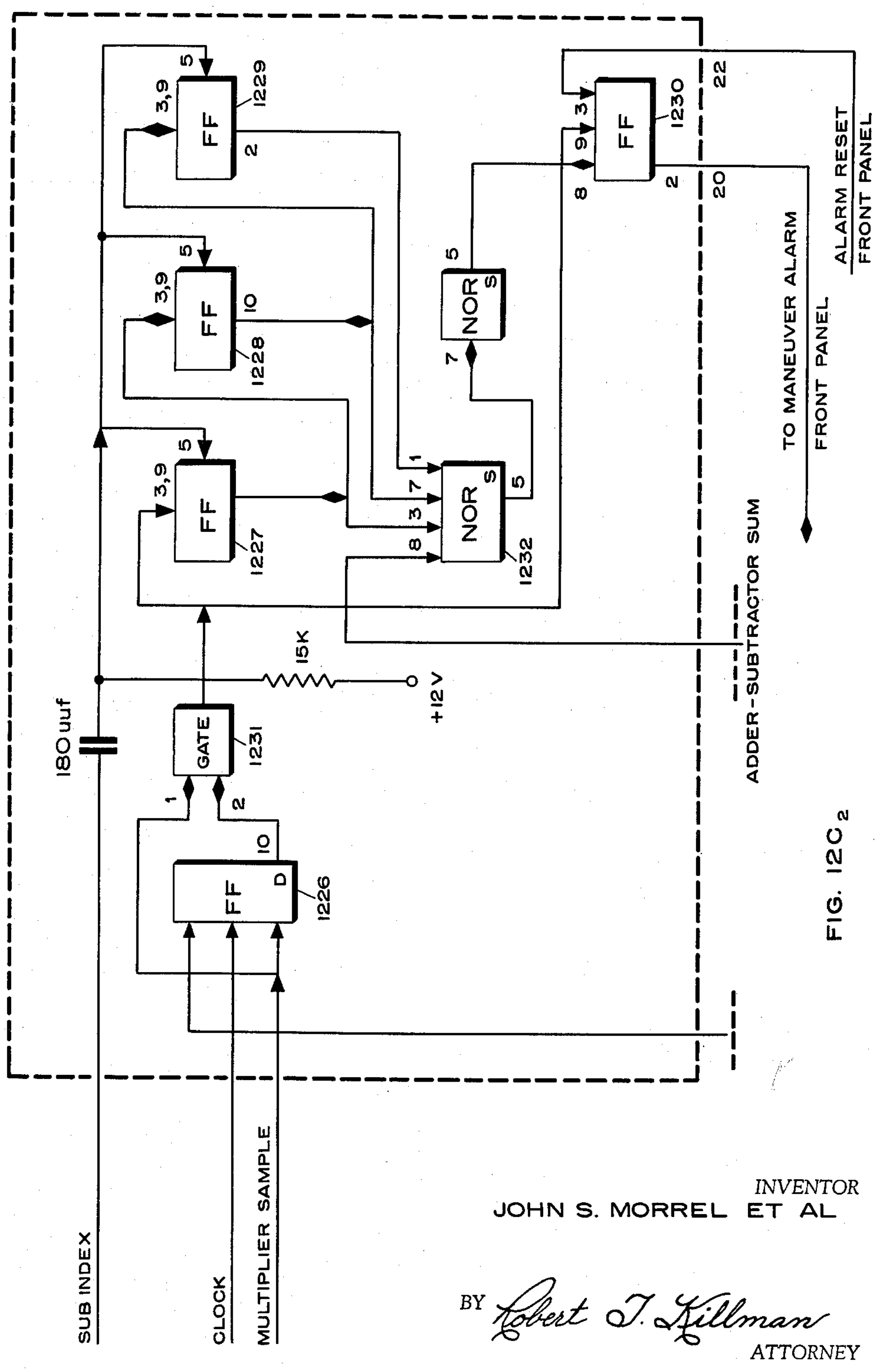
FIG. 12C2
INVENTOR
JOHN S. MORREL ET AL
BY Robert T. Killman
ATTORNEY INVENTOR
JOHN S. MORREL ET AL.
BY Robert T. Killman
ATTORNEY April 27, 1965 J. S. MORREL ETAL 3,181,144

COLLISION AVOIDANCE SYSTEM

Filed Nov. 18, 1960 55 Sheets-Sheet 30

INVENTORS
JOHN S. MORREL ET AL
BY Robert T. Tillman
ATTORNEY

COLLISION AVOIDANCE SYSTEM

Filed Nov. 18, 1960 55 Sheets-Sheet 31

*INVENTOR.*
JOHN S. MORREL ET AL.
*BY* Robert T. Gillman
ATTORNEY

April 27, 1965 J. S. MORREL ET AL 3,181,144

COLLISION AVOIDANCE SYSTEM

Filed Nov. 18, 1960 55 Sheets-Sheet 32

*INVENTOR.*
JOHN S. MORREL ET AL.
*BY* Robert T. Tillman
ATTORNEY

INVENTOR.
JOHN S. MORREL ET AL.
BY Robert T. Killman
ATTORNEY

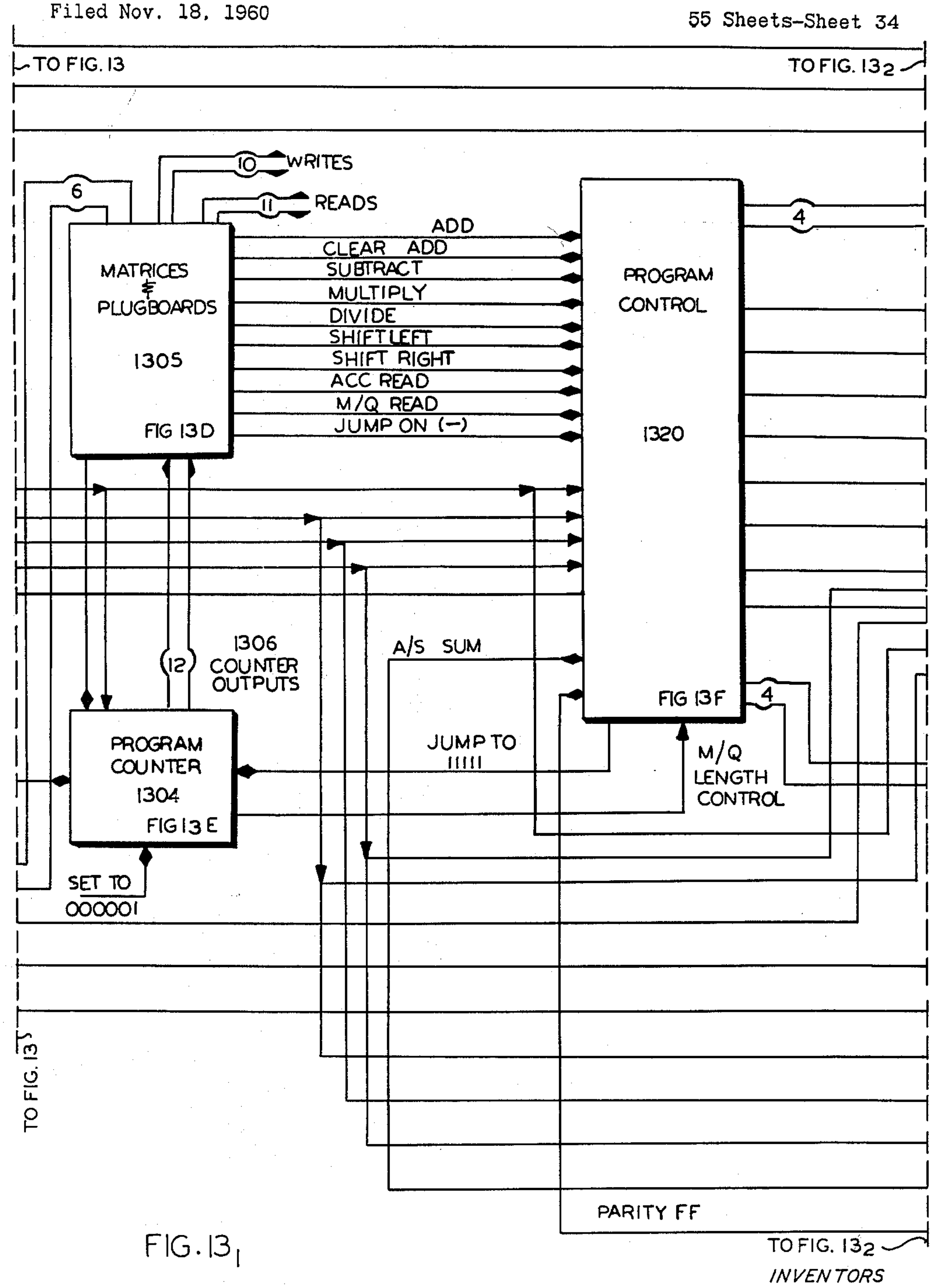
FIG. $13_1$
INVENTORS
JOHN S. MORREL ET AL
BY Robert T. Gillman
ATTORNEY

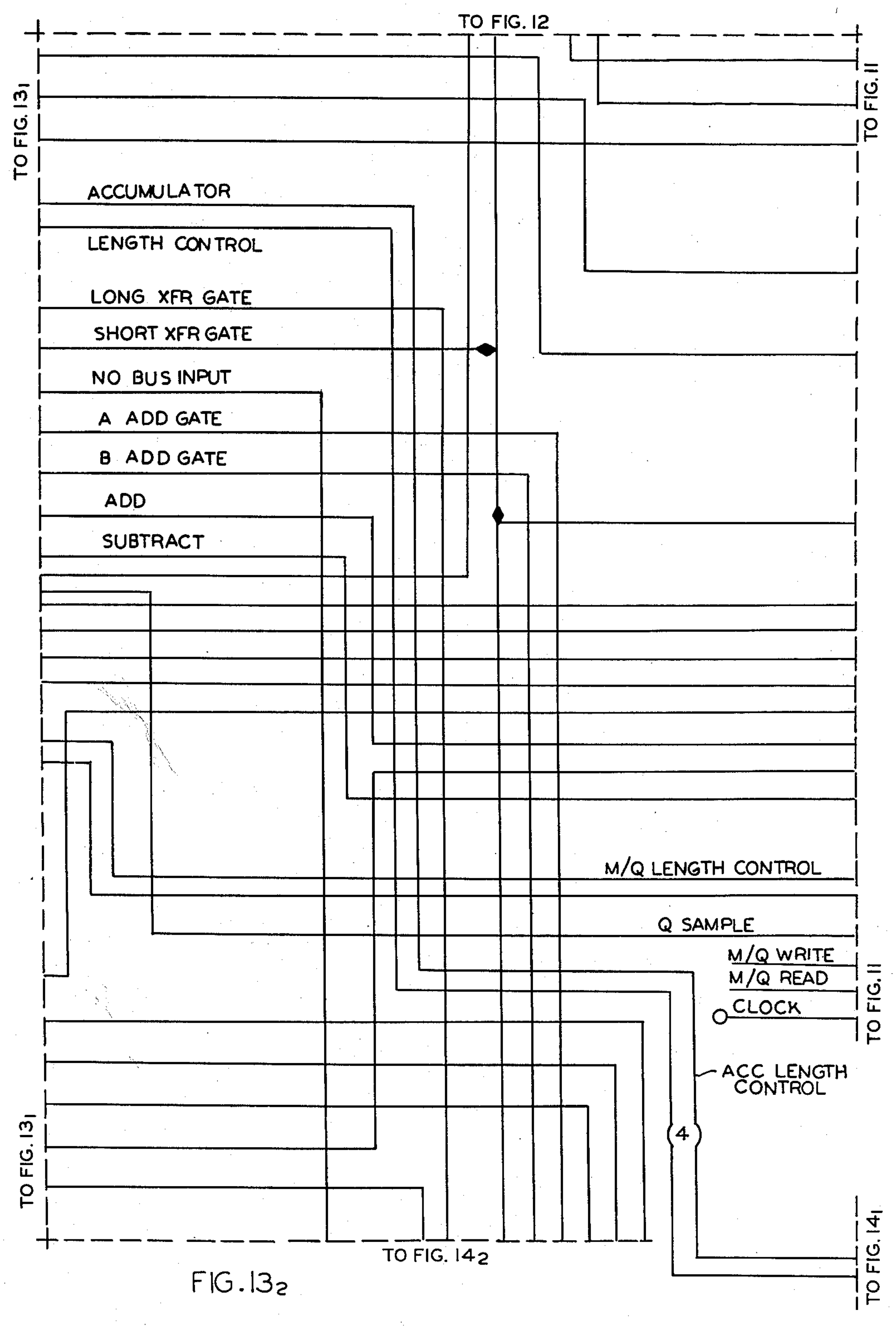
FIG. 13₂

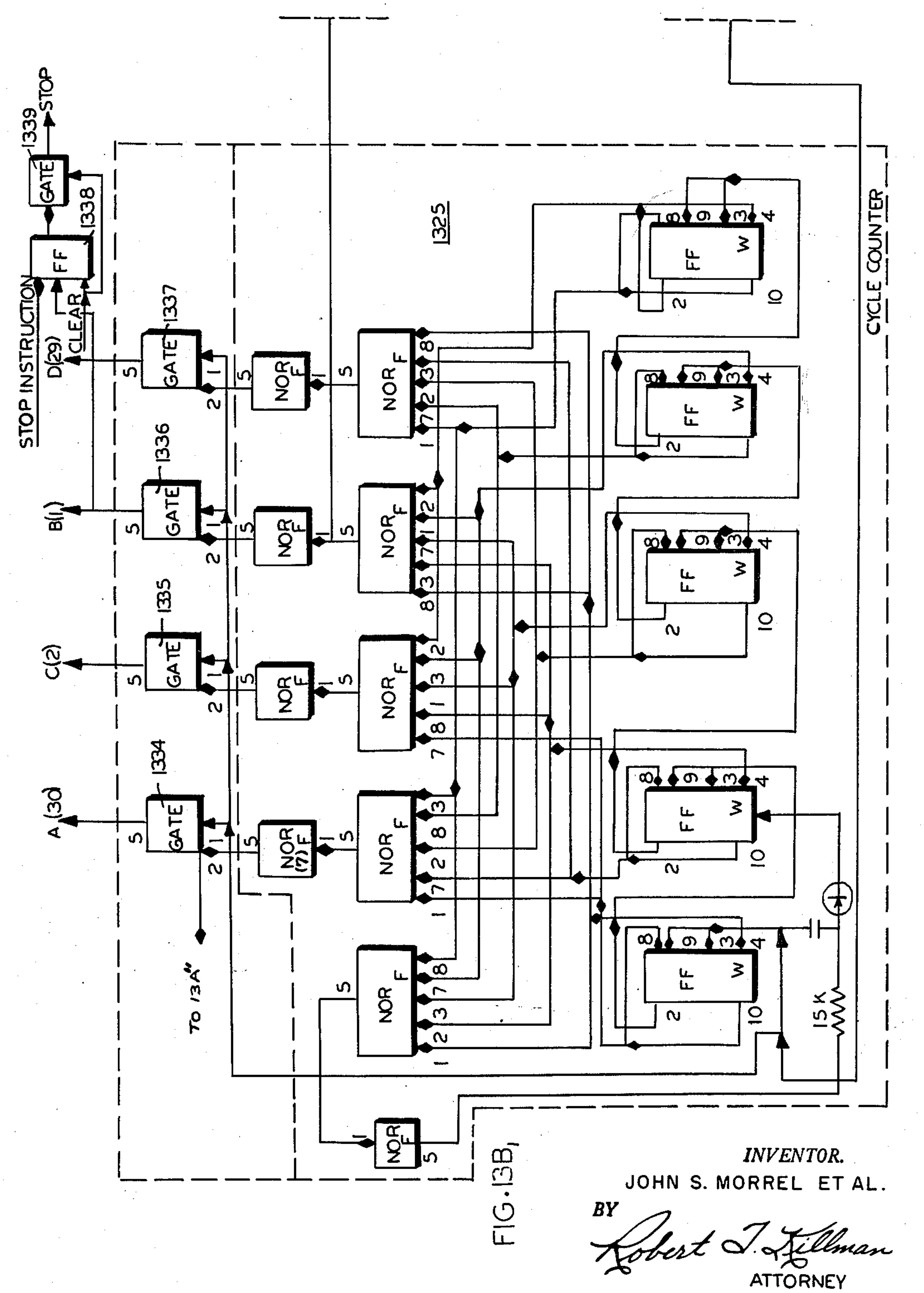
FIG. 13B1
INVENTOR.
JOHN S. MORREL ET AL.
BY Robert T. Tillman
ATTORNEY April 27, 1965 J. S. MORREL ET AL 3,181,144
COLLISION AVOIDANCE SYSTEM
Filed Nov. 18, 1960 55 Sheets-Sheet 37
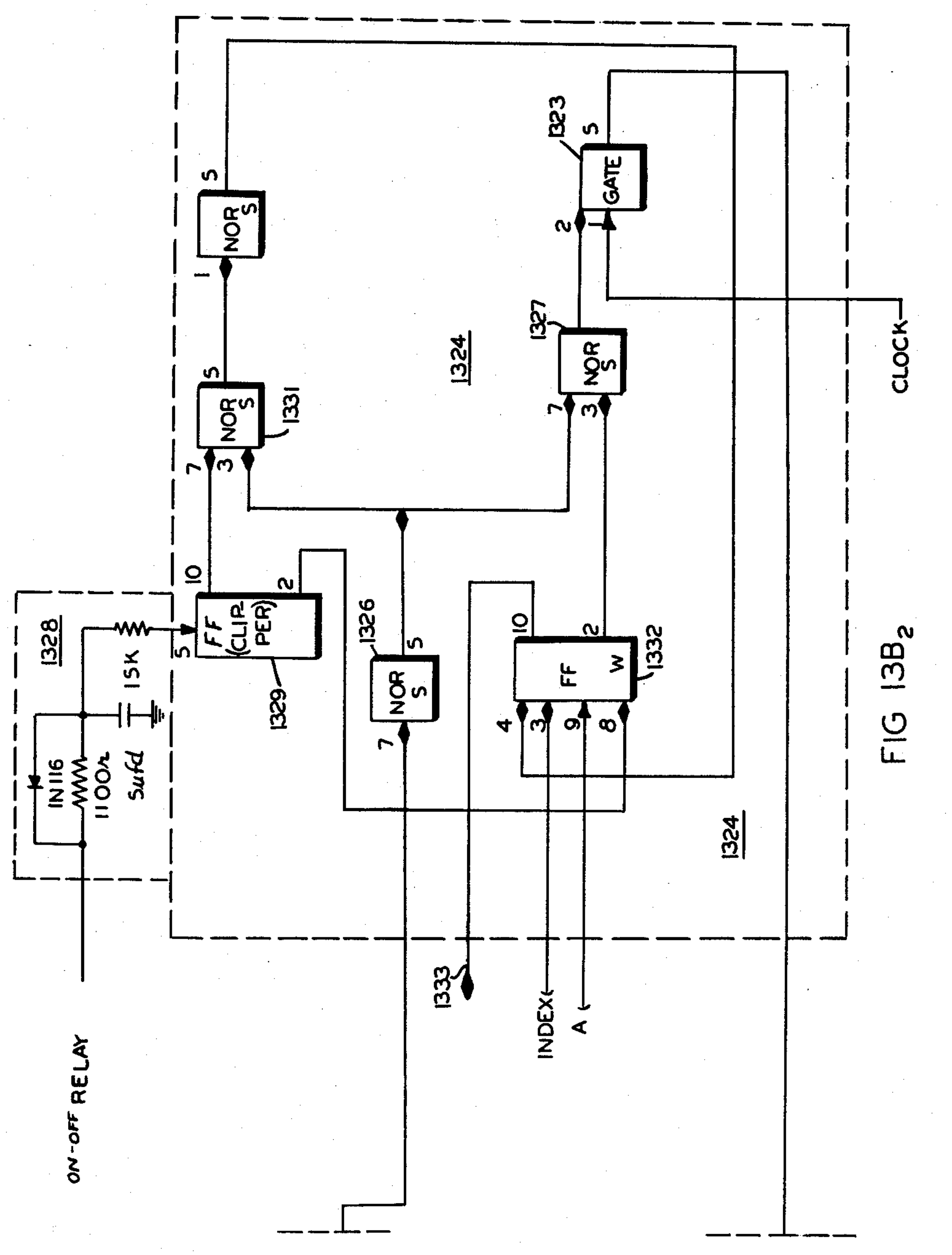
FIG 13B2
INVENTOR.
JOHN S. MORREL ET AL.
BY Robert T. Killman
ATTORNEY INVENTOR.
JOHN S. MORREL ET AL.
BY Robert T. Tillman
ATTORNEY INVENTOR.
JOHN S. MORREL ET AL.
BY Robert T. Hillman
ATTORNEY April 27, 1965 J. S. MORREL ETAL 3,181,144

COLLISION AVOIDANCE SYSTEM

Filed Nov. 18, 1960 55 Sheets-Sheet 40

INVENTOR.

JOHN S. MORREL ET AL.

BY Robert T. Tillman

ATTORNEY

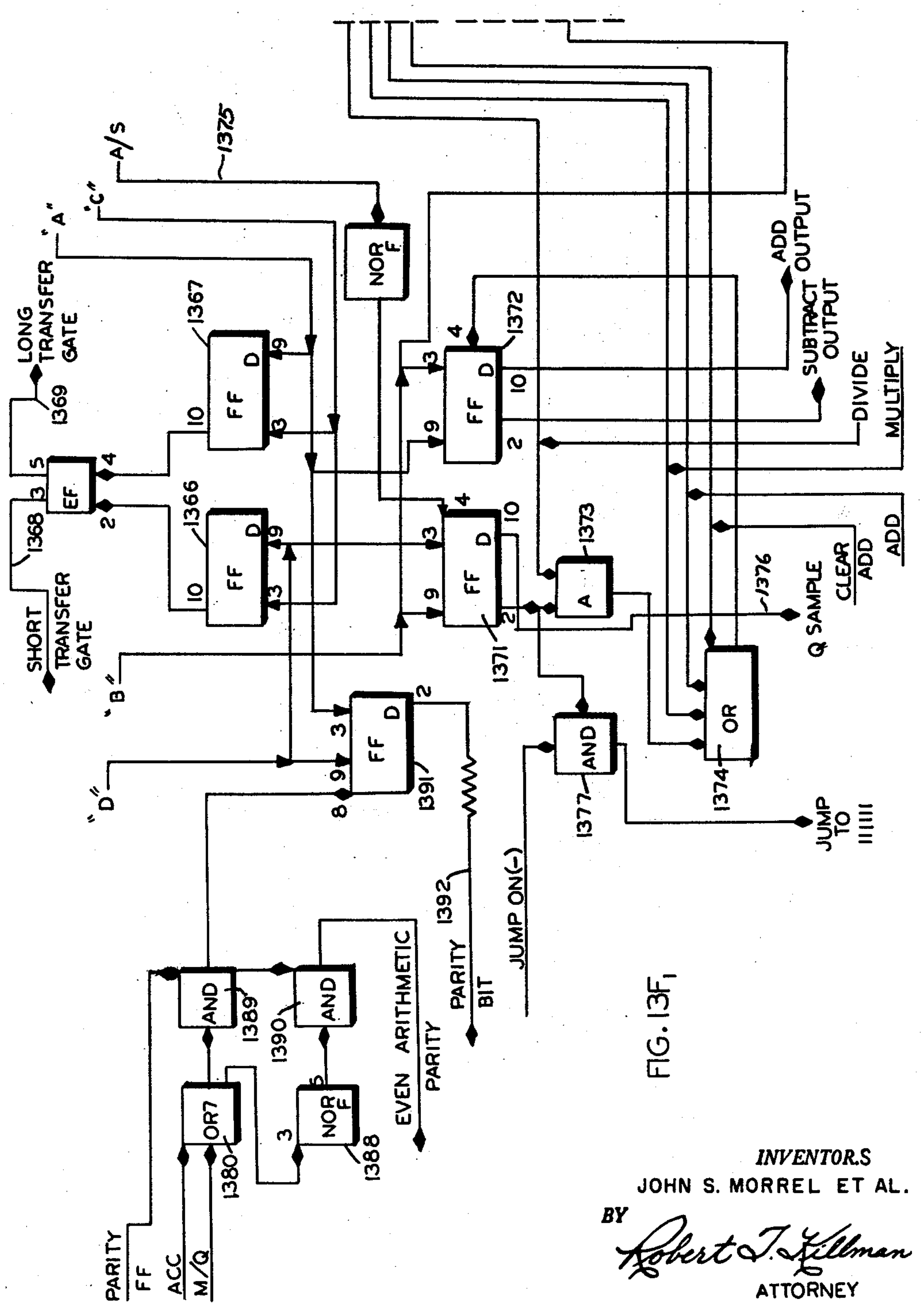
FIG. 13F1
INVENTORS
JOHN S. MORREL ET AL.
BY Robert T. Gillman
ATTORNEY April 27, 1965 J. S. MORREL ET AL 3,181,144
COLLISION AVOIDANCE SYSTEM
Filed Nov. 18, 1960 55 Sheets-Sheet 42
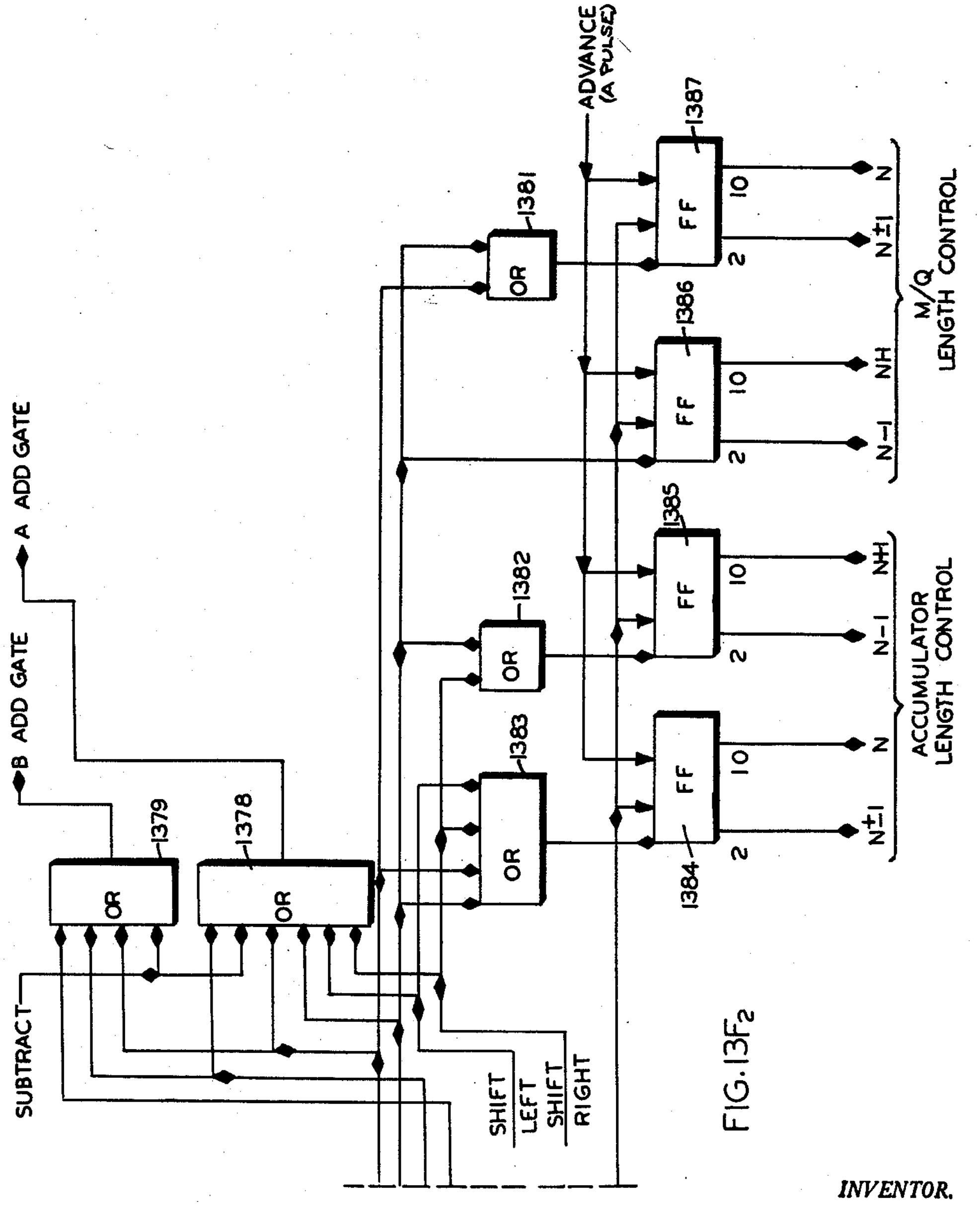
FIG. 13F2
INVENTOR.
JOHN S. MORREL ET AL.
BY Robert T. Killman
ATTORNEY April 27, 1965 J. S. MORREL ETAL 3,181,144

COLLISION AVOIDANCE SYSTEM

Filed Nov. 18, 1960 55 Sheets-Sheet 43

April 27, 1965 J. S. MORREL ETAL 3,181,144
COLLISION AVOIDANCE SYSTEM
Filed Nov. 18, 1960 55 Sheets-Sheet 44
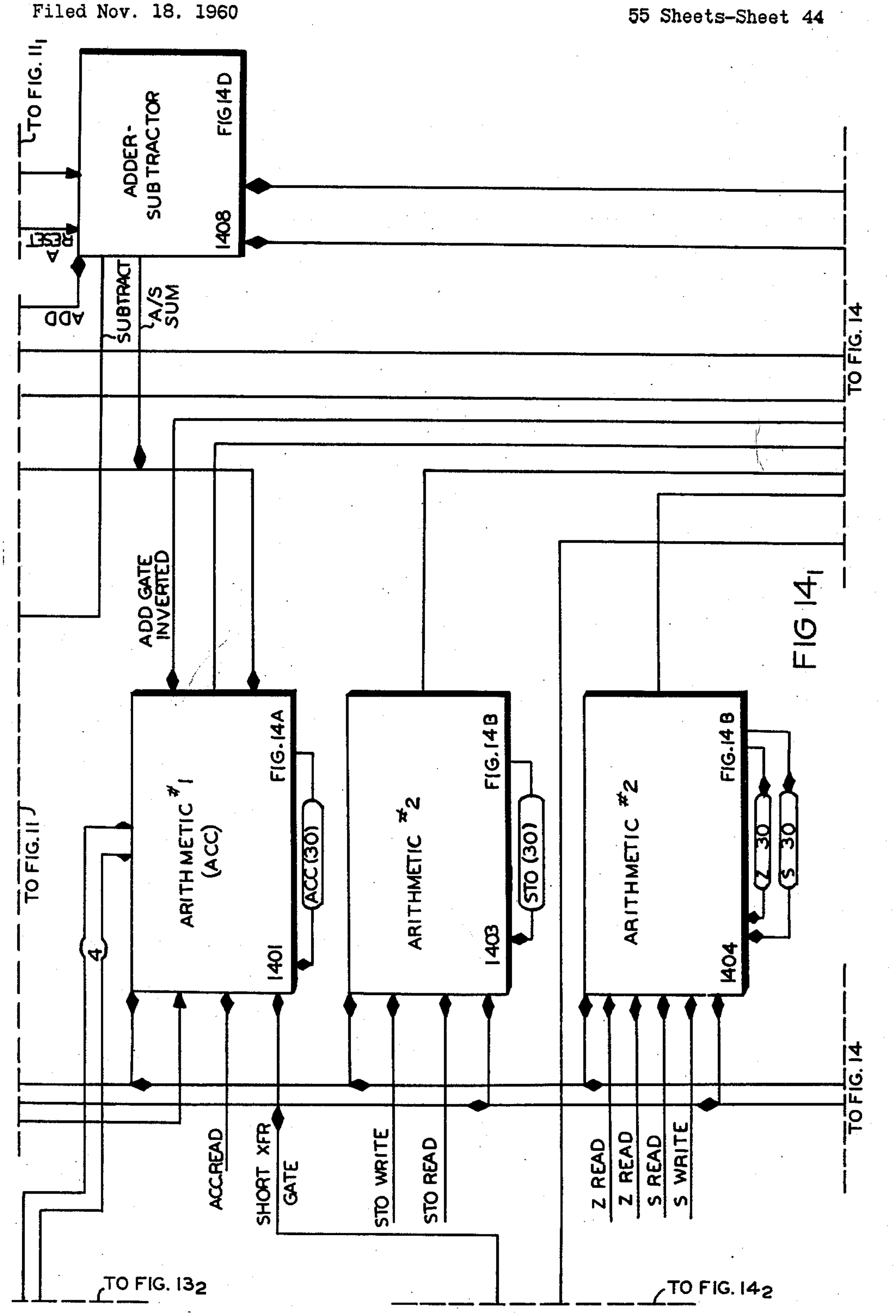
FIG 14₁

COLLISION AVOIDANCE SYSTEM
Filed Nov. 18, 1960 55 Sheets-Sheet 45
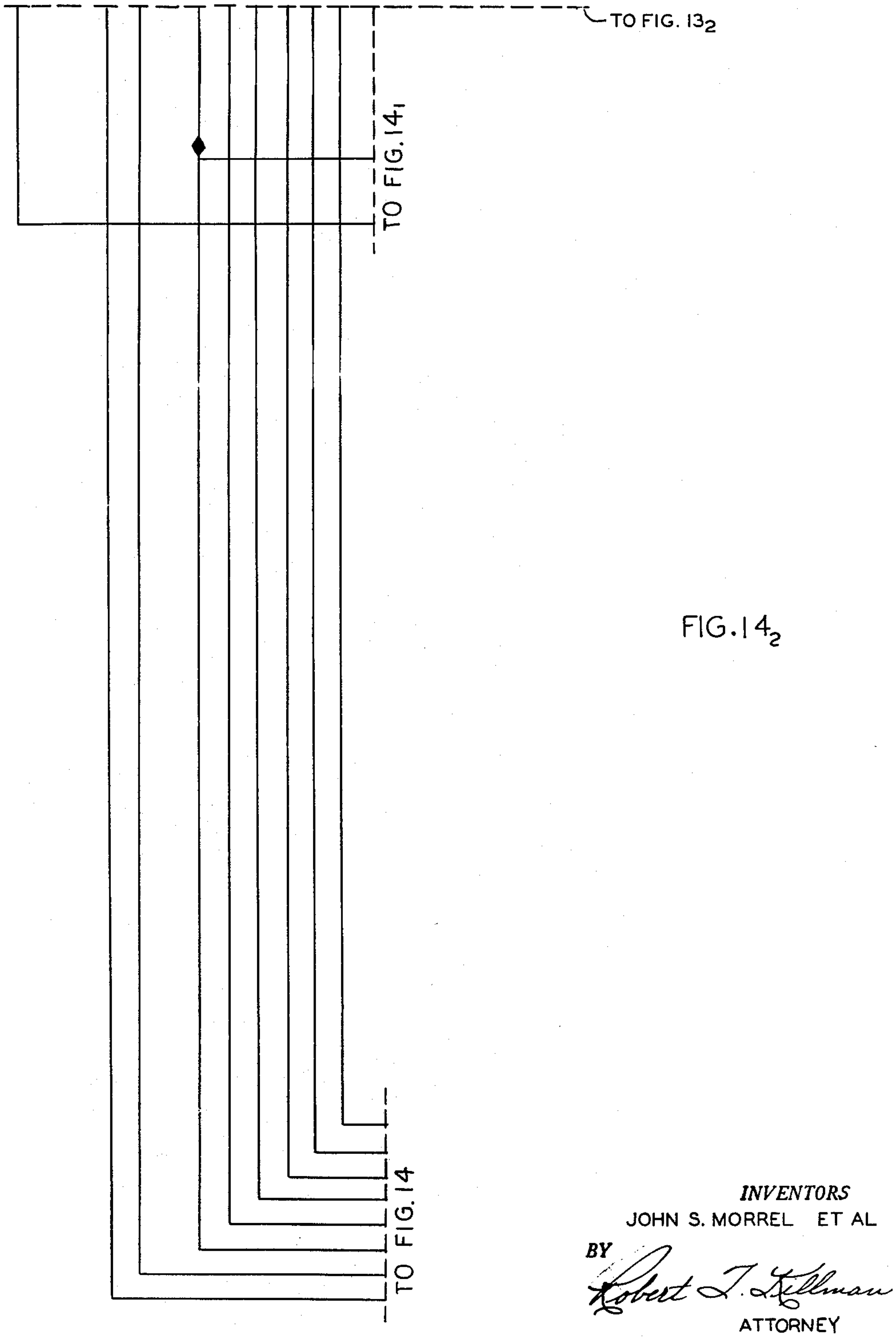
FIG. $14_2$
INVENTORS
JOHN S. MORREL ET AL
BY Robert T. Tillman
ATTORNEY INVENTOR.
JOHN S. MORREL
ET AL.
BY Robert T. Kellman
ATTORNEY INVENTOR.
JOHN S. MORREL ET AL.
BY
Robert T. Gillman
ATTORNEY

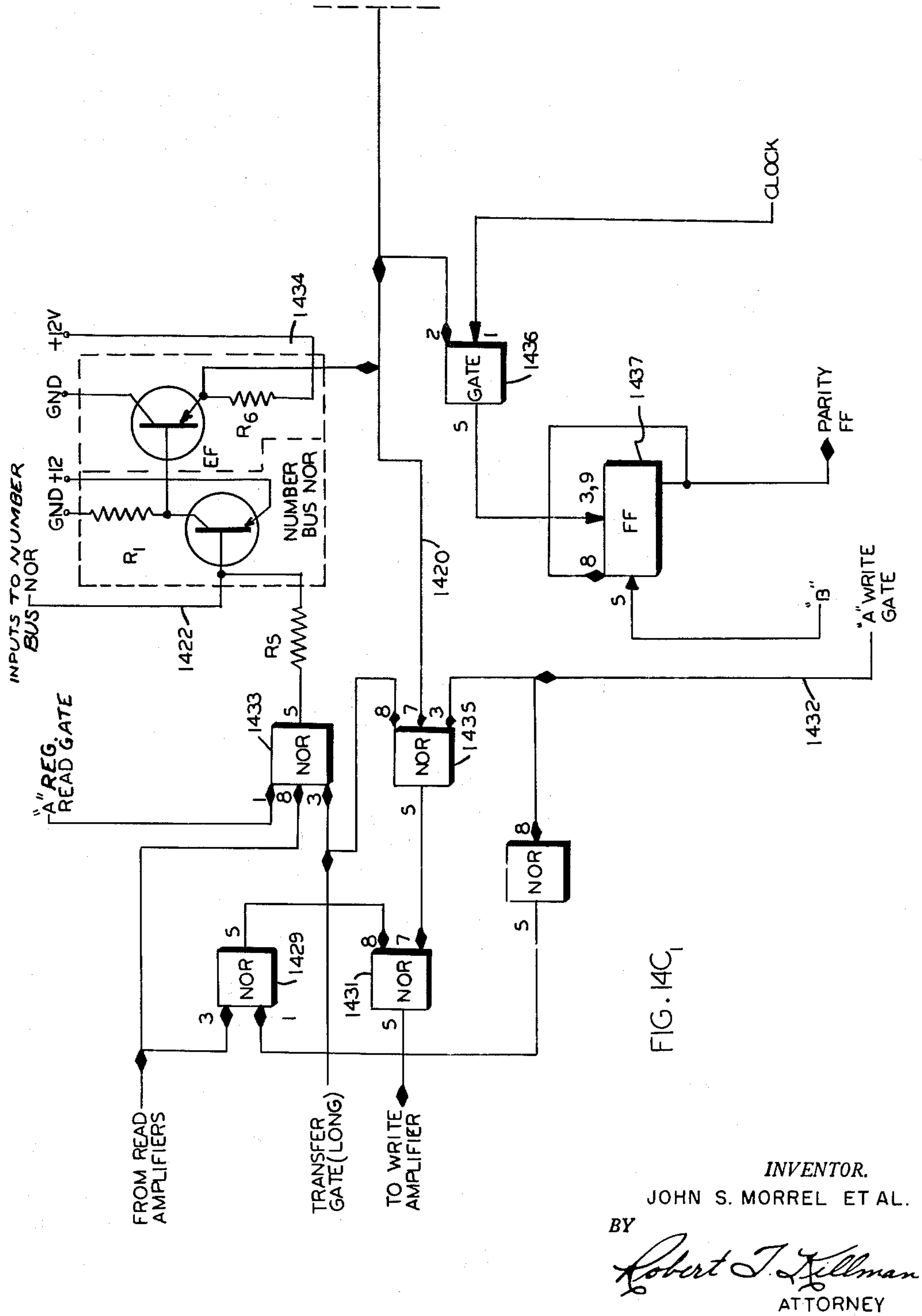
FIG. 14C1
INVENTOR.
JOHN S. MORREL ET AL.
BY
Robert T. Zillman
ATTORNEY

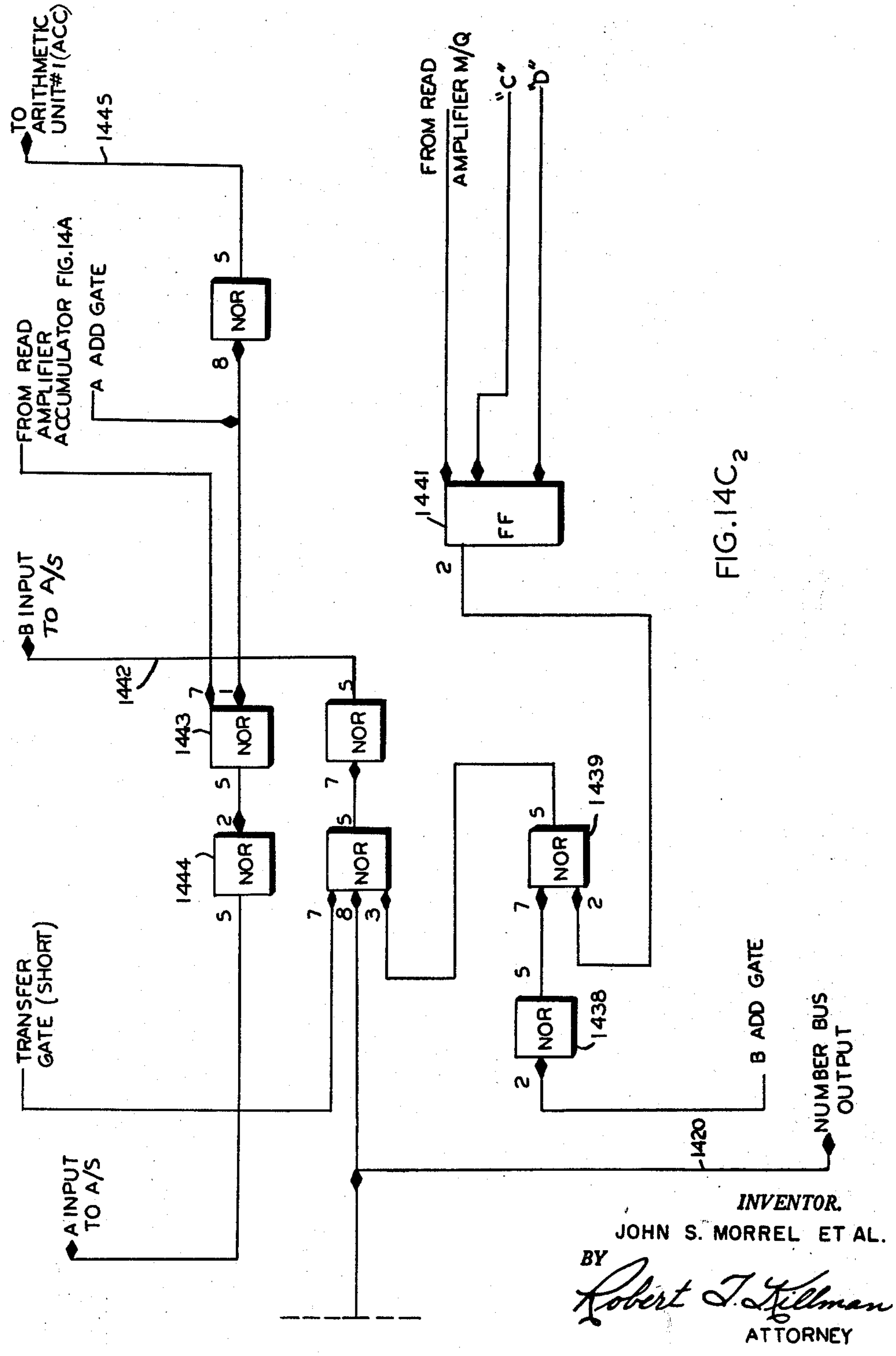
FIG. 14C2
INVENTOR.
JOHN S. MORREL ET AL.
BY Robert T. Killman
ATTORNEY April 27, 1965 J. S. MORREL ETAL 3,181,144

COLLISION AVOIDANCE SYSTEM

Filed Nov. 18, 1960 55 Sheets-Sheet 50

INVENTOR.
JOHN S. MORREL ET AL.
BY
Robert T. Killman
ATTORNEY

INVENTOR.
JOHN S. MORREL ET AL.
BY
Robert T. Hillman
ATTORNEY

INVENTOR.
JOHN S. MORREL ET AL.
BY Robert T. Tillman
ATTORNEY

INVENTOR.
JOHN S. MORREL ET AL.
BY
Robert T. Tillman
ATTORNEY

INVENTOR
JOHN S. MORREL
ET AL.

Robert T. Gillman
ATTORNEY

April 27, 1965 J. S. MORREL ET AL 3,181,144

COLLISION AVOIDANCE SYSTEM

Filed Nov. 18, 1960 55 Sheets-Sheet 55

INVENTORS
JOHN S. MORREL ET AL
BY
Robert T. Tillman

United States Patent Office 3,181,144
Patented Apr. 27, 1965

3,181,144
COLLISION AVOIDANCE SYSTEM

John S. Morrel, Ruxton, Allen I. Perlin, Cockeysville, Malcolm Taylor, Govans, William H. Stotz, Lutherville, and Merlin E. Olmstead, Towson, Md., assignors to The Bendix Corporation, Towson, Md., a corporation of Delaware Filed Nov. 18, 1960, Ser. No. 70,151
15 Claims. (Cl. 343—7)

This invention relates to a collision avoidance system (CAS) for use on vehicles which are moving in such a manner that a collision between two such vehicles is a possibility. The system will be described with reference to aircraft but certain principles of the invention will be recognized as applicable to systems for preventing or avoiding collisions between other types of vehicles.

The problem of preventing mid-air collisions of aircraft has long confronted the aviation industry generally and particularly the commercial air carriers which fly relatively large and expensive aircraft carrying a large number of passengers in each aircraft and which must maintain to a reasonable degree the flight schedule offered to the public. It has long been recognized that the role of air traffic control (ATC) suffers from rather severe limitations in attempting to maintain scheduled commercial flights with a satisfactory degree of safety. The limitations of ATC are compounded by the increased traffic density which the increasing volume of air travel each year imposes. Under conventional ATC concepts the increase in traffic density approaches the saturation condition since the concept upon which safety in ATC is based is assigning an exclusive volume of air space to each aircraft. As the density of traffic increases and air speeds increase the volume of space which must be assigned to each aircraft becomes larger. On the other hand, with more aircraft in the air, the avilable air space may become exhausted, leaving as two alternatives a reduction in the assigned volume to each aircraft with a concomitant reduction in safety or the curtailment of necessary flight services below that for which there is a demand.

The limitations of ATC as presently practiced can be greatly reduced and the utilization of the available air space increased several fold if the volume assigned to each aircraft can be appreciably reduced. While it is conceivable that this can be accomplished with ground-based equipment, of the general type now employed for ATC and navigation purposes, the penalty paid for such capability in the amount of equipment needed and the inflexibility of such control systems with respect to the flight patterns of the aircraft involved are considered to represent impractical solutions. The only practical solution, therefore, appears to be the equipping of each aircraft with suitable equipment to warn the pilot of a potentially dangerous situation with respect to nearby aircraft together with some instruction as to a maneuver which will decrease the danger. For many years this goal was sought in the form of a so-called self-contained collision avoidance system wherein the equipped aricraft would be capable without any external aid to determine when a collision with another aircraft was a possibility and take the necesary steps to avoid a collision. The apparent attractiveness of a self-contained system is due primarily to the concept that the equipped aircraft would be able to protect itself without having to rely on all aircraft in the sky being suitably equipped and hence where safety was desired it could be purchased without the requirement that aircraft be universally so equipped and the requirement made mandatory for all aircraft that fly. Attractive as this concept of collision avoidance may be, it has now been conclusively proved that its attainment is not within the realm of possibility with any conceivable airborne system. Thus the solution to the collision avoidance problem and the manifold dividends which such a solution will bring are not to be found by awaiting further improvements in the state of the art of self-contained systems.

In view of the foregoing, it has now become almost universally accepted that a successful collision avoidance system will be a cooperative system in which the aircraft involved exchange data transmissions by which the receiving aircraft receives from the transmitting aircraft certain information concerning the transmitting aircraft which is available at the transmitting aircraft but is not available or available only with great measurement difficulties at the receiving aircraft. A theoretically complete solution would involve the interchange between two aircraft of both air speeds, both headings, both altitudes and their rates, if any, relative bearing and range. These data can be obtained but the price paid in complexity, weight and cost are prohibitive. The extravagance of such a complete system is further emphasized if one compares the amount of safety actually purchased at the cost of obtaining all of the available data. The same cost considerations apply to the accuracy with which the data is gathered but in any event such data will include measurement errors and hence the solution to the collision problem in any system will be not a detection of those cases which would result in actual collisions but rather the definition of a danger zone which must be avoided and which is far larger than the volume of any aircraft. Hence the concepts of "no false alarms" in such systems is invalid since any system will be required to respond to many alarms for each one that, if ignored, would really lead to a collision.

The present invention carries the cooperative collision avoidance principle beyond the so-called complete system by applying a process of successive elimination of the kind, quantity and order of acquiring data so as to eliminate non-dangerous intruders at the earliest possible time and with the least data. To this concept of elimination, the present invention adds the concept of arbitrarily making a decision to maneuver before the elimination process is completed. Stated in other terms, the present invention balances the disadvantages of requiring more frequent maneuvers against the advantages of the system requiring minimum data and equipment and a relatively low order accuracy of the data acquired. Since a cooperative system is the only possible solution to the problem, the minimum data system of this type is probably the only acceptable system since any cooperative system must be used by substantially all aircraft that fly.

It is an object of the present invention to provide a solution to the problems of collision avoidance incorporating the foregoing principles A further object of the invention is to provide a CAS in which the principle of successive elimination is applied to potentially dangerous aircraft in a manner which minimizes the actual amount of data which is required to form a decision upon which to act.

Another object of the invention is to provide a CAS which requires only two types of data, the altitude of the intruder aircraft and the range between the protected and intruder aircraft.

Another object of the invention is to provide a CAS which is capable of operating with data transmitted on a broadcast basis in order to reduce the interference problem between mulitple aircraft.

A still further object of the invention is to provide a CAS in which the criterion is escape time rather than miss distance.

A still further object of the invention is to provide a system for obtaining the range and altitude data required by means of a one-way transmission.

Another object of the invention is to provide a CAS with capability for handling multiple aircraft situations.

A further object of the invention is to provide a ground reflecting range measurement CAS which operates using pressure altitude data for initial elimination of non-dangerous aircraft and uses ground-reflected signals to obtain both range and altitude data for computing a maneuver criterion, thereby minimizing terrain effects.

These and other objects of the invention will become apparent from the following detailed description taken in conjunction with the accompanying drawings wherein:

FIG. A is a diagram of the so-called collision triangle for two aircraft travelling without acceleration in a plane;

FIG. B is a plot of the variables range ($r$) and tau ($\tau$) as a function of real time ($t$);

FIG. C is plot of $\tau$ versus $t$ illustrating the utilization of the data in the present system;

FIGS. 1A to 1G are diagrams similar to FIG. 1 and useful in describing the preferred embodiment of the invention;

FIG. 11A is a logic diagram of the buffer data entry;

FIG. 11B is a logic diagram of the buffer stage No. 1;

Figure 12:
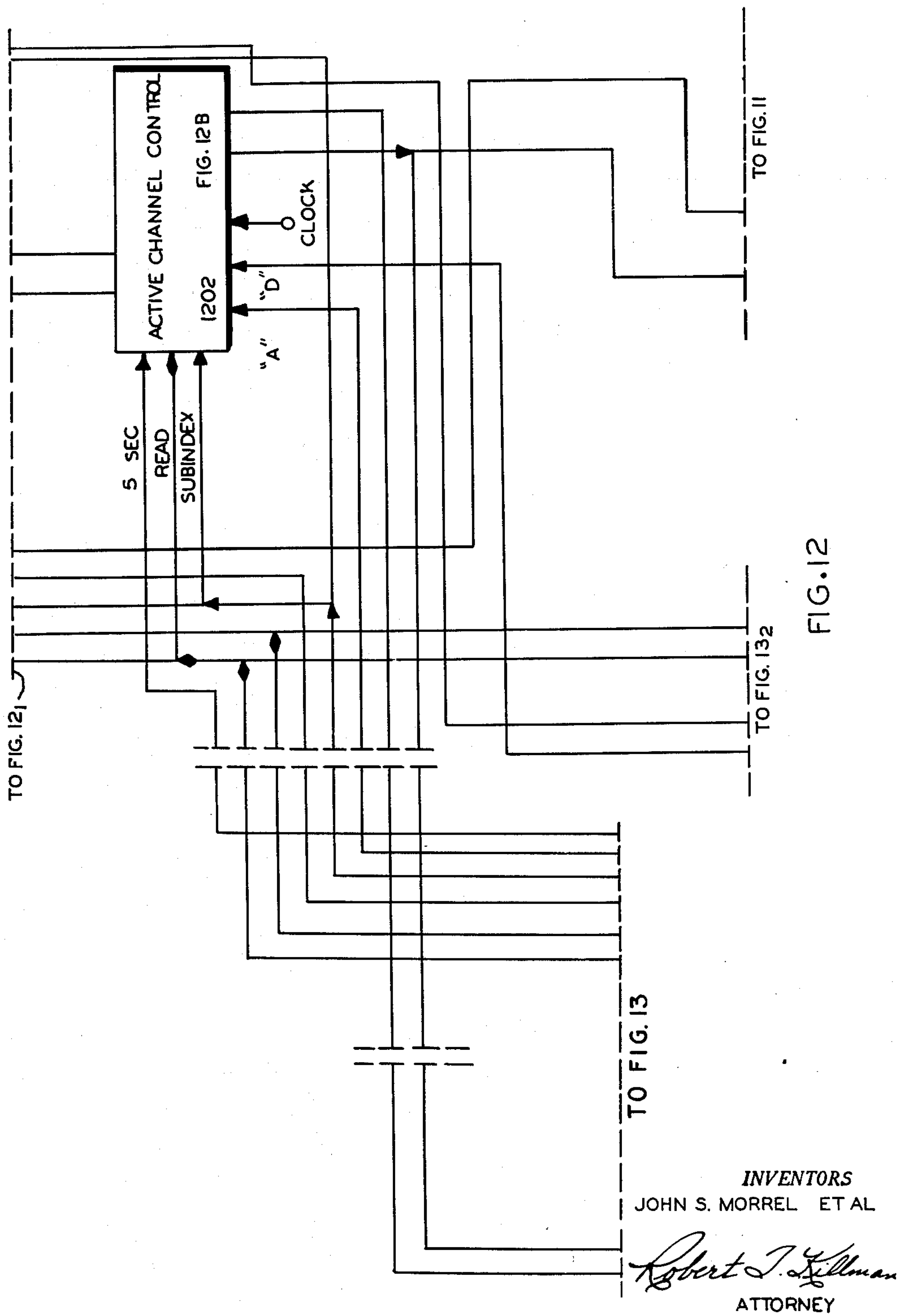
FIG. 12 is a block diagram of the active system of the computer
Figure 12A:
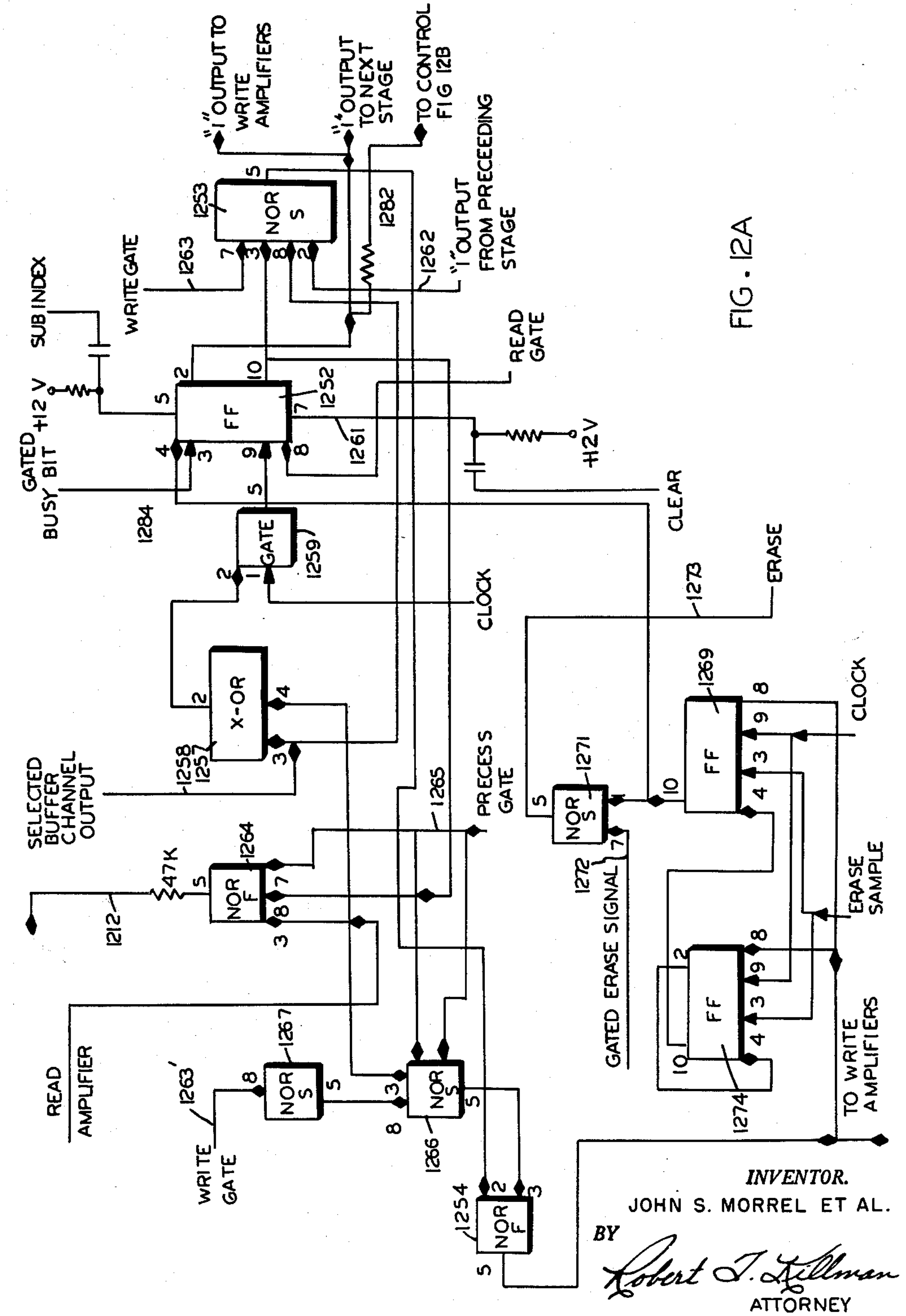
FIG. 12A is a logic diagram of an active channel.
Figure 12B:
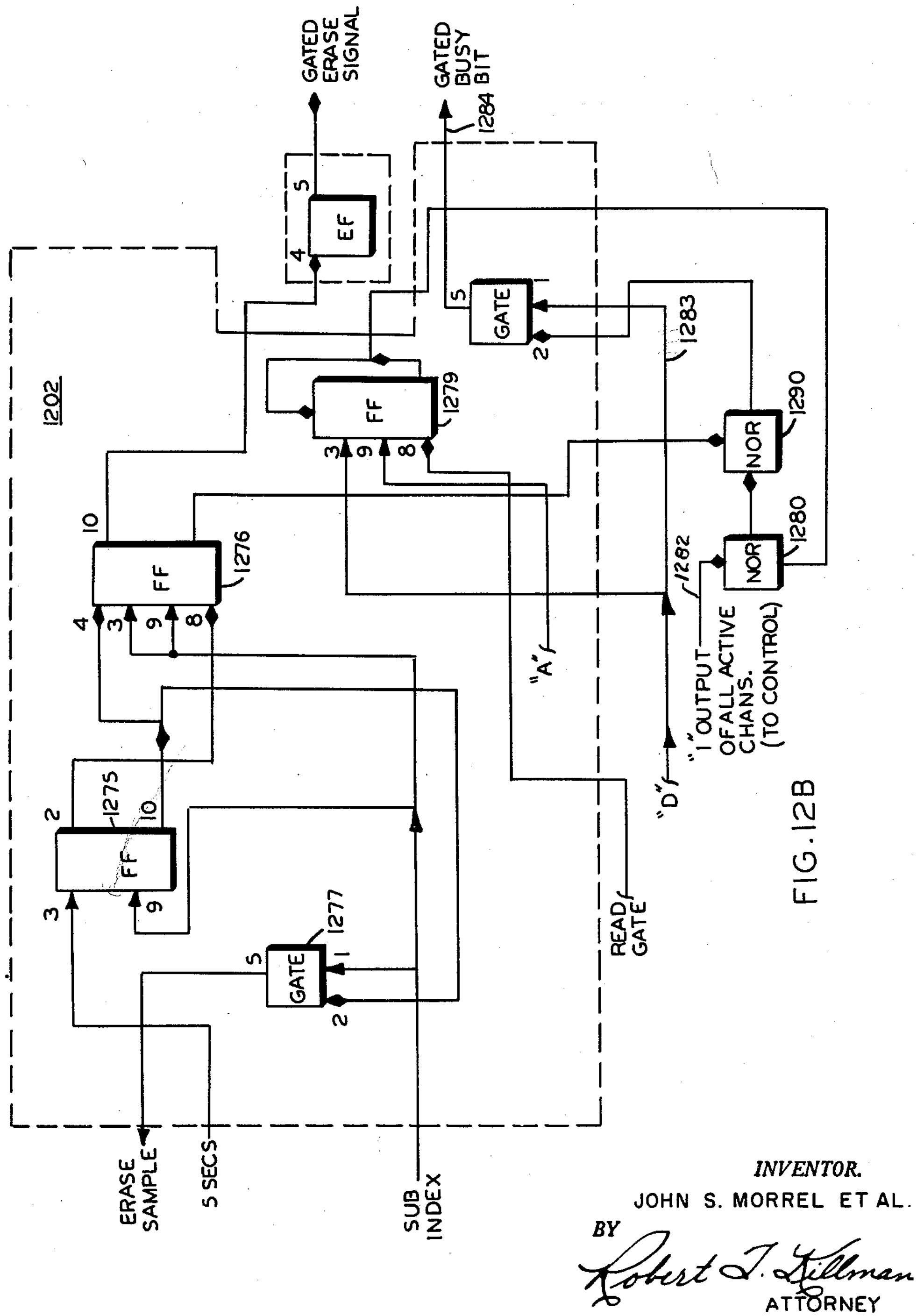
FIG. 12B is a logic diagram of the control portion of the active system.
Figure 12B:
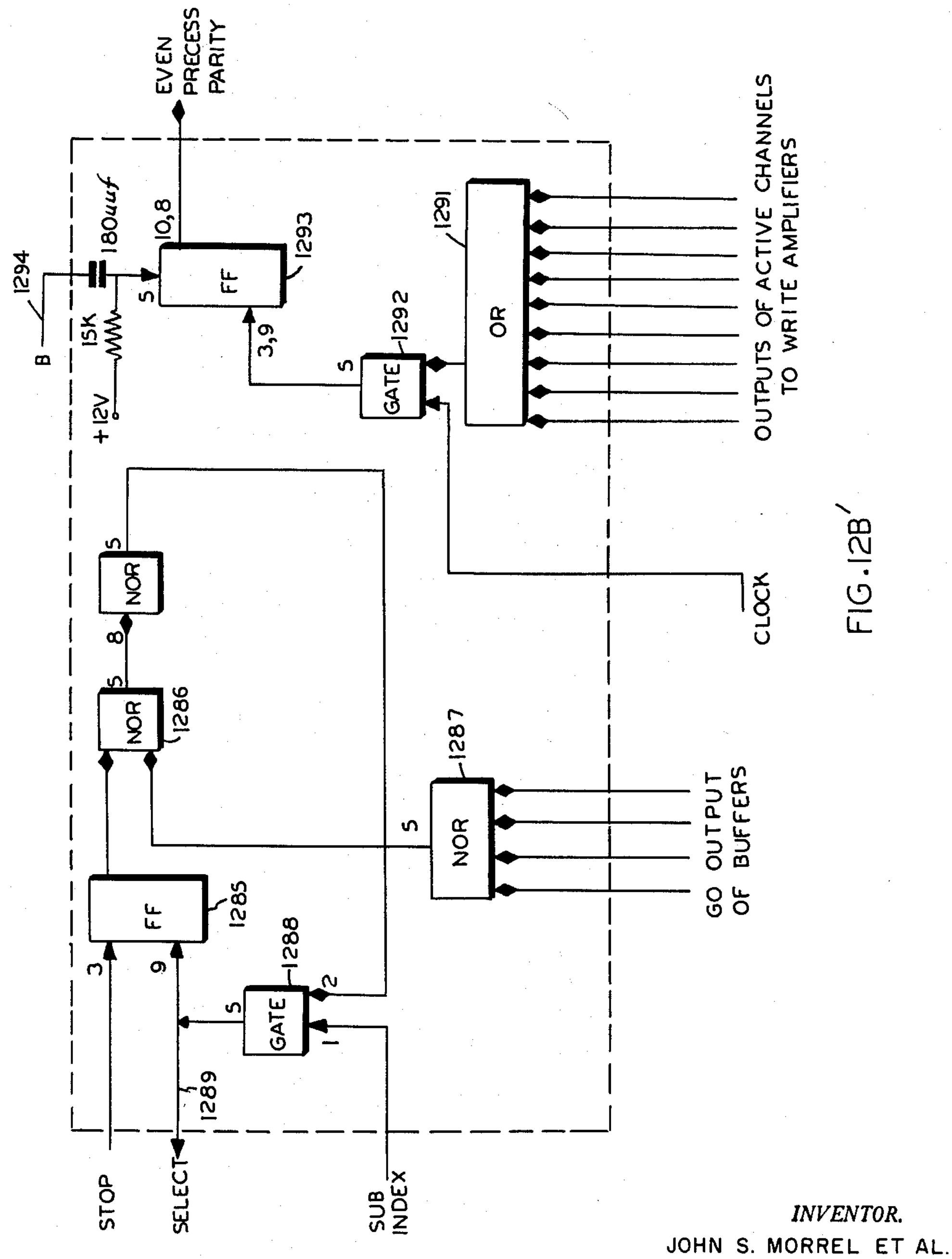
Figure 12D:
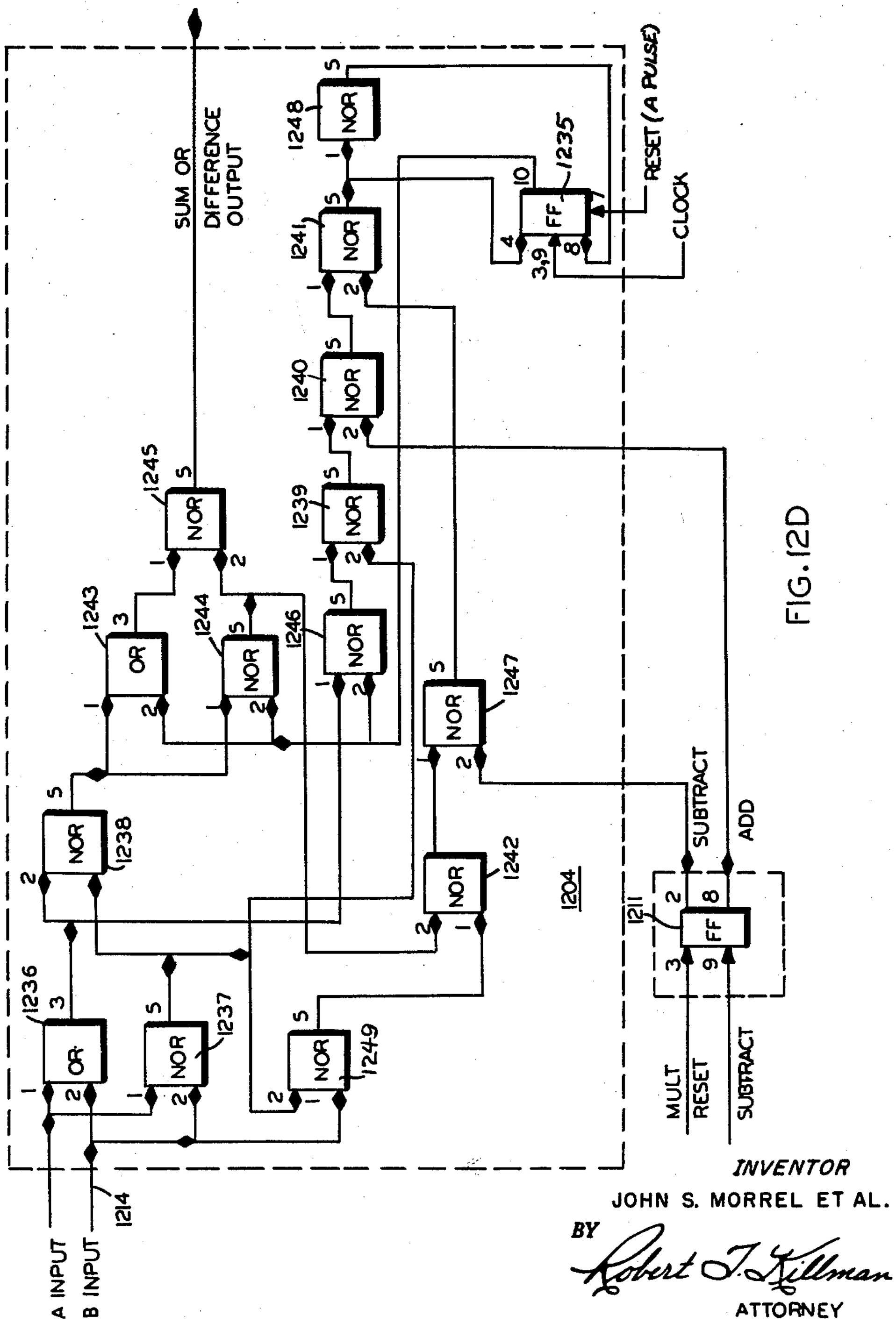
Figure 13:
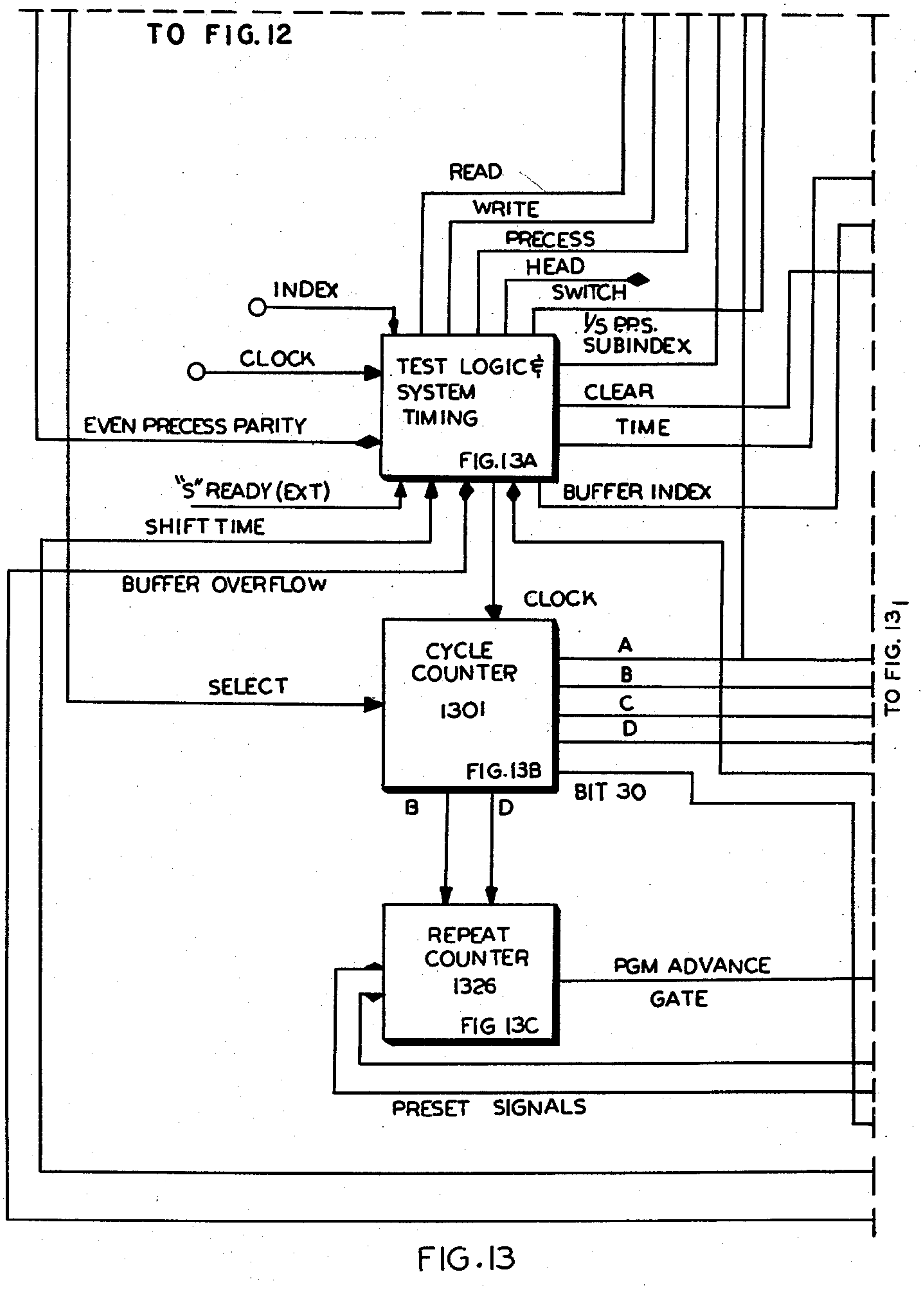
Figure 13A:
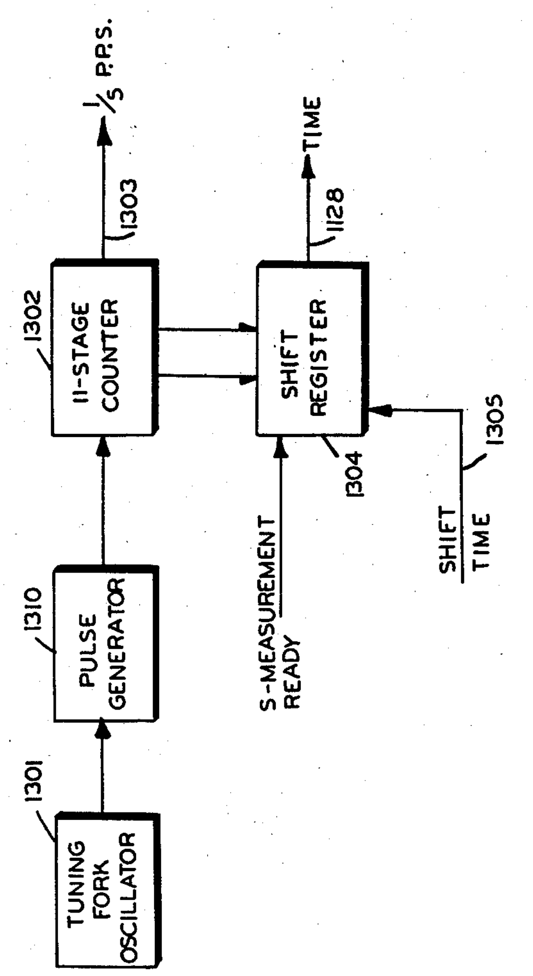
Figure 13A:
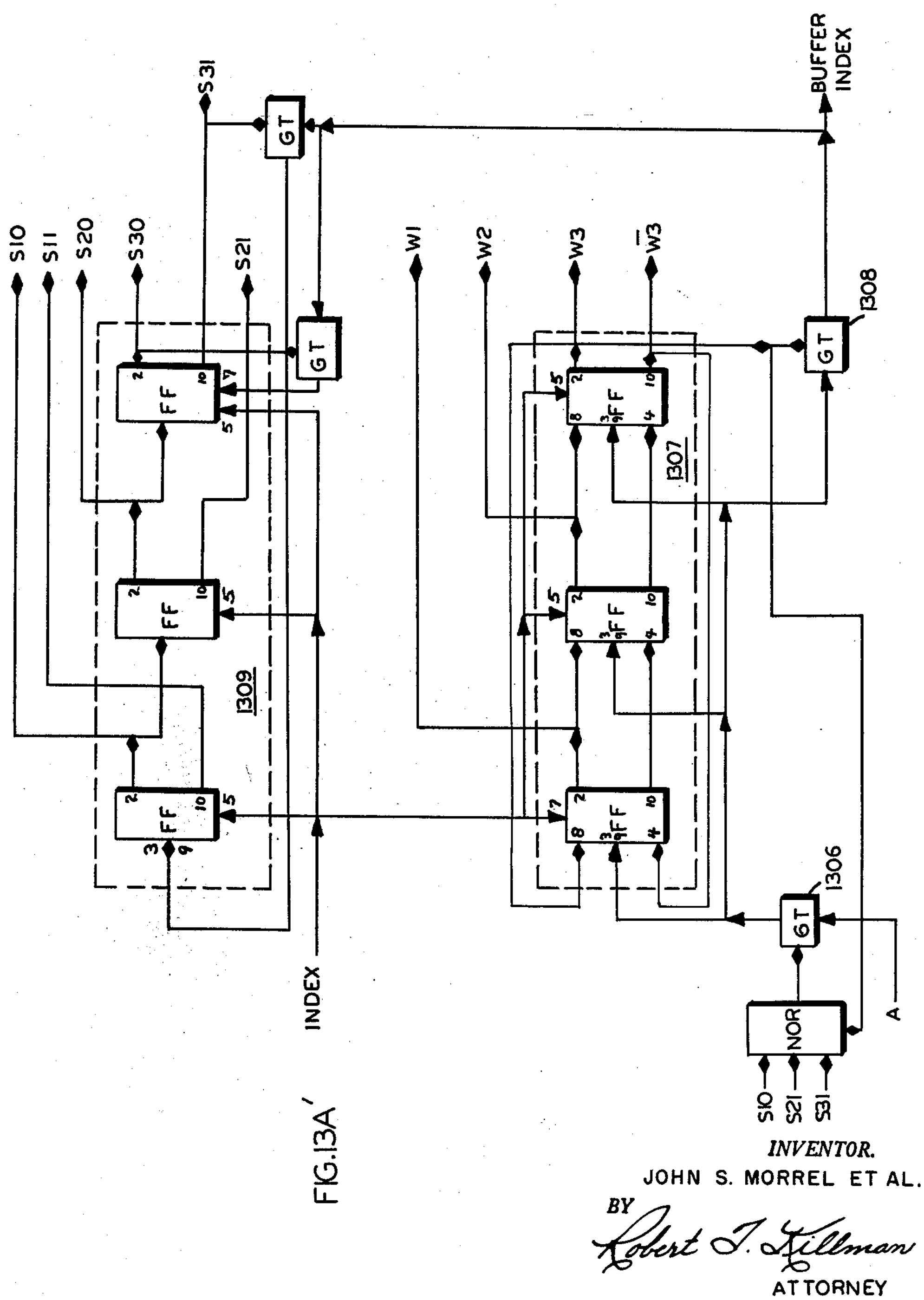
Figure 13A:
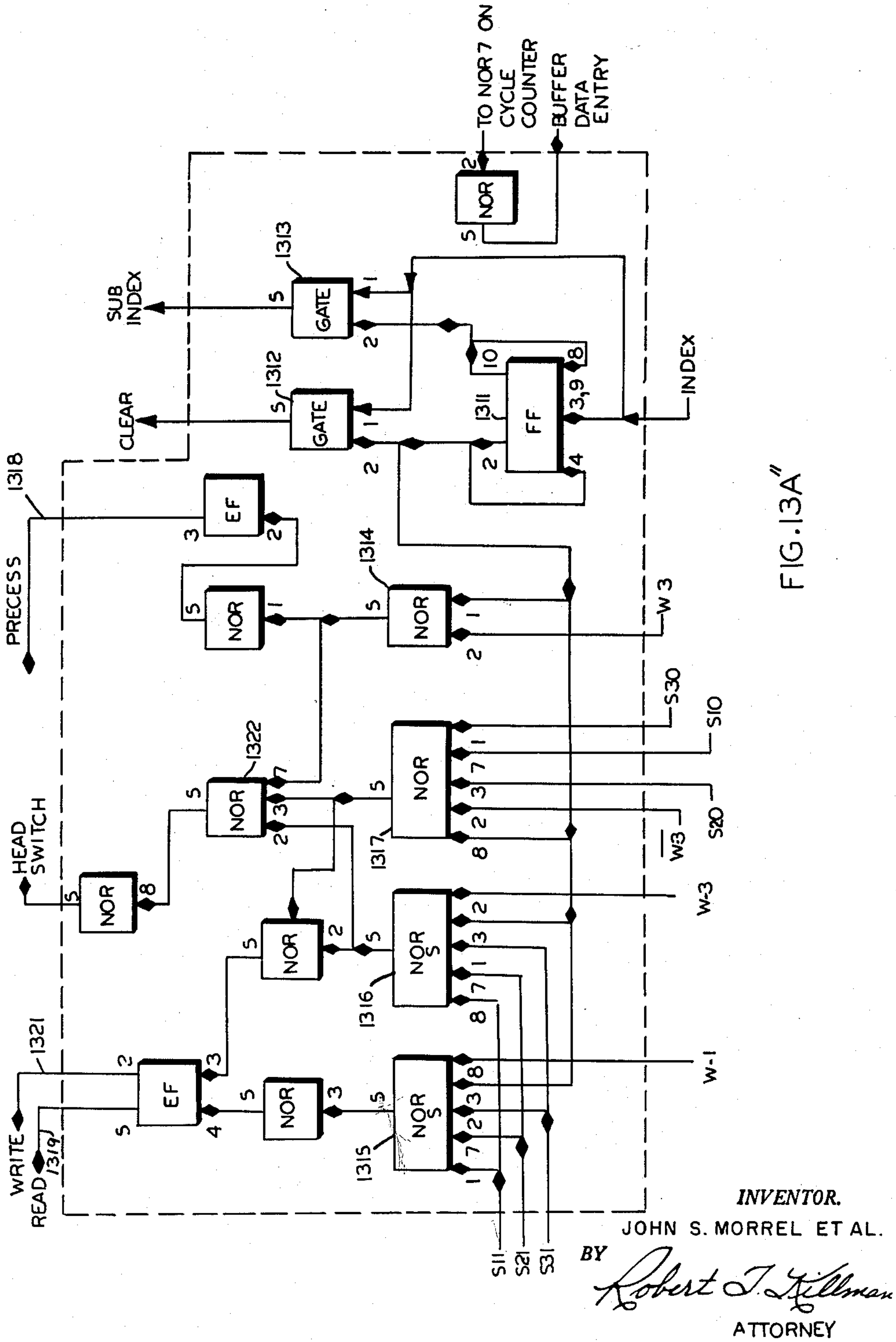
Figure 13C:
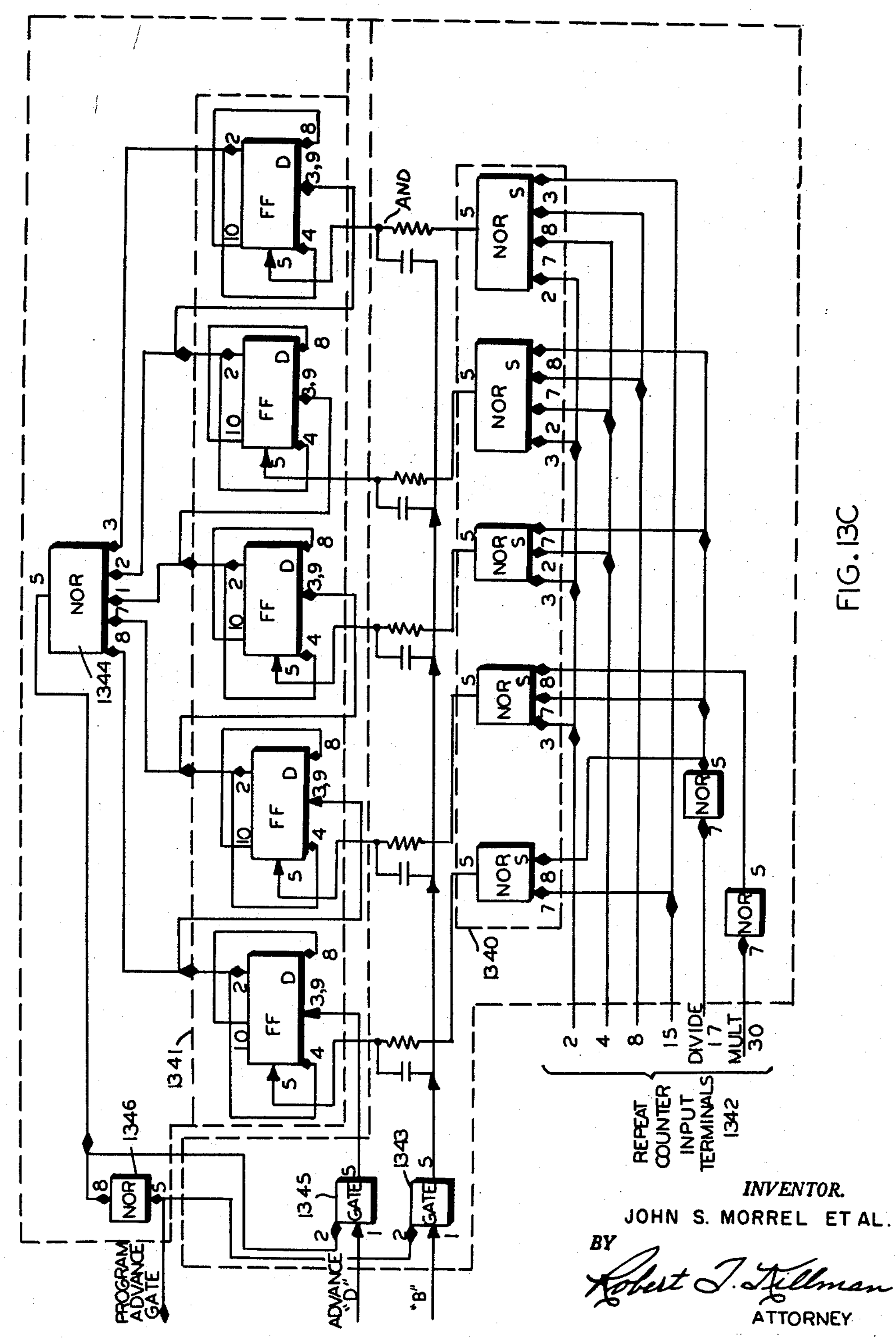
Figure 13D:
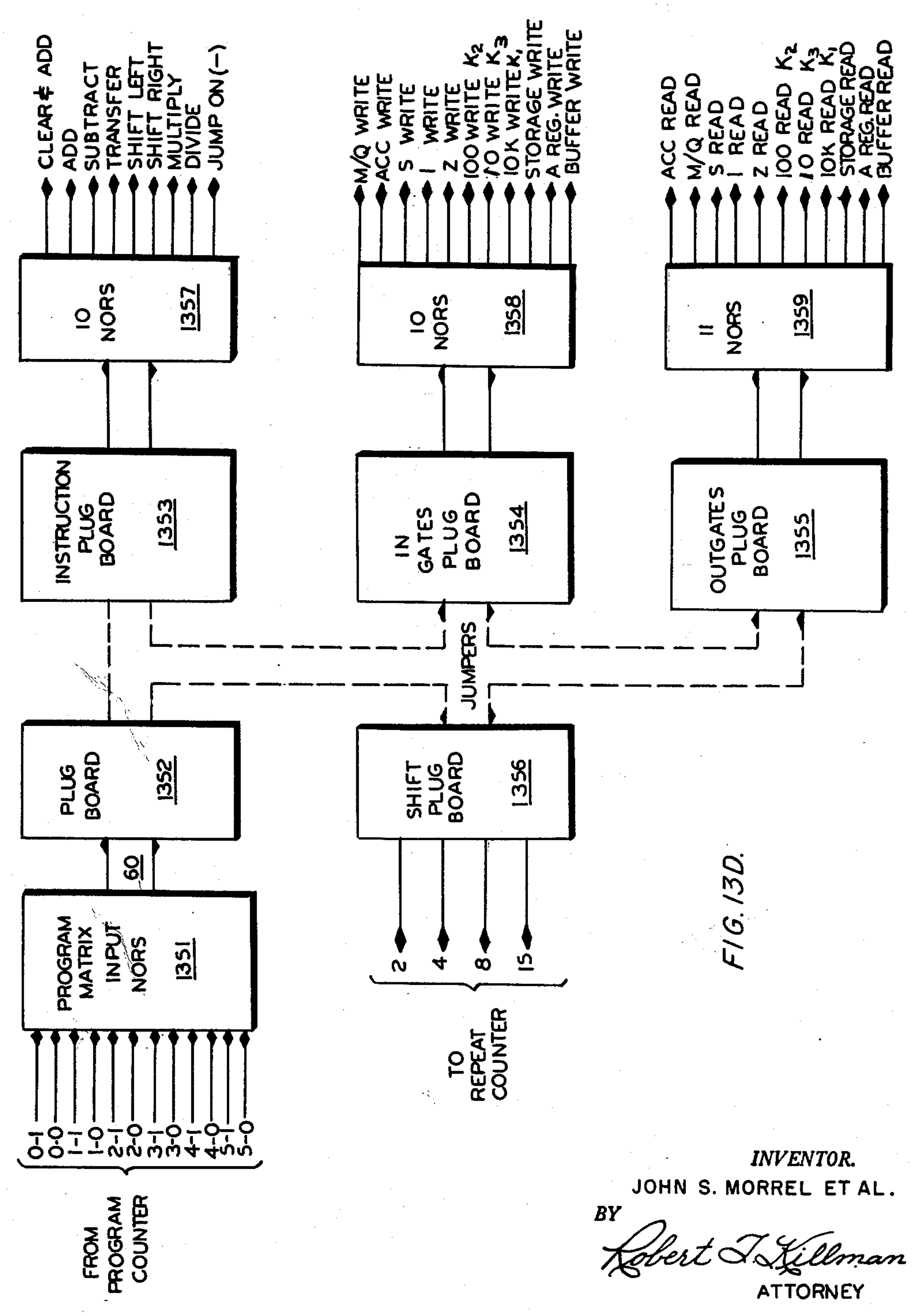
Figure 13E:
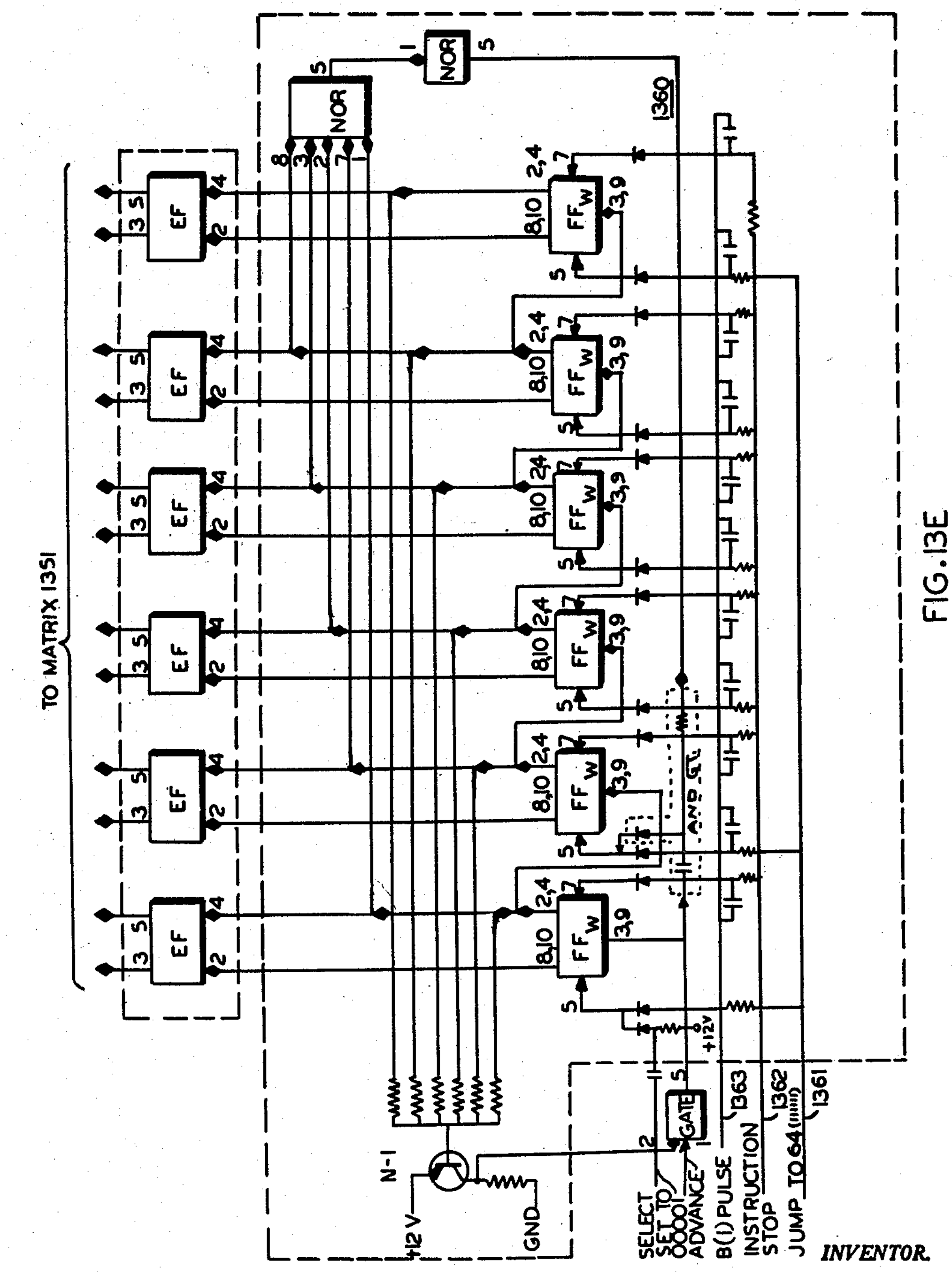
Figure 14:
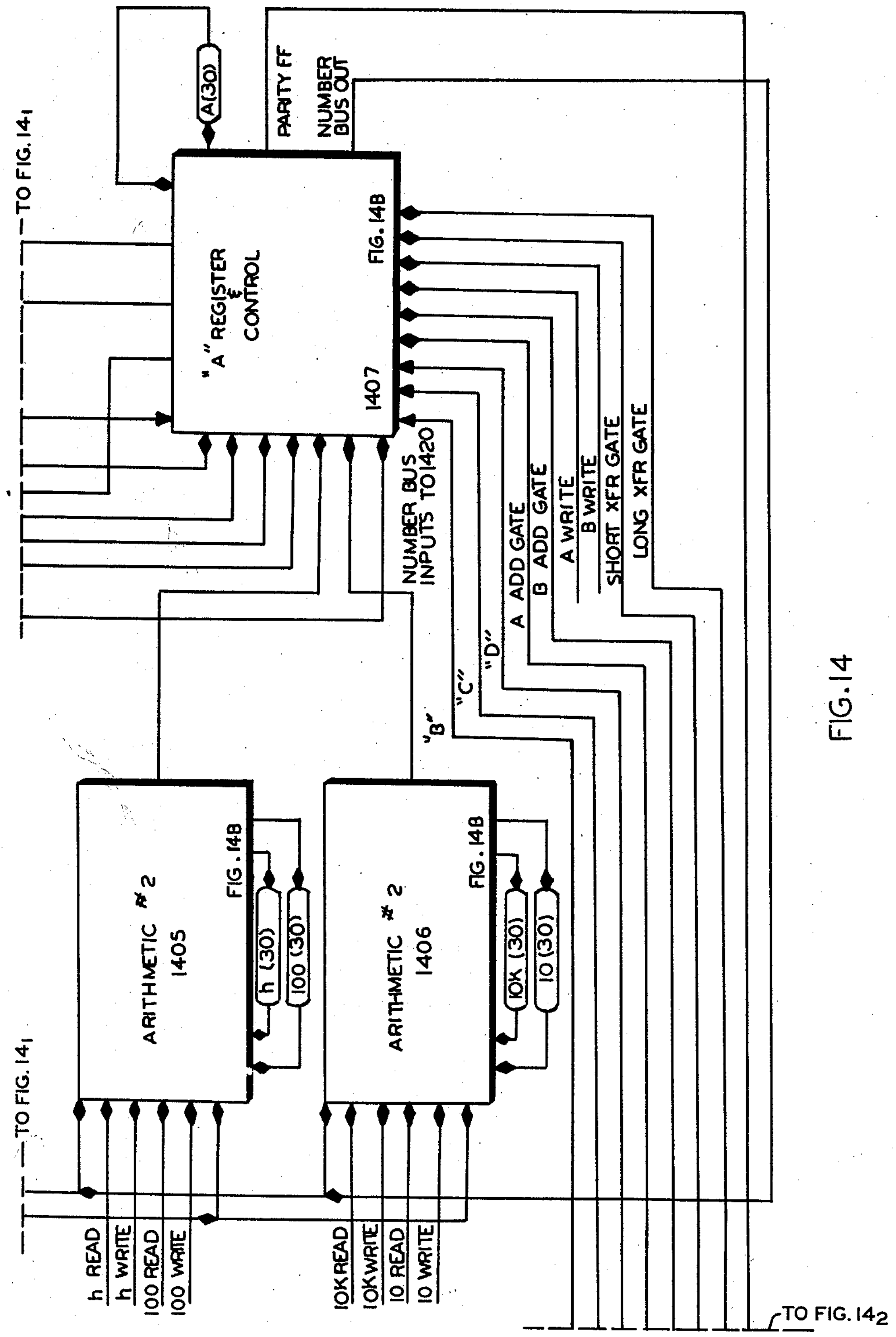
Figures 14A, 14D:
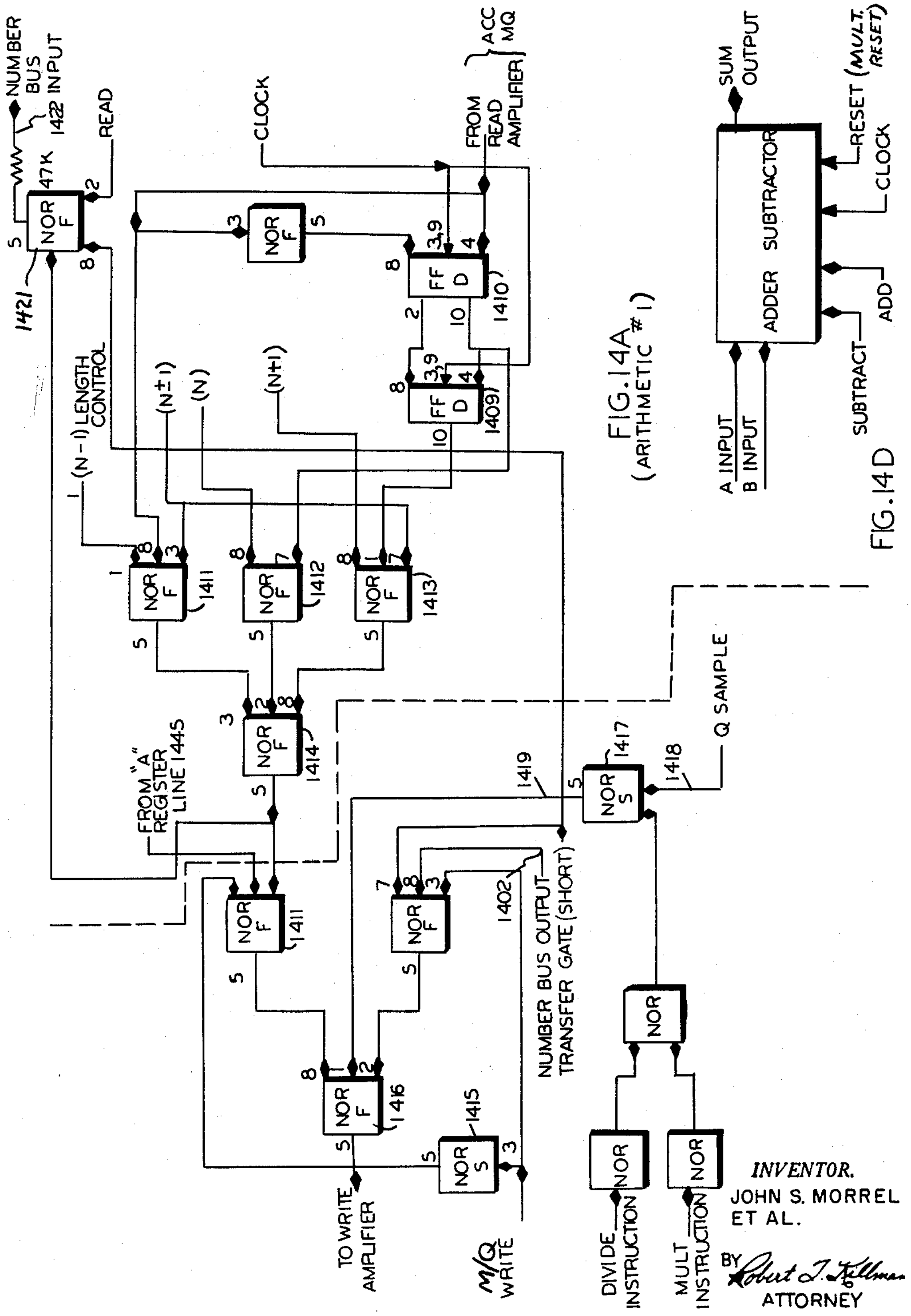
Figure 14B:
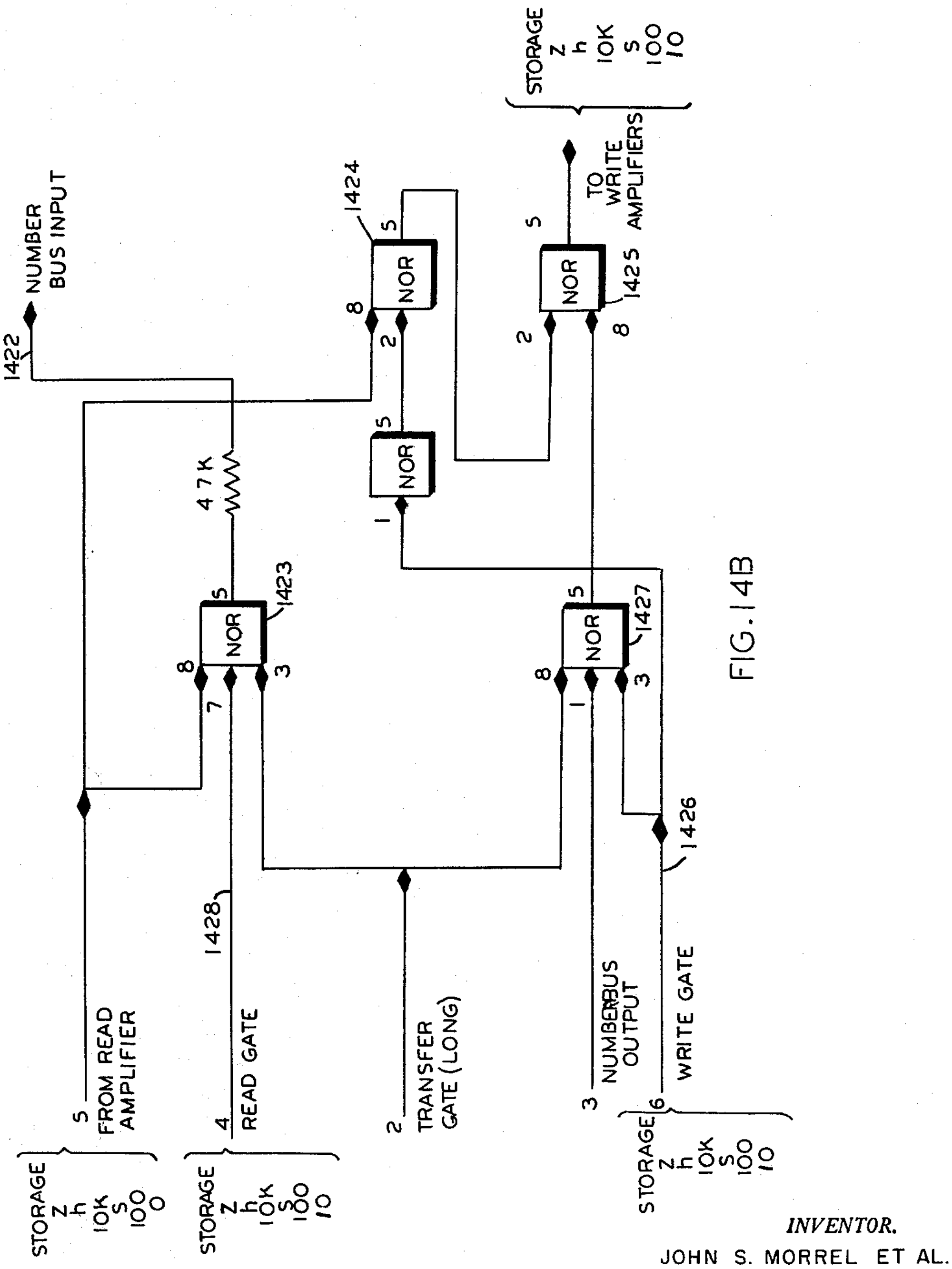
Figure 15:
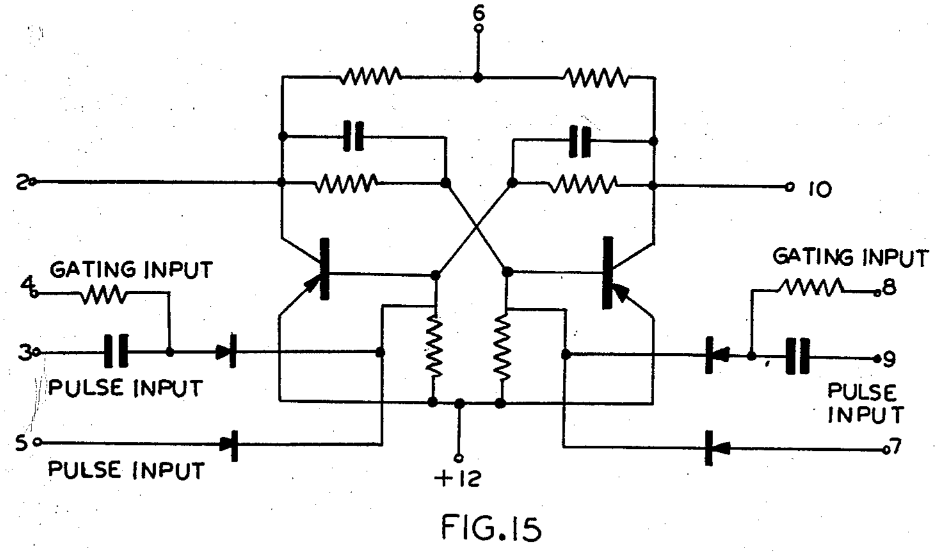
Figure 15A:
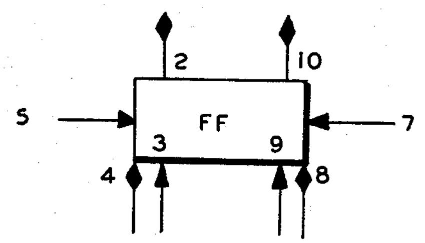
Figure 16A:
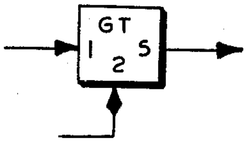
Figure 16:
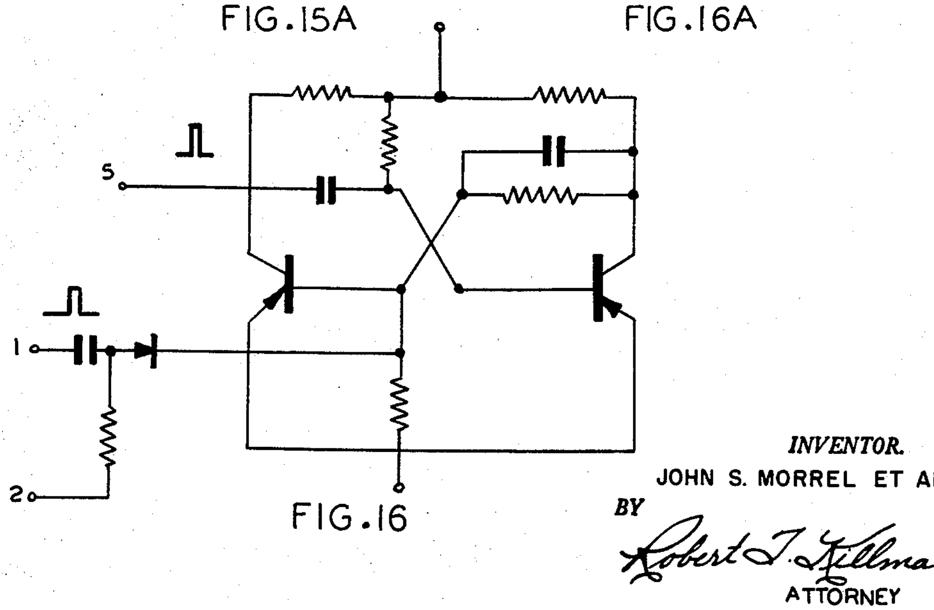
Figure 17:
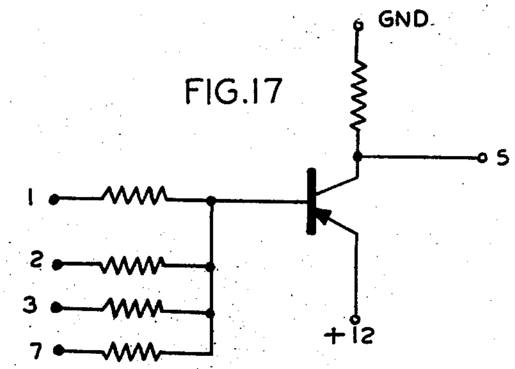
Figure 17A:
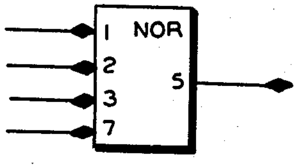
Figure 19:
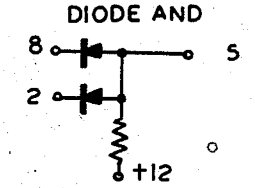
Figure 20:
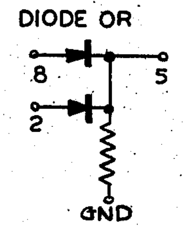
Figure 19A:
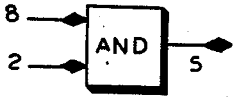
Figure 20A:
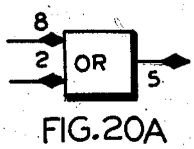
Figure 18:
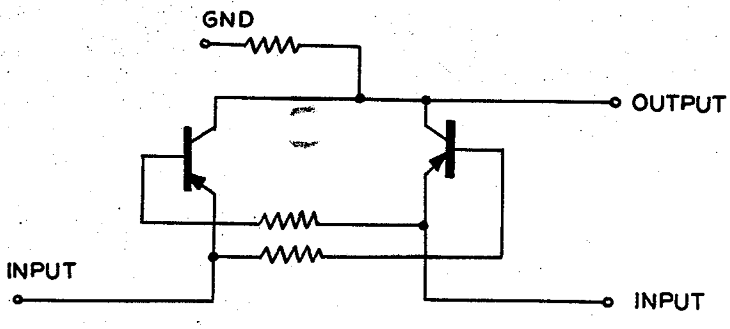
Figure 18A:
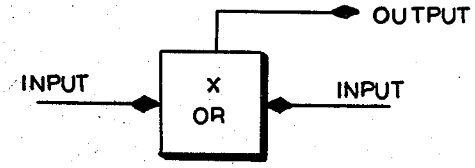
Figures 21, 22:
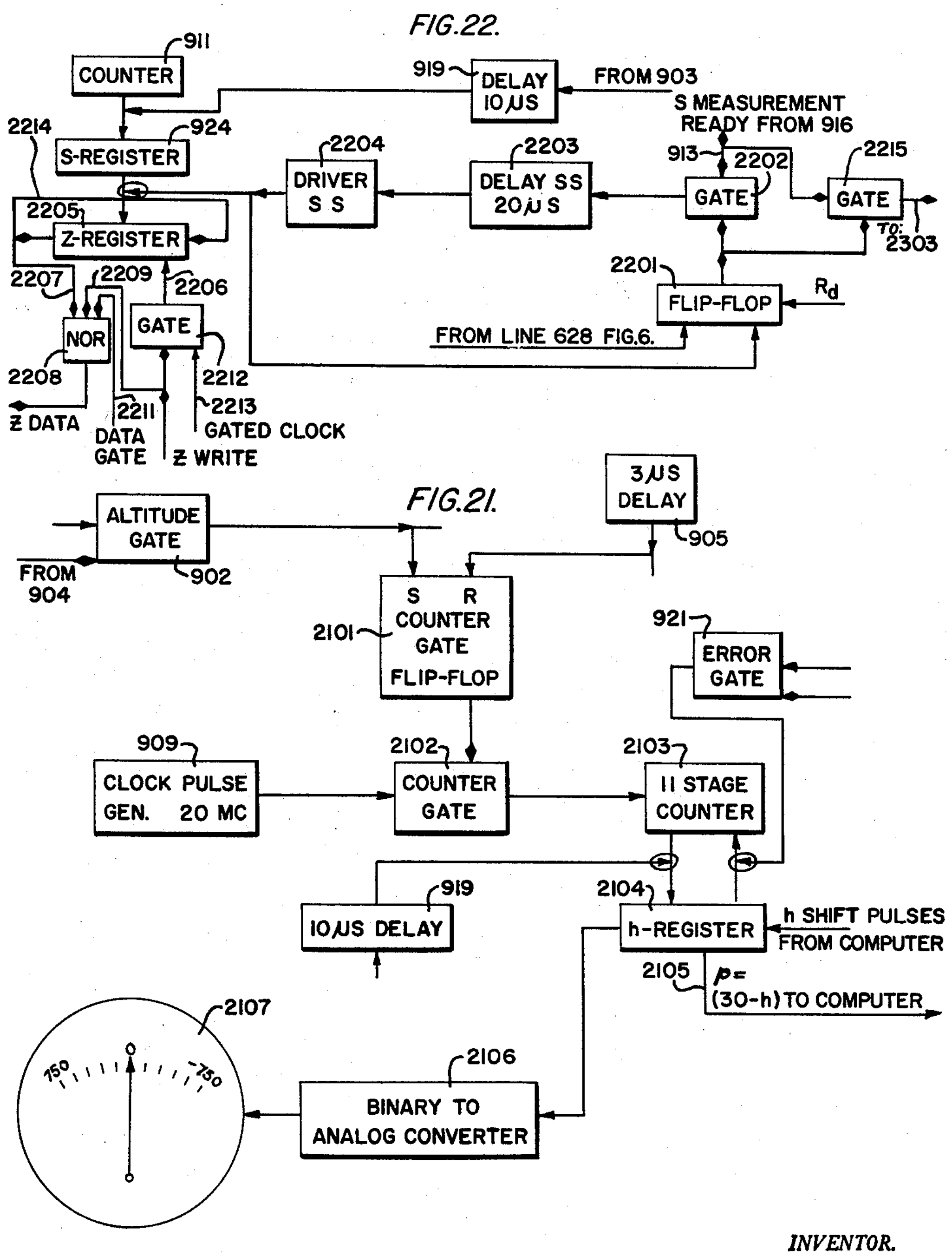
Figure 23:
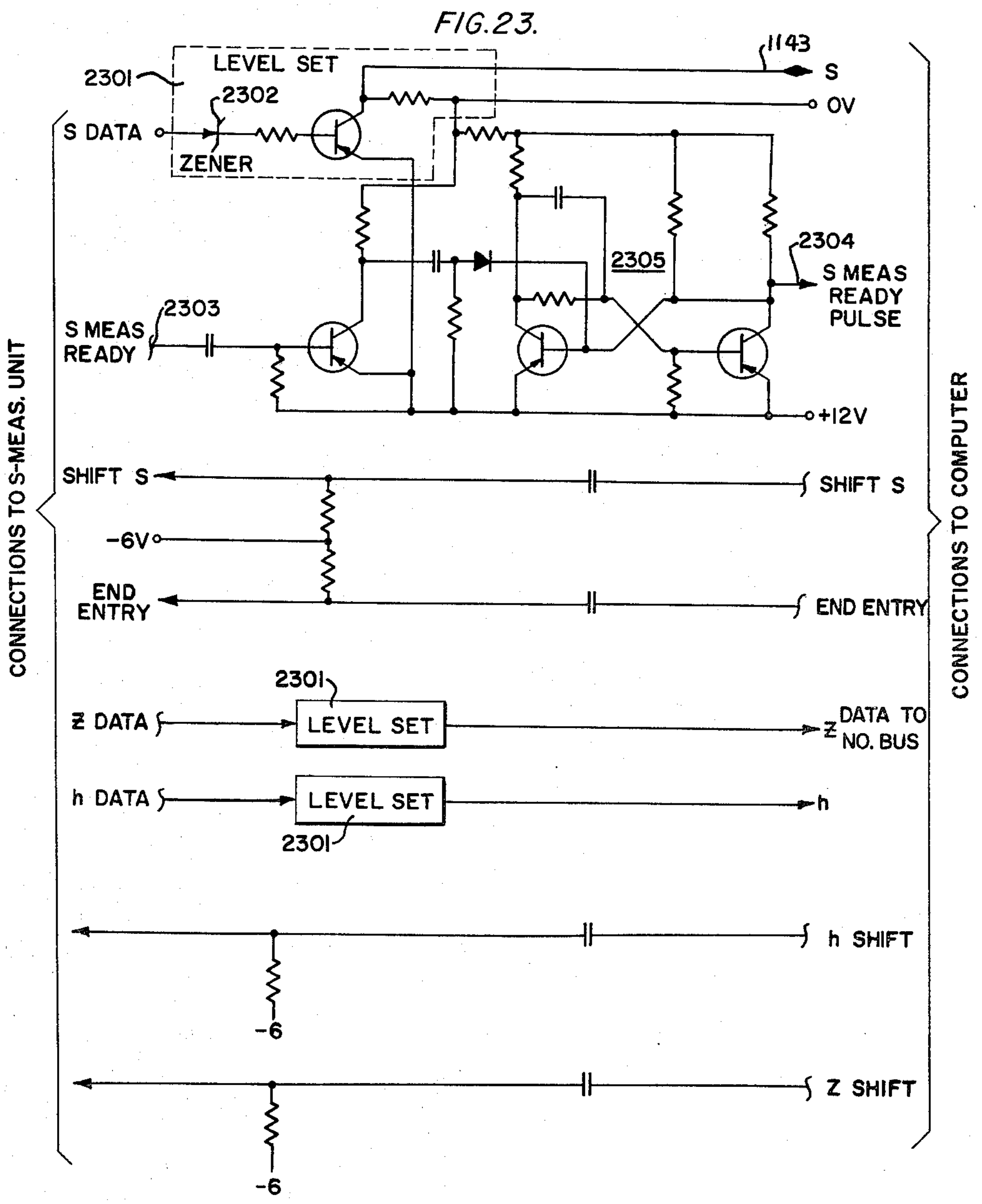
Figure 24:
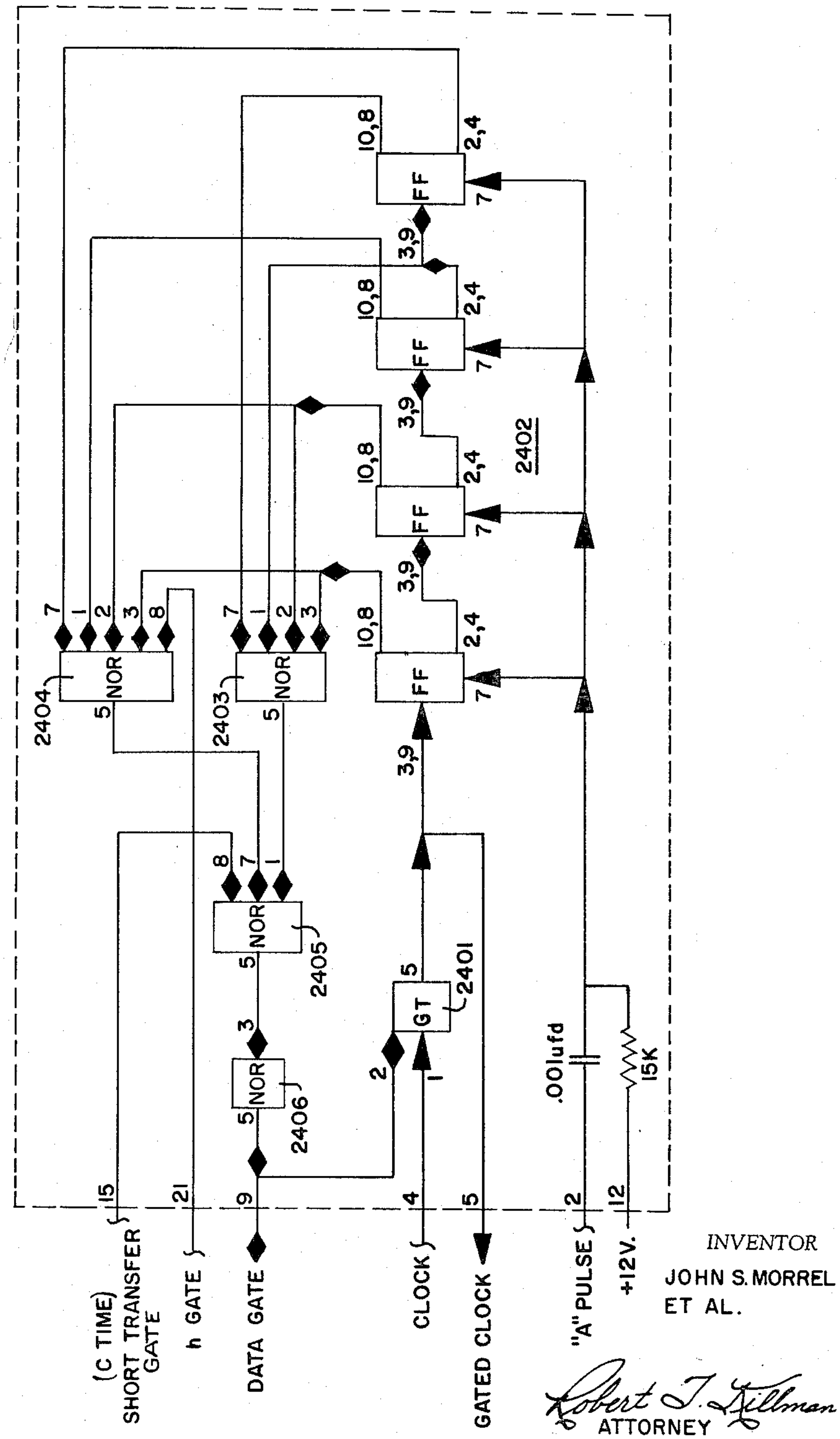
Figure 25:
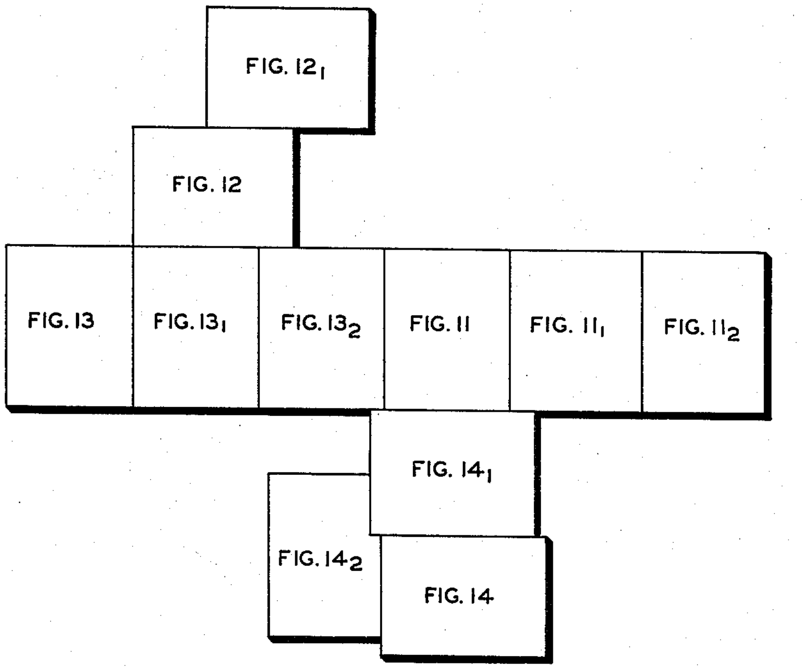
Figure 25:
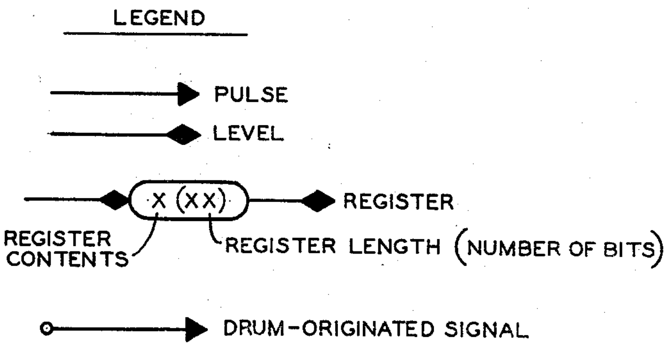

FIG. 12B′ is a further portion of the control logic of the active system;

FIG 12C is a logic diagram of the maneuver computation portion of the active system;

FIG. 12D is the logic diagram for the adder-subtracter;

FIG. 13 is a block diagram of the programmer;

FIG. 13A is a block diagram of the system timer;

FIG. 13A′ is a logic diagram for obtaining three words on a drum sector;

FIG. 13A″ is a logic diagram for generating internal data processing signals;

FIG. 13B is a logic diagram of the cycle counter;

FIG. 13C is a logic diagram of the repeat counter;

FIG. 13D is a block diagram of the matrices;

FIG. 13E is a logic diagram of the program counter;

FIG. 13F is a logic diagram of the program control;

FIG. 14 is a block diagram of the arithmetic unit;

FIG. 14A is a logic diagram of arithmetic unit number 1;

FIG. 14B is a logic diagram of arithmetic unit number 2;

FIG. 14C is a logic diagram of the A-register and control logic;

FIG. 14D is a block diagram of an adder-subtracter similar to that of FIG. 12D;

FIG. 15 and FIG. 15A are schematic and logic representations respectively of the flip-flops (FF) used throughout the disclosure;

FIG. 16 and FIG. 16A are schematic and logic representations respectively of gating monostable multivibrators (single-shots, SS) used throughout the disclosure;

FIG. 17 and FIG. 17A are schematic and logic representations respectively of NOR circuits used throughout the disclosure;

FIG. 18 and FIG. 18A are schematic and logic representations respectively of an EXCLUSIVE-OR (X-OR) circuit;

FIG. 19 and FIG. 19A are schematic and logic representations respectively of diode AND circuits;

FIG. 20 and FIG. 20A are schematic and logic representations respectively of diode OR circuits;

FIG. 21 is a block diagram of the $h$-measuring system and maneuver indicator;

FIG. 22 is a block diagram of the Z-measurement system;

FIG. 23 is a schematic diagram of the interconnections between the computer and the S, $h$ and Z measurement systems;

FIG. 24 is a logic diagram for the data shift control of the system;

FIG. 25 is a diagram for assembling FIGS. 11, 12, 13 and 14 into a complete system diagram.

In the drawings some figures cover more than one sheet and are then designated, for example, FIG. $14C_1$ and FIG. $14C_2$ which when assembled form FIG. 14C.

The present invention is based on the discovery that it is impractical to compute "miss-distance" as a reliable parameter for use in making a maneuver decision under all conditions while the quantity "escape time" can be measured and used efficiently as maneuver criterion. Escape time is utilized by computing the minimum possible time to the nearest approach and indicating that the aircraft should maneuver when this quantity reaches some preset minimum value based on the aircraft maneuver characteristics. This criterion can be implemented in accordance with the present invention with the absolute minimum amount of data since only range and altitude are needed. In accordance with the present invention range between two aircraft is measured periodically and the value stored and when several such values have been obtained a line of best fit to the data points is analytically obtained by minimizing the sums of the squares of the error terms. From the data for the computed line and the time interval during which it is measured the range rate can be computed. The ratio of range to range rate has the dimensions of time and in the present invention is designated tau ($\tau$).

In order to eliminate the problem of interference between multiple aircraft in the transmission of data the present invention utilizes one-way broadcast transmission in the preferred embodiment thereof which provides in addition great economy in both quantity of communication and system instrumentation. This one way transmission utilizes a "ground bounce" of the transmitted signal as well as the direct line of sight transmission path to supply the necessary data to the receiving aircraft. In accordance with the invention each aircraft transmits a burst of pulses at regular intervals. The spacing between pulses is made proportional to altitude. The protected aircraft receives these pulses via the direct path and in addition receives a reflected or "S" pulse from the shortest reflecting path. By measuring the time between the reception of the direct and "S" pulses, determining from the received signal the altitude of the intruder craft, and combining these data with its own altitude the measure of range between the two aircraft may be obtained. The value of range need not be explicitly computed but these data are utilized to obtain range rate and the quantity $\tau$ hereinbefore described.

Figure 1:
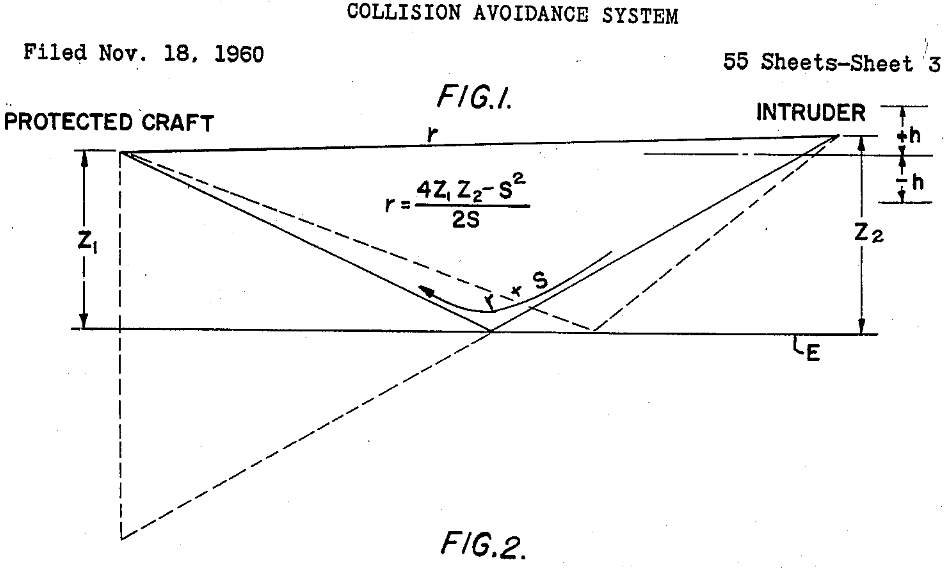
FIG. 1 is an elevational view of the geometrical aspects of a situation involving a protected aircraft and an intruder.

Referring now to FIG. 1 the geometry of ground bounce transmission of data between two aircraft over a reflecting ground plane E is shown. Two aircraft are shown and respectively designated a protected craft and an intruder. If both aircraft are fully equipped each considers the other to be intruder and proceeds accordingly. However, the system is operative to protect a fully equipped aircraft which is considered to be the protected craft in FIG. 1 even though the intruder carries only minimum equipment as hereinafter defined. The range between the aircraft is the direct line therebetween designated $r$ and the shortest path between the aircraft for a ground reflected signal is $r+S$. Any other ground reflected signal arriving at the protected craft from the intruder will travel a greater distance and hence will arrive after the pulse which travels the path $r+S$. The altitude of the protected aircraft is $Z_1$ and the altitude of the intruder is $Z_2$. If the aircraft are in danger of a collision $Z_1$ will be approximately equal to $Z_2$ and an altitude danger zone can be defined relative to $Z_1$ as the altitude interval $Z_1 \pm h$. Knowing Z and S which is the difference in the path length for the direct and reflected signals the range $r$ can be calculated by using the following equation:

$$r=\frac{4Z_1Z_2-S^2}{2S}$$

Figure 2:
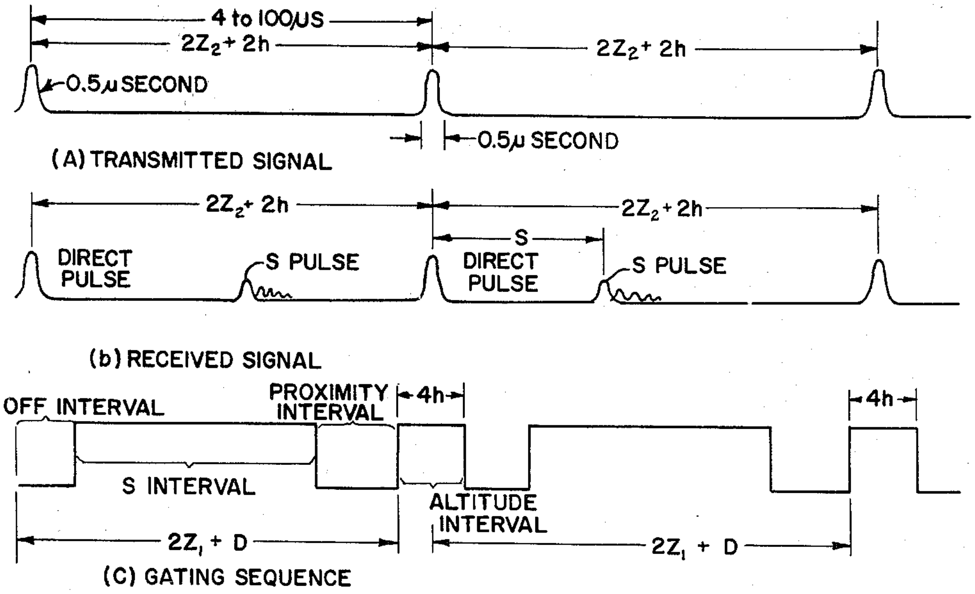
FIG. 2 is a waveform diagram of the transmitted and received signals in accordance with the present invention together with a gating sequence.

Referring now to FIG. 2 waveform (*a*) represents the transmitted signal which is transmitted by all aircraft. Each aircraft transmits successive bursts of pulses (for example 20 pulses) at definitely spaced intervals of, for example, five seconds. Each burst of 20 pulses has the spacing between the pulses determined by the altitude of the transmitting aircraft to be $2Z_2$ plus a fixed delay proportional to $2h$. Each individual pulse is one-half microsecond wide and the burst duration is equal to approximately a maximum of two milliseconds once every five seconds.

Referring now to waveform (*b*) in FIG. 2 the received signal will comprise DIRECT pulses spaced in accordance with the altitude of the intruder aircraft and S pulses which are received by the shortest ground reflection path. Subsequent to the S pulse which is the first pulse occurring after a DIRECT pulse will be a plurality of additional reflected pulses arriving over paths which are longer than the shortest reflected path between the intruder and the protected craft. The system of the present invention provides in the protected aircraft apparatus for examining the spacing between the DIRECT pulses received and if this pulse spacing does not agree with the protected aircraft's own altitude the intruder aircraft is ignored as being not dangerous. If however the pulse spacing of the direct pulses corresponds to the limits of the $\pm h$ zone the aircraft is considered dangerous and further processing of the signal follows.

The signal processed for aircraft intruders at dangerous altitudes utilizes both the DIRECT and the S pulse of FIG. 2*b*. The first pulse to be received is the DIRECT pulse which travels the distance $r$. Following this pulse the S pulse will be received and its spacing is a function of the altitude of the two aircraft and the range between the aircraft. If the aircraft are widely separated the S pulse will follow closely behind the DIRECT pulse. If, however, the aircraft are close together the S pulse will be delayed with respect to the DIRECT pulse until at the limit when the aircraft are adjacent the S pulse will appear spaced 2Z from the DIRECT pulse.

The movement of the S pulses for two aircraft which are not going to collide is as follows. The S pulse will initially follow closely behind the DIRECT pulse. As the two aircraft approach each other the S pulse will move to the right until the aircraft reach a point of closest approach. After this point the S pulse will move to the left, indicating that the range between the aircraft is increasing. In the case of a collision course the S pulse will continue to move to the right until it is spaced 2Z from the DIRECT pulse.

Referring now to waveform (*c*) in FIG. 2 the gating sequence which the ground reflected wave transmission system can utilize to eliminate aircraft which are beyond dangerous range or not at a dangerous altitude as well as the gating to define the S interval for computing possible dangerous aircraft conditions and for defining a proximity interval within which all aircraft are considered dangerous will be described. The first check made on incoming data is for altitude coincidence. Upon the receipt of a DIRECT pulse the receiver in the protected craft opens a gate which has spacing from the DIRECT pulse which is proportional to twice the altitude of the protected craft and has a width of $\pm 2h$. If the next DIRECT pulse from the intruder craft is received within this altitude interval the intruder craft is considered to be within the altitude danger zone of the protected aircraft.

The gating for processing the S pulse is as follows. Immediately following the altitude interval in FIG. 2(*c*) the system is gated off for a period of time corresponding to a range of twenty miles for example. This gate sets the limit for the maximum range of the system and if the S pulse is received during this time the range to the intruder aircraft is beyond that which the system will consider. This gating arrangement provides the advantage of the transponding systems in that range can ge gated out in this simple fashion.

At the end of the range OFF interval the S interval is established. If an S pulse arrives during the S interval it will be used in conjunction with the DIRECT pulse to measure range and compute the necessary criteria for a maneuver alarm if one is necessary.

Figure 9:
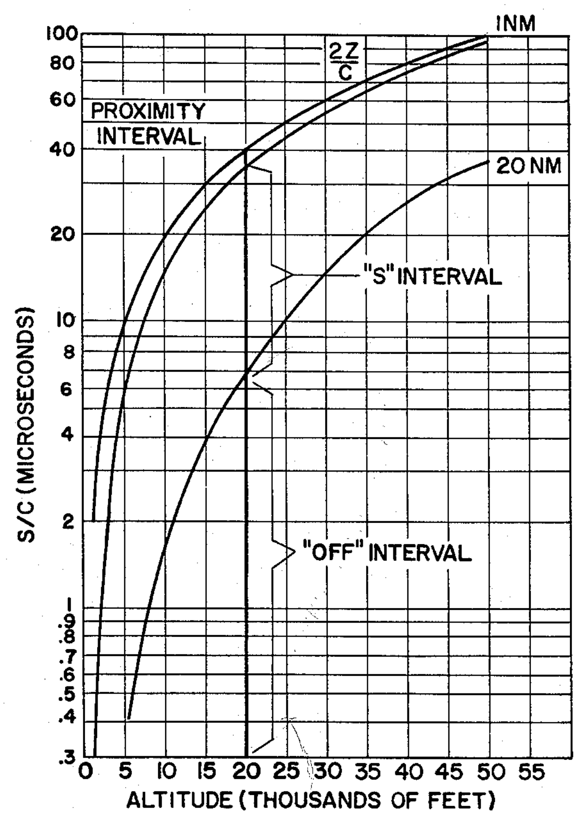
FIG. 9 is a graph showing the gating intervals of FIG. 2 as a function of altitude.

Following the S interval is the proximity interval. This is the period of time immediately preceding the next DIRECT pulse and if the S pulse appears during this interval the intruder aircraft is considered to be too close for safety and a maneuver may be indicated to the pilot without further computation. The relations between the OFF-interval, the S-interval and the proximity interval as a function of altitude are shown in FIG. 9. In the disclosed system the proximity gating as just described is not employed but a proximity criterion based on the computation of a quantity of $S_0$ is used as hereinafter described.

SYSTEM THEORY

The theory of operation of the system of the present invention can be understood by reference to FIGS. A and B which represent respectively the so-called collision triangle formed with the velocity vectors of the aircraft involved and the relation between real time and the variable $\tau$ as derived and utilized in accordance with the invention.

For unaccelerated motion in a plane (which need not necessarily be a horizontal plane) FIG. A represents the present positions and velocities of two aircraft located at points $P_1$ and $P_2$ respectively. Aircraft $P_1$ has a velocity $v_1$ in the direction shown and aircraft $P_2$ has a velocity $v_2$ in the direction shown. If the velocity vector $-v_2$ is drawn from the terminus of vector $v_1$ as shown the relative velocity vector $v$ (i.e. $v_1-v_2=v$) is obtained. The vector $r$ making an angle $\delta$ with respect to $v_1$ is the range between the two aircraft with $\delta$ being the bearing angle of $P_2$ with respect to $P_1$. If the relative velocity vector $v$ is extended and a perpendicular from point $P_2$ is dropped to the line $P_1P$, the distance of minimum separation $c$ is obtained. As long as the relative velocity vector $v$ does not lie along range vector $r$ (as indicated by angle $\theta$) the aircraft $P_1$ and $P_2$ cannot collide and the closest they will ever approach is given by the length of vector $c$. The length of the line from $P_1$ to P is the magnitude $vt$ where $t$ is the time to nearest approach. The vectors $r$, $vt$, and $c$ form a closed triangle with $c$ always perpendicular to $v$. This right triangle $P_1PP_2$ provides the following relation relating to the variables:

$$c^2=r^2-v^2t^2 \quad (1)$$

If the aircraft at $P_2$ had actually been at the point P then $c$ would be zero, the relative velocity vector $v$ would live along the line $P_1P$, which coincides with the range vector between the two aircraft at $P_1$ and P. The conditions for collision would be satisfied, the collision occurring at the point Q. As shown in FIG. A, however, with the aircraft at points $P_1$ and $P_2$, the aircraft from point $P_1$ will be at point Q after time $t$ and aircraft from $P_2$ will be at point U after time $t$ as determined by the displacement vectors $v_1t$ and $v_2t$. The miss-distance is then indicated by the vector $c$ between Q and U.

The collision triangle of FIG. A and Equation 1 derived therefrom are often used to obtain the well known criteria for a collision: $\dot{\delta}=0$ and $\ddot{r}=0$. The aircraft at $P_2$ sees the aircraft at $P_1$ advancing along a line drawn through $P_1$ in the direction of $v$. If $c$ is not zero the vector $r$ changes in magnitude and direction relative to $v$ whereas for a collision course only the magnitude of $r$ changes. Hence, the first criterion for a collision course is that the bearing angle remain constant or $\dot{\delta}=0$. The second criterion can be obtained by twice differentiating Equation 1 with respect to time to obtain $\ddot{r}=0$. While these criteria appear to afford a basis for evaluating the potential danger of an encounter, further data are necessary to determine whether the collision situation indicated is, in fact, critical. A second requirement for a system which utilizes these criteria is that the data be measured with sufficient accuracy. It has been determined that a self-contained collision avoidance system is incapable of practical realization because of the accuracy with which the data must be measured and that even cooperative systems which rely on the measurement of angular rates or range rates are impractical from the equipment standpoint in the present state of the art.

Referring now to FIG. B the relation between real time, $t$, the nearest approach for two aircraft subject to the conditions discussed in FIG. A and the range, $r$, between the aircraft will be described for the various possible conditions. For the collision case the miss distance $c$ will be zero when the time to nearest approach becomes zero and the quantity $c$ in Equation 1 becomes zero. The range, $r$, and time, $t$, are linearly related, therefore, in the collision case as shown by line 1 in FIG. B. Where the aircraft are not going to collide but have a miss distance equal to $c$, Equation 1 represents an hyperbola shown as curve 2 in FIG. B. The hyperbola 2 crosses the $r$ axis at range $c$ for time $t=0$ and approaches the straight line 1 as an asymptote for large values of $t$.

The quantity $\tau$ is defined by:

$$\tau=\frac{r}{\dot{r}} \quad (2)$$

where $r$ is range and $\dot{r}$ is range rate. This quantity $\tau$ has the dimensions of time and its relation to $t$ and hence the range variable $r$ is given by the dotted curve 3 in FIG. B. The relation between $\tau$ and real time, $t$, may be obtained from Equations 1 and 2 as follows. Differentiating Equation 1 we obtain:

$$r\dot{r}=v^2t \quad (3)$$

Multiplying Equation 2 by $$\frac{r}{r}$$

and substituting the value of $r$ and $\dot{r}$ we obtain:

$$\tau=t+\frac{c^2}{v^2}\cdot\frac{1}{t} \quad (4)$$

From an examination of the expression (4) it is apparent that value of $\tau$ closely approximates the value of $t$ for large values of $t$. As $t$ decreases the difference $(\tau-t)$ increases. This difference is one criterion upon which a collision avoidance system in accordance with the present invention may be based. A second characteristic of $\tau$ as a collision criterion is $\tau_{min}$, the minimum value of $\tau$, as indicate by curve 3. The range at which this minimum value occurs is $r=c\sqrt{2}$. Hence if a minimum were detected the miss distance $c$ would be equal to the $r$ value at minimum divided by $\sqrt{2}$.

Since the time, $t$, to minimum approach is not known in any given intruder situation the difference between this time, $t$, and the value of $\tau$ cannot be readily determined If the elapsed time from the first detection of an intruder is noted however, and the change in $\tau$ over this interval is likewise noted then the difference in these two quantities will provide a measure of whether or not $\tau$ is sufficiently different from time, $t$, to warrant the conclusion that no danger of collision exists. For example, if an intruder is detected at time $t_1$ in FIG. B and a succession of range measurements is available at that time, the value $\tau_1$ can be determined. If after an elapsed interval of time, say, to the point $t_2$ in FIG. B a second range measurement $r_2$ is made, $\tau_2$ can be computed. The threat evaluation can now be made by the determination of the truth of the following inequality:

$$\tau_1-\tau_2-(t_1-t_2)<0 \quad (5)$$

As long as the left hand side of the inequality (5) is a negative number the value of $\tau$ is changing slower than real time from which can be concluded that the $\tau$ curve is represented by the dotted curve 3 in FIG. B which corresponds with the range curve 2 having a predetermined miss distance $c$. The magnitude of the negative number determined by the inequality (5) must be sufficient to insure that it is not brought about by errors in range measurements from which the values of $\tau$ are computed. For this purpose the value of inequality (5) must reach a sufficiently large value to recognize that it is indeed $\tau$ which is different than time $t$ before a predetermined limit value of $\tau$, $\tau_d$, is reached in order that the aircraft will have sufficient time to maneuver if a maneuver is required. The magnitude of $\tau_d$ is prescribed by maneuver capability considerations. Thus for a large miss distance $c'$, as indicated in FIG. B, corresponding to range-time curve 2', the deviation of the curve 3' from the real time curve 1 will produce a large magnitude quantity from inequality (5) before the value of $t$ has fallen to a low enough value to require a maneuver at the $\tau_d$ point. For a $\tau_d$ value of 40 seconds however the curve 3 may very well provide such a small magnitude value in inequality (5) that the quantity cannot be distinguished from the values present due to errors in the range measurement before the time remaining for maneuver has dropped below the value of $\tau_d$, indicated as 40 seconds in FIG. B. In this situation the maneuver will be initiated when the measured value of $\tau$ falls to the value of $\tau_d$ irrespective of the evaluation of inequality (5).

In accordance with the present preferred embodiment of the invention the threat evaluation is made on the basis of a computation involving an inequality derived as follows. This inequality is derived by comparing measured values of $\tau$ determined by a plurality of range measurements at successive increments of time with the value $\tau_d$ and with the initiation of a maneuver alarm whenever the value of $\tau$ so computed drops below the safe $\tau_d$ value. In order to minimize the effect of errors in the range measurement a number of successive measurements are employed and these data are fit to a straight line defined by the following expression:

$$r = A - vt \tag{6}$$

where $r$ is range, A is the range value at the first range measurement, $v$ is the assumed slope of the range-time curve and $t$ is time measured from the first range measurement. A representation of this curve fitting technique is shown in FIG. C where the straight line $r=A-vt$ is drawn in relation to five successive measured range values $r_{-2}$, $r_{-1}r_0r_1$ and $r_2$. In the case shown in FIG. C these range measurements are subject to errors $\epsilon_i$ where $i$ is the number of the $r$ measurement. The relative size of the $\epsilon_i$ quantities shown in FIG. C have been enlarged for clarity of illustration and the least squares criterion for fitting a straight line to the data is employed to minimize the effect in computing $\tau$ of errors in measuring $r$.

Let the range measurements be taken over a time interval of $2n\Delta t$, and let a particular measurement be denoted by the subscript $i$ where $i$ takes on integral values (including zero), in the region $-n \leq i \leq n$. Then a general expression for each assumed range value is given by $$r'_i = A - (n+i)\Delta t v \tag{7}$$

According to the least squares theory, the best fit of a straight line to be measured data is obtained by minimizing the sum of the squares of the error terms, $\epsilon_i$, where $$\epsilon_i = r'_i - r_i = A - (n+i)\Delta t v - r_i \tag{8}$$

$$\sum_{-n}^{+n} \epsilon_i^2 = \sum_{-n}^{+n} [A - (n+i)\Delta t v - r_i]^2 \tag{9}$$

Setting the derivative of (9) with respect to A equal to zero we obtain:

$$\frac{1}{2}\frac{\partial \sum_{-n}^{+n} \epsilon_i^2}{\partial A} = \sum_{-n}^{+n} [A - (n+i)\Delta t v - r_i] = 0$$

which reduces to:

$$(2n+1)A - (2n+1)n\Delta t v - \sum_{-n}^{+n} r_i = 0 \tag{10}$$

Equating the derivative of (9) with respect to $v$ to zero results in:

$$\frac{1}{2}\frac{\partial \sum_{-n}^{+n} \epsilon_i^2}{\partial v} = -\sum_{-n}^{+n} [A - (n+i)\Delta t v - r_i](n+i)\Delta t = 0$$

which reduces to:

$$(2n+1)nA - (2n+1)n^2 v\Delta t - v\Delta t \sum_{-n}^{+n} i^2 - \sum_{-n}^{+n} (n+i) r_i = 0 \tag{11}$$

Combining Equations 10, and 11 and solving for A and $v$, $$A = \frac{-n\sum_{-n}^{+n} i r_i}{\sum_{-n}^{+n} i^2} + \frac{\sum_{-n}^{+n} r_i}{(2n+1)}$$

$$V = \frac{-\sum_{-n}^{+n} i r_i}{\Delta t \sum_{-n}^{+n} i^2}$$

$\tau$ is defined as $\tau = r/-\dot{r}$; therefore, it follows that $$\tau_i = \frac{A - (n+i)\Delta t v}{v}$$

At the center of the time interval $2n\Delta t$, $i=0$; therefore the value of $\tau$ at this point is:

$$\tau_0 = \frac{A - n\Delta t v}{v} = \frac{A}{v} - n\Delta t$$

or $$\tau_0 = \left[\frac{-n\sum_{-n}^{+n} i r_i}{\sum_{-n}^{+n} i^2} + \frac{\sum_{-n}^{+n} r_i}{2n+1}\right]\left[\frac{-\sum_{-n}^{+n} i^2 \Delta t}{\sum_{-n}^{+n} i r_i}\right] - n\Delta t$$

Simplifying this expression $$\tau_0 = \frac{-\Delta t \sum_{-n}^{+n} r_i \sum_{-n}^{+n} i^2}{(2n+1)\sum_{-n}^{+n} i r_i}$$

As previously stated, the decision to manuever will be based on whether $\tau_0 > \tau_d + n\Delta t$ where $\tau_d$ will depend on how much time is required to maneuver. Therefore, if $$\frac{-\Delta t \sum_{-n}^{+n} i^2 \sum_{-n}^{+n} r_i}{(2n+1)\sum_{-n}^{+n} i r_i} > \tau_d + n\Delta t \tag{12}$$

no maneuver is necessary.

For computational purposes (12) may be simplified as follows: Multipy both sides by $$-(2n+1)\sum_{-n}^{+n} i r_i$$

to obtain:

$$\Delta t \sum_{-n}^{+n} i^2 \sum_{-n}^{+n} r_i > -(\tau_d + n\Delta t)(2n+1)\sum_{-n}^{+n} i r_i$$

or, $$\sum_{-n}^{+n} r_i > -\frac{(\tau_d + n\Delta t)(2n+1)}{\Delta t \sum_{-n}^{+n} i^2} \sum_{-n}^{+n} i r_i \tag{13}$$

The coefficient $$\frac{-(\tau_d + n\Delta t)(2n+1)}{\Delta t \sum_{-n}^{+n} i^2}$$

will be constant for given $n$, $\tau_d$ and $\Delta t$; therefore let it be equal to F.

Then (13) becomes:

$$\sum_{-n}^{+n} r_i > F \sum_{-n}^{+n} i r_i$$

The range is computed in the ground reflected wave system by utilizing the expression $$r = \frac{2Z_1Z_2}{S} - \frac{S}{2}$$

where $Z_1$=altitude of protected craft
$Z_2$=altitude of intruder.

Hence, $$2Z_1Z_2\sum_{-n}^{+n}\frac{1}{S_i}-\frac{1}{2}\sum_{-n}^{+n}S_i>2Z_1Z_2F\sum_{-n}^{+n}\frac{i}{S_i}-\frac{F}{2}\sum_{-n}^{+n}iS_i$$

$$2Z_1Z_2\sum_{-n}^{+n}\frac{1}{S_i}(1-Fi)>\frac{1}{2}\sum_{-n}^{+n}S_i(1-Fi) \qquad (14)$$

Substituting a new variable x where $S_i=2Z_1x_i$ (14), becomes:

$$Z_2\sum_{-n}^{+n}\frac{(1-Fi)}{x_i}>Z_1\sum_{-n}^{+n}x_i(-Fi)$$

For altitude coincidence $Z_2=Z_1$, hence:

$$\sum_{-n}^{+n}\frac{(1-Fi)}{x_i}\sum_{-n}^{+n}x_i(1-Fi) \qquad (15)$$

For any particular aircraft and collision avoidance system Eqn. 15 can be further simplified by introducing the constants of the system. Thus for $n=2$, $\Delta t=5$ seconds and $\tau_d=40$ seconds, $F=-5$, and (15) becomes:

$$\sum_{-2}^{+2}\frac{(1+5i)}{x_i}>\sum_{-2}^{+2}x_i(1+5i)$$

which for evaluation may be written:

$$\sum_{-2}^{+2}(1+5i)\left(\frac{1}{x_i}-x_i\right)>0 \qquad (16)$$

If (16) is true, no maneuver is necessary.

In any CAS which makes successive range determinations, the criterion of Equation 12 can be expressed in terms of successive range measurements as follows. If, for example, $n=2$ (five range observations):

$$\tau_2=-2\Delta t\left[\frac{r_{-2}+r_{-1}+r_0+r_1+r_2}{-2r_{-2}-r_{-1}r_1+r_2}+1\right]>\tau_d$$

The above expression can be evaluated for range values obtained by any method such as transponding, for example, and if the inequality is true no maneuver is necessary.

PROXIMITY CRITERION $S_0$

A proximity criterion will, in general, be required where the ratio of $c/v$ is so large that the value of $\tau$ is not a safe indication of the magnitude of time to nearest approach. In the ratio $c/v$, $c$ is the distance to nearest approach and $v$ is the relative velocity. This proximity criterion is designated the $S_0$ criterion and represents an S value below which the actual measured S value will not be permitted to fall without the initiation of an alarm. By the addition of this second criterion the cases which involve slow closure rates (where the time to nearest approach may be relatively long and yet the aircraft are so close that any slight deviation from the course could make a collision imminent) are rendered harmless. Thus assuming that a one mile separation is necessary for safety under all conditions the proximity criterion $S_0$ can be computed to produce an alarm whenever the aircraft approach one another by a distance less than one mile.

Where data are exchanged by the ground bounce broadcast transmission technique the $S_0$ criterion can be determined from the following considerations. The relation between range $r$ and the value S can be written:

$$2Sr=4Z_1Z_2-S^2$$

which can be solved for S:

$$S=r\pm\sqrt{r^2+4Z_1Z_2}$$

Where $h$ is the actual altitude separation $$h=Z_1-Z_2$$

and the above expression for S becomes $$S=-r\pm\sqrt{r^2+4Z(Z+h)}$$

or $$(S+r)^2=r^2+4Z(Z+h)$$

If the minimum range $r$ which can be tolerated is, say, one mile the value of S in the above expression must be smaller than the corresponding value $S_0$ for this minimum range. This criterion will be met if the following equation is true:

$$r^2+4Z(Z+h-k_3)-(S+r)^2\geqq 0$$

In evaluating this expression the value for $r=1$ mile is used and the constant $k_3$ is subtracted to provide a safety factor sufficient to compensate for any tilt of the reflection plane as described hereinafter. The effect of $k_3$ is to cause a proximity alarm to be initiated earlier (i.e., at greater range) than would occur if $k_3$ were not used in the above expression. The value assigned to this constant is $k_3=20$ counts.

With the value of $r=1$ mile the binary arithmetic value is equal to 100 counts, the value of $k_2$. The value of 100 counts results from the constants of the system in which the propagation velocity of the signals is approximately 5 microseconds per mile and with the burst transmission pulse rate of 20 megacycles producing 20 counts per microsecond, the equivalent total counts for a mile separation is 100 counts. $K_1$ thus has a value of 10,000 counts corresponding to the value of $r^2$ for $r=1$ mile. The altitude value Z and altitude separation value $h$ are likewise converted into counts for the computation. Since the $h$-measuring unit (FIG. 21) produces a binary output quantity $p=30-h$ the expression actually evaluated is obtained by substituting the value $(30-p)$ for $h$ to obtain $$r^2+4Z(Z-p+10)-(S+r)^2=0$$

As described in connection with the computer hereinafter, S values when received are first processed in accordance with the $S_0$ criterion given above to determine whether or not the equation produces a value greater or less than 0. Since large values of S correspond to small values of range between the aircraft as soon as the equation evaluates to produce a quantity less than 0, a negative quantity, the proximity criterion has been met and the range between the aircraft is less than one mile. Accordingly for this condition an alarm calling for a maneuver is initiated.

*The basic concept*

The geometrical considerations involved in the disclosed system will be described with reference to FIGS. 1A through 1G. Referring to FIG. 1A, let Q be an aircraft in flight over terrain capable of reflecting an electromagnetic signal. Suppose that at a given instant Q emits a signal omnidirectionally, of such nature that its arrival at a distant point can be detected and the time of arrival can be accurately determined. Any second aircraft P in the vicinity will receive this signal, not once, but twice or more often, over several propagation paths. Obviously, the shortest of these is the direct air-to-air path QP, and the first signal arriving at P will be the one which traversed this path. Lacking prior information as to its source or time of emission, P can extract no information from this signal alone except that there is another craft nearby. However, P can use this first signal as a reference from which to time the arrival of later signals.

All these later arrivals will be the same emitted signal, reaching P by various reflection paths. Among them there will be one shortest path (or conceivably several of equal length but shorter than all the others). The *first* signal following the reference signal at P will arrive by this path (or paths). By timing the interval between the reference signal and this first reflected signal, P obtains a measure of the difference in length between the direct air-to-air path and the shortest reflection path. All later reflected signals are ignored.

It is apparent that from this difference measurement alone P cannot determine the location of Q or even the range to Q. The measurement can be made useful only by combining it with other data. The nature and quantity of these other required data are herinafter considered.

*The ideal geometry*

Suppose now that the terrain over which P and Q are located is flat and level; e.g., water or the midwestern plains. The shortest reflection path is readily singled out geometrically. Assume (for the moment) that the reflection is specular. Let AB in FIG. 1A be the reflecting surface and let P′ be the reflection of P itself. Then the situation is simply that of the familiar mirror image—there is only one reflection path, equal in length to the straight line QP′ and determined by the intersection of QP′ with AB. It is quite immaterial whether this point and path are obtained by drawing QP′ as FIG. 1A shows, or by connecting P to the image of Q instead; hence Q will receive precisely the same data from a signal emitted from P as P receives from Q's signal. But if the perpendicular distance from *either* P or Q to AB were changed, both path lengths would change, and likewise the difference between them. Hence both these perpendicular distances are the additional data needed to compute the range QP.

In any real physical case the reflection will not be specular. There will be other reflection paths, such as those shown dotted in FIG. 1B, perhaps many of them. But the equivalent path to P′ corresponding to any one of these is a broken line, and hence longer than QP′. The geometry of the *first* reflected signal is still that of FIG. 1A, and the conclusions just drawn are equally valid whether the reflection is specular or not. In effect, the device of timing only this first signal and ignoring all later ones reduces the problem to one of mirror images in either case. In the following text, the phrases "reflected signal" and "reflected path" will refer to this first signal and its path unless otherwise indicated.

Under the hypothesis of flat and level terrain, the perpendicular distances required as additional data are simply the altitudes of P and Q; or more precisely, their terrain clearances. Each craft is assumed to know its own terrain clearance obtained either directly from a radar altimeter, or by subtracting local terrain elevation from a barometric altimeter reading. Each transmits its own altitude to the other; for example, by replacing its emitted signal several times at a spacing linearly related to its altitude. Each could then compute the range between them.

*Range computation*

Given both altitudes and the difference in direct and reflected paths, the computation of range—slant or horizontal or both, as desired—is straightforward. The details are shown in FIG. 1C.

Let $S=QOP-QP$, $h=z'-z$. By similar triangles $OP'=OP$; hence $QP'=r+s$. In right triangle QP′C, $(r+s)^2=(z+z)^2+x^2$. In right triangle QPC, $r^2=(z'-z)^2+x^2$.

Eliminating $x$: $r=(4zz'-s^2)\div 2s=(4z^2+4zh-s^2)\div 2s$

Eliminating $r$: $x=\sqrt{(4z^2-s^2)(4z'^2-s^2)}\div 2s$

It is seen that S is small for large $r$ (or $x$). Hence automatic exclusion of communication with aircraft beyond a selected maximum range may be accomplished simply by blanking the receiver for a corresponding precomputed interval following arrival of each reference signal. Only those reflected signals which originate from within the chosen range will arrive late enough to find the receiver active again and thus be accepted.

As $r$ (or $x$) decreases, S increases. Its maximum possible value is twice the lesser of the two altitudes and will occur only if and when one aircraft is directly over the other. Hence an automatic warning of approach to a selected minimum range is also available. It is only necessary to gate the receiver so that any received S *within* a corresponding precomputed difference from the maximum possible value will actuate the warning.

Appropriate gating also will automatically exclude all aircraft at sufficient altitude separations to be disregarded. The first received signal of any series can be caused to generate a repetitive gate in the receiver, spaced as a linear function of the *receiving* aircraft's own altitude, and having a width proportional to the altitude zone from which reception of signals is desired. Subsequent signals coming from aircraft not in this zone will be outside this gate and will be rejected.

It is obvious that altitude errors, whatever their cause or source, will create errors in computed range. An examination of such errors is therefore in order. This examination will be facilitated by first noting that the reflection geometry and the range computaton derived from it do *not* in fact involve altitude as such. The parameters $z$ and $z'$, from a purely geometrical point of view, are simply perpendiculars to a reflecting plane. The geometry is in no wise dependent on the orientation of this plane. It might be imagined to occupy any position whatever. The geometrical reasoning and the range computation would proceed precisely as stated, and the computed range would be precisely correct, provided only that the correct perpendicular distances to this plane were known and used for $z$ and $z'$. The notions of "vertical" and "horizontal" enter the problem only through the introduction of physical altimetry to measure these distances.

It is particularly important to bear this fact in mind in the analyses of terrain effects.

*Rough-country geometry*

Suppose as before that aircraft Q emits a signal and P receives this signal over both a direct and a shortest reflected path and measures the difference in arrival times. Now, for the moment, suppose that both the configuration of the terrain below and the location in it of the point physically responsible for the first reflected signal are totally unknown. What, if any, useful information is afforded to P In FIG. 1D let Q be the real location of the emitting aircraft and M the real location of the reflecting point, both initially unknown to P. In the notation of the previous figures, $r=QP$, $r+S=QM+MP$; of which only S has been measured and *is* known. The locus of points from which this particular S *might* be coming is readily available. For any given measurement $r$ is unknown but fixed; S is known; hence $r+S$ is unknown but fixed. The locus of points in space, the sum of whose distances from two given points is constant, is an ellipsoid of revolution whose major axis is the line joining the given points and whose foci are the points themselves. The vertical section of this ellipsoid is shown in FIG. 1D.

If the physical reflected signal were coming not from M but from some other point on the ellipsoid, the measured S at P would be precisely the same. The really important thing in the geometry is not after all the point M as such. It is the *reflecting ellipsoid* passing through M. An immediate corollary is that there cannot be any point of terrain *inside* the ellipsoid which is capable of reflecting; for if there were it would determine a *shorter* path and cause a still earlier signal at P. There may be—often there will be—many reflecting points *outside* the ellipsoid; these will produce a train of following signals; possibly indistinguishable from that from M except only that they do follow it. But this is distinction enough.

Another corollary is that the real reflecting point M will not usually be either the highest point or the lowest point in the area, but somewhere between. Even more significant, however, is that the *lowest* point O of the ellipsoid is seldom ever as high as M (never higher), and seldom as low (never lower) as the low places in the area. Most often the point O will be suspended in midair, and will tend to lie somewhere near the *mean* local elevation. Now the tangent plane AB to the ellipsoid at O *is* flat and level, whatever the terrain; and the reflected signal might as well be coming from O itself, so far as any of the geometry is concerned. The *virtual reflecting plane* AB has no physical existance, but nonetheless it is real key to the geometry and to the analysis of range measurement.

It is apparent at once from the foregoing discussion that, in effect, the reflecting ellipsoid and the virtual reflecting plane constitute an exceedingly effective smoothing device; indeed, the rougher the terrain the more effective the smoothing is. It has been stated that the plane tends to lie near the mean local elevation. Hence, if this is known and used in computing range, the accuracy will usually be an order of magnitude or so above what might be anticipated over rough areas. However, the coincidence with mean elevation is not exact and errors do result. Moreover, these errors vary. As the aircraft P and Q move, the ellipsoid and the plane change in size, shape, and location. But these changes also tend to be gradual and smooth; in particular, abrupt or discontinuous change is impossible. For example, the ellipsoid can never leap from one point to another; it can and will shift slowly about the reflection point of the moment, settle slowly on another—possibly distant point—then lift slowly away from the first. The action is somewhat analogous to that of a large wheel rolling over a rutted surface. (Note that the "wheel" is much larger than the ellipse itself. *The radius of curvature* of a flattish ellipse in the flattish part is several times greater than the longest radius of the ellipse itself.)

It is difficult to give meaningful specific numbers for the effective altitude errors due to rough terrain. These would not only require detailed specification of the terrain configuration but also would depend on locations, altitudes, and ranges themselves. However, a quite limited series of actual geometric constructions has been carried out, using contour maps of mountainous areas. It suggests that if mean local elevation is used, the variable altitude error component will seldom be more than 5 to 10 percent of the physical terrain variations from this mean elevation. There are few areas regularly traversed by aircraft in which such percentage errors could exceed a few hundred feet at worst.

In considering the CAS implications of altitude errors it is essential to remember that the disclosed embodiment employs altitude in two quiet distinct ways. It uses altitude separation as such as the means to safety; hence, the decision *whether* to maneuver and if so how much, are based on existing altitude separation, directly compared. In this use terrain-induced effects do not enter at all. It also uses altitudes to compute range, hence time, hence *when* to maneuver if maneuver is required. Terrain-induced errors do affect this use; but only to cause the manuever to be begun earlier or later than if they were not present. The qualitative effects on range and time will now be considered.

*Geometry for radar altimetry*

In the previous discussion of rough country geometry the choice of the horizontal tangent plane is appropriate for a barometric altimetry system, since this choice makes the perpendiculars verticals. This may not be so if a radar altimeter is used instead and the terrain is rough. The use of radar altimetry is however attractive, since it only involves timing one's own ground echo against one's own emitted signal. This requires precisely the same equipments operated in precisely the same way as in timing a remotely produced signal against its own remotely produced reference. In fact operation in the altimeter mode would occur only at times when this equipment must otherwise stand idle; i.e., during its own transmission.

The geometrical modifications needed to fit precisely a radar-altimetry system are shown in FIG. 1E. P's own reflected signal will come from some usually unknown point N, not necessarily vertically underneath (but necessarily not inside the ellipsoid, since otherwise the shortest reflection path for Q's signal would be from this point too). From here the reasoning is identical to that for the ellipsoid in the discussion of FIG. 1D: the reflecting surface for P's signal is a sphere with P as center and PN as radius. In fact, a sphere may be considered as the special case of an ellipsoid in which the two foci coincide at the center. The appropriate choice of the reference plane is now the *common tangent* to sphere and ellipsoid, since the perpendicular distance to this plane from P is the radius of the sphere. The measured radar altitude thus becomes the correct $z$ to use in range computation, whether vertical or not, and quite regardless of terrain confiugation, *which cannot now cause any geometric error*.

The virtual reflection point O for Q's signal now moves to the new tangent; but it is still on the ellipsoid and still represents the same S. Hence, it likewise cannot cause any geometric error.

There remains only one possible source of geometric error: the perpendicular distance $z'$ from Q to the new reference plane. In general, this plane is *tilted*. There are two effects. First, $z'$ is not vertical and hence is related to any vertical distance—such as barometric altitude—by a cosine factor. This effect, however, is negligible, since the cosine differs only minutely from unity even for angles of considerable size. Second, the tilt causes an increment $\Delta Q$ in the actual length of the Q perpendicular equal to the range times the sine of the tilt angle $\theta$. This can be a considerable quantity, even for small tilt. Fortunately it is worse at long range. Accuracy tends to improve sharply as range shortens, both because of the range factor itself and because usually the tilt also becomes less. This may be seen by considering an extreme case in which horizontal separation is very small. All the reflections are nearly certain to come from the same point, and the rougher the country the more likely this is to be the case. But this implies that the ellipsoid is nearly a sphere with nearly the same center and radius as the sphere about P. The tangent must be nearly level in such a case.

If barometric altitude is used to determine the altitude difference between P and Q, the foregoing discussion amounts to saying that terrain error is equivalent to an altitude error equal to range multiplied by sine of tilt angle. If radar altitude is used throughout by both aircraft, each has its own altitude sphere, unknown to the other, and hence its own tilt angle. The two tilts may not be the same. In this case the error is range multiplied by the sine of the difference between the tilt angles.

The smoothing effect noted in the previous section as applying to the location of the horizontal reference plane also applies to tilt, perhaps even more strongly. Tilt angles of more than two or three degrees will be very rare. Unfortunately even these are significant. For example, at 10-mile range the equivalent altitude error is a thousand feet per degree of tilt (or tilt difference in all-radar system). Hence it is essential to consider the effects of errors of such size.

*Errors of measurement*

The foregoing has been devoted to errors of geometry; more strictly to errors caused by using numbers physically obtained from one geometric configuration but computing with them as if they referred to a different configuration. Errors in the physical measurements themselves are in a different category, but with certain reservations, the previous analysis may be made to fit these errors also. For example, suppose radar altimetry is used at P. For simplicity say the terrain is level; but the apparatus malfunctions in some way and its output is a number differing by a thousand feet from the true altitude over terrain. There is a real sphere which indeed has this radius. Geometrically, the fact that this sphere may be suspended a thousand feet clear of the earth or may dip a thousand feet into it makes no difference; it only puts an *artificial* tilt on the reference plane. If the true perpendicular distance $z'$ from Q to *this* plane could be found and used, the range would come out exactly right, in spite of the malfunction. If not, the range would be wrong, but only by the amount and for the same reason as if an unknown hill or depression lay under P, so that to affect z but not S.

All other measurement errors the system can commit may be analyzed in the same way. In their effects on range, all are equivalent to altitude errors at Q, whatever their real nature or cause. These effects may all be determined therefore, merely by considering what P gets from his computer when he uses one altitude for Q when in fact Q is at another.

*Errors in computed range and time*

In FIGS. 1D and 1E the reflecting ellipsoid was determined by holding P and Q fixed and determining the locus of reflecting points which would all produce the same value of S. Now let P and the reflecting plane be held fixed (hence also P'), and determine the locus of positions for Q which will produce the same value of S. That is to say, both r and $r+S$ may change, but S may not. The locus of a point the *difference* of whose distances from two fixed points (P, P') remains constant is a *hyperboloid* of revolution about the line joining the points, with the points themselves as foci. A vertical section of such an hyperboloid is drawn in FIG. 1F. Wherever Q may be located on the hyperboloid, it will produce the same S at P; wherever located not on the hyperboloid, it will produce a different S.

Now if P uses the altitude represented by $Q_1$, in his range calculation, he will get $PQ_1$, as the range; but if the real altitude of Q is that of $Q_2$, then Q will be at $Q_2$ and its real range will be $PQ_2$. Plainly the range error will be large—several times the altitude error itself in most situations. If S is small, the hyperboloid is flattish and shallow, so that a small altitude error will move Q far in or out, and range determination tends to be poor. If S is large (it cannot be larger than $2z$) the bowl is wrapped closer about P, with steeper sides; the same altitude error would have less effect on range. But unless range is very short the error still is substantial. FIG. 1G shows a succession of these range bowls, for different values of S.

The conclusion must be drawn that good range determination demands not only accurate measurement of S itself, but accurate altitude. Both require good equipment. But the last requires more: either a favorable terrain, or else extensive knowledge of terrain configuration, of the aircraft's position over the terrain, and of the corrections appropriate to both. To make a ground reflection system an accurate ranging system is plainly difficult. Fortunately it also is not necessary.

Range is not an end in itself, but only a means to an end. The real requirement is a good computed value of *time*. Now, referring to FIG. 1G, draw any line passing through or near P. Suppose a second craft Q approaching P on this line. It will cut the range bowls in succession, generating a corresponding succession of increasing values of S at P as it does so. Figuratively speaking, P can draw a line; the right one if P's altitude data are correct; a totally wrong one if there are errors in altitude, either of P or of Q. No matter; P is not interested in lines but in time. P will get time by using the ratio of last computed range to the difference of prior computed ranges (actually a more sophisticated scheme using several ranges to get an averaging improvement in accuracy, but the same argument applies). FIG. 1G shows the solution which can be proved by rigorous calculation. The same altitude errors that give the wrong ranges and wrong line *also* give a proportionally wrong set of *range differences.* The range divided by the range difference—*that is, the time*—comes out very nearly correct, even if the ranges themselves come out far from correct.

The only class of errors that can spoil this scheme are *random* errors, those that vary without consistency or pattern from one measurement to the next. These errors can come from poor measurements. However, terrain errors are *not* of this class, except in very small degree. Instead, they are relatively smooth, consistent, and in this case, harmless.

*Climb and descent*

FIG. 1G also shows the answer for climbing and descending aircraft. So far as ground reflection, range, and time are concerned, climb and descent make no real difference. The lines cutting the hyperbolic bowls in FIG. 1G were not stipulated to be horizontal. They do not need to be. The ratio of last range to previous range difference gives time equally well whether the lines are horizontal or not. In fact this ratio gives *exactly* the correct time on the steepest of all the lines: the vertical leading upward to P itself.

Hence climb and descent, pose no problem in computing time by a ground-reflection scheme. The problem is in quite a different area: that of maintaining vertical separation, and hence, safety.

The two aircraft will occupy the same altitude at *some* time. They will be safe if this time is different from their time of nearest approach. The time of nearest approach is computed by the range method as described earlier. The time at same altitude can be computed using altitude data alone. (This may be from barometric data whether the range-computation is or not, and vice versa.) If the two times *do not* coincide within a chosen safety margin, do nothing. If they do coincide within this margin, change the time at same altitude. If the time at same altitude is the earlier, but not enough earlier, make it so by turning *toward.* More precisely, let the lower craft increase its rate of climb and the higher craft increase its rate of descent, just enough so that at the predicted time of nearest approach they have already passed vertically, and the vertical separation is at the prescribed figure for safety, with the climbing aircraft on top.

Similarly, if the predicted time at same altitude is later, but not enough later, than the time to nearest approach, make it so by turning *away.* In this case the climbing craft passes below the other.

It can be seen that this is quite consistent with the procedure for level flight. In fact the latter is only a special case under the general rule. In level flight altitude rates are zero; hence, predicted time to same altitude is infinite and the aircraft always turn away.

GENERAL SYSTEM DESCRIPTION

Figure 3:
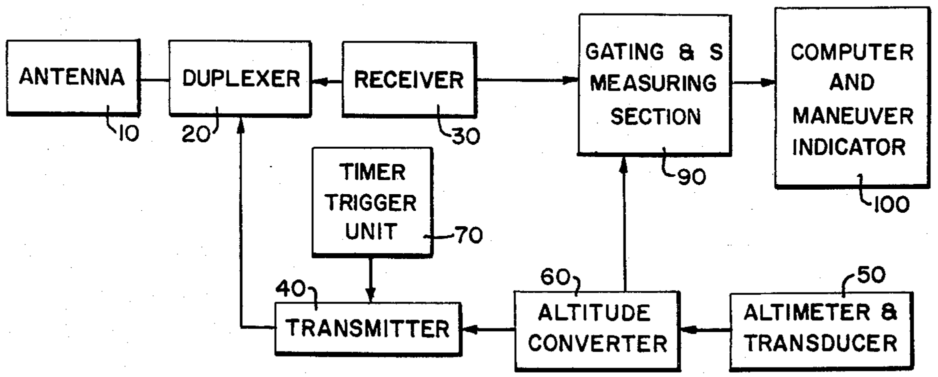
FIG. 3 is a block diagram of a complete station.

A complete station for accomplishing the interchange of information and the measurement and utilization of the necessary data for a collision avoidance system is shown in FIG. 3 in block diagram form. This system utilizes an omni-directional antenna 10 which is connected for both transmission and reception through a duplexer 20 to a receiver 30 and a transmitter 40. The transmitter 40 is controlled by the altitude of the aircraft in which the station is installed and for this purpose an altimeter and transducer 50 are arranged to supply altitude data to a converter 60 which converts altitude data into an appropriate control signal for controlling the transmitter 40. The burst interval of the transmitter 40 is controlled by a timer trigger unit 70 which makes the repetition interval of the transmission bursts accurately spaced for utilization by receiving aircraft in identifying and cataloging data received from particular aircraft. The receiver 30 applies the detected output signal to a gating and S measuring section 90. The output of the gating unit 90 is applied to a computer and maneuver indicator 100 which utilizes the data so applied to evaluate the threat of collision in accordance with predetermined criteria and produce an indication of an escape maneuver to be taken should one be required.

Figure 4:
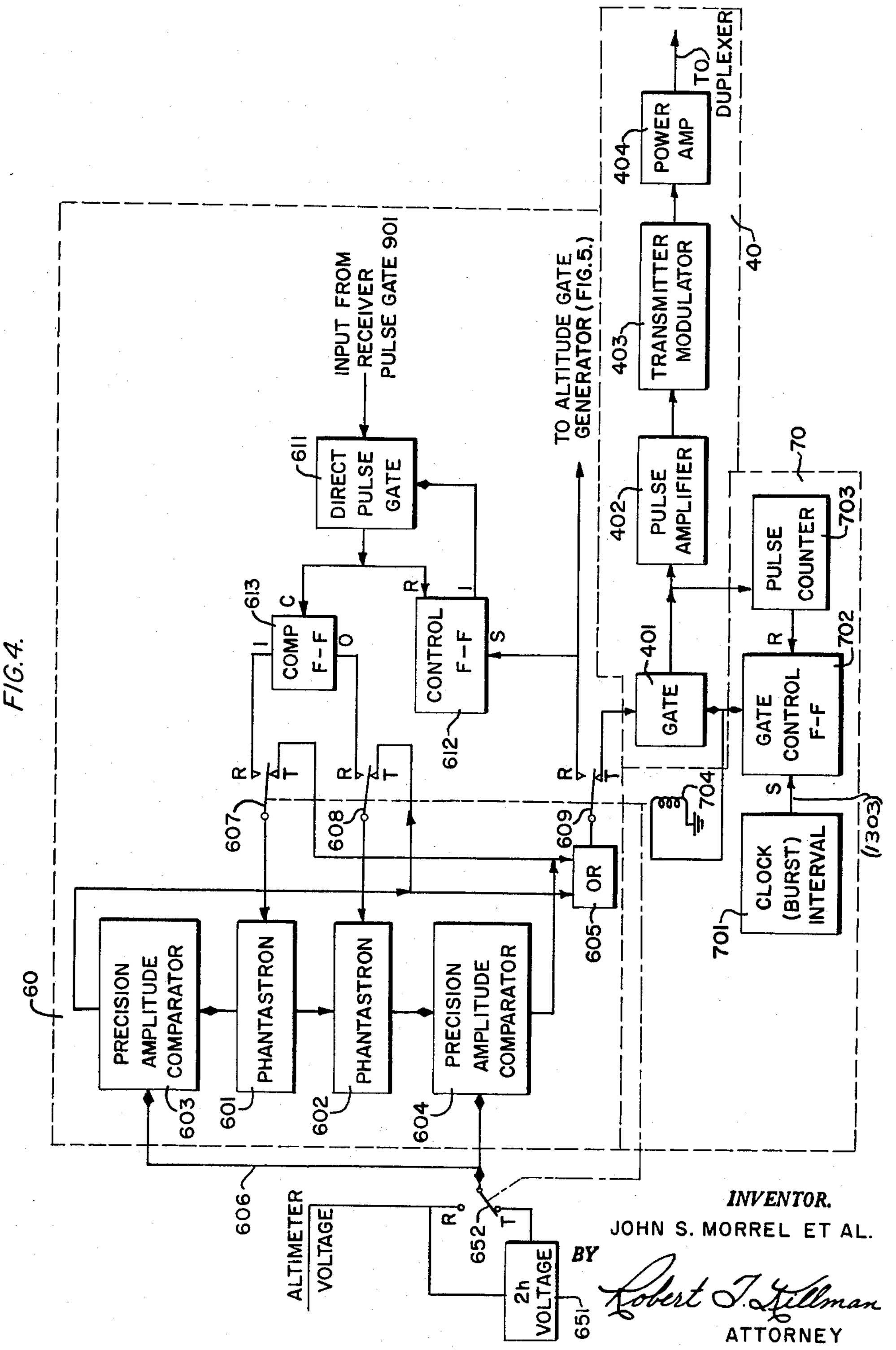
FIG. 4 is a block diagram of an altitude converter and burst generator in which the burst generator represents the equipment of a minimum equipped station.

In FIG. 4 a block diagram is shown including the altitude converter 60 and the transmitter 40, arranged with suitable switching to provide both transmit and receive functions alternately in a complete station. The switch connections are shown for the station in the transmit mode and in this mode the station equipment that is operating in FIG. 4 corresponds to the equipment required in a minimum equipped station wherein only transmission occurs. The complete station will include the transmit and receive functions provided by the equipment of FIG. 4.

The control of the transmit and receive function is effected by the timer trigger device 70. The timer 70 provides from an accurately controlled timing device 701 an output pulse every five seconds, for example, which conditions a gate control flip-flop (FF) 702 to enable a gate 401 in the transmitter 40. The gate 401 in the transmitter when enabled passes pulses received from the altitude converter 60 to a pulse amplifier 402 which drives a transmitter modulator 403 to modulate a power amplifier that supplies through the duplexer 20 the antenna 10 of the system. The pulses out of the gate 401 are also applied to a pulse counter 703 which is set to count 20 pulses, for example, and produce an output at the twentieth count which changes the state of the control gate FF 702 thereby disabling the gate 401. Thus by means of the timer trigger unit 70 and the operation of the gate 401 the transmitter transmits bursts of 20 pulses with the bursts spaced at intervals determined by the burst interval clock 701 and with the number of pulses in each burst determined by the predetermined count set in counter 703 necessary to produce an output to the FF 702.

The nature of the pulse transmissions in each burst will be determined by the signals applied to the gate 401 from the altitude converter unit 60. The altitude converter 60 comprises two phantastron pulse delay circuits 601 and 602 connected through amplitude comparator circuits 603, 604 of the multiar type in an astable loop such that the output pulse from one amplitude comparator 603 triggers via switch 608 the phantastron 602 and the output of the multiar 604 triggers via switch 607 the phantastron 601. The outputs of each multiar 602 and 604 are also applied as inputs to an OR circuit 605. With this arrangement the phantastrons 601 and 602 are alternately triggered and each is permitted to recover from the voltage rundown after triggering during the period when the other phantastron is providing the voltage rundown. In order to make the period generated by the astable loop formed by the phantastrons 601 and 602 representative of altitude, the multiars 603 and 604 have a reference voltage set by an input 606 from a linear potentiometer controlled by a standardized barometric altimeter device. This input voltage level applied on line 606 permits the multiars 603 and 604 to generate an output pulse whenever the phantastron rundown voltage crosses the threshold established on the input line 606. During transmission the voltage on line 606 is the altitude voltage combined with a voltage proportional to $2h$ supplied by source 651 which is connected in series during transmission by switch 652. Thus the trigger output of the multiars 603 and 604 is a pulse train the spacing between pulses being directly proportional to the altitude of the aircraft as determined by the pressure sensing device which controls the voltage on line 606, the spacing being increased by $2h$ during transmission.

The OR 605 supplies the multiar pulses to the coincidence gate 401 which is conditioned to permit these pulses to pass when the burst interval clock 701 provides a set pulse to the gate control FF 702. The output pulses from the coincidence gate 401 are amplified and fed to the modulator 403 and the pulses are also counted in the counter 703. When the count in the counter 703 reaches twenty the pulse counter 703 resets the gate control FF 702 and no more pulses will pass through the gate 401. The burst interval clock 701 provides an output pulse every five seconds to permit a burst of pulses to pass through the gate 401. The five second interval is generated in the burst interval clock 701 by counting down from an approximately 400 cycle tuning fork stabilized oscillator in order to obtain an interval accuracy of .001 percent which provides the identification of individual aircraft in the storage drum of the computer as will hereafter appear.

A transmit-receiver relay 704 is controlled in synchronism with the output of the burst interval clock 701 to mtaintain contacts 607, 608, 609, 652 connected to contacts T during the interval of transmission. At all other times the switches 607, 608, 609, 652 are in contact with the contacts R to permit the received signals to be compared with the altitude of the protected aircraft for altitude correspondence.

When the system is operating as a receiver with switches 607, 608, 609, 652 against contacts R the received pulses will be passed by a DIRECT pulse gate 611. The pulses passing the DIRECT pulse gate 611 reset a control FF 612 thereby applying a disabling potential from the ONE output of FF 612 to the DIRECT pulse gate 611. The output of the gate 611 also drives a complement FF 613 which triggers one of the two phantastrons 601 or 602. After a delay proportional to the receiving aircraft's own altitude as determined by the phantastron circuits 601, 602 a pulse will be sent to an altitude gate generator 902 (FIG. 5) and also to set the control FF 612 such that the next received pulse will pass the DIRECT pulse gate 611 thereby applying a reset pulse to FF 612 closing pulse gate 611 and again changing the statae of complement FF 613 to trigger the other phantastron circuit thereby repeating the cycle of amplitude comparison.

It will be understood that a constant time delay can be introduced into the system in both transmitting and receiving modes to compensate for delays inherent in the circuits, for example, without altering the basic operation of the system.

S-MEASURING UNIT

Figure 5:
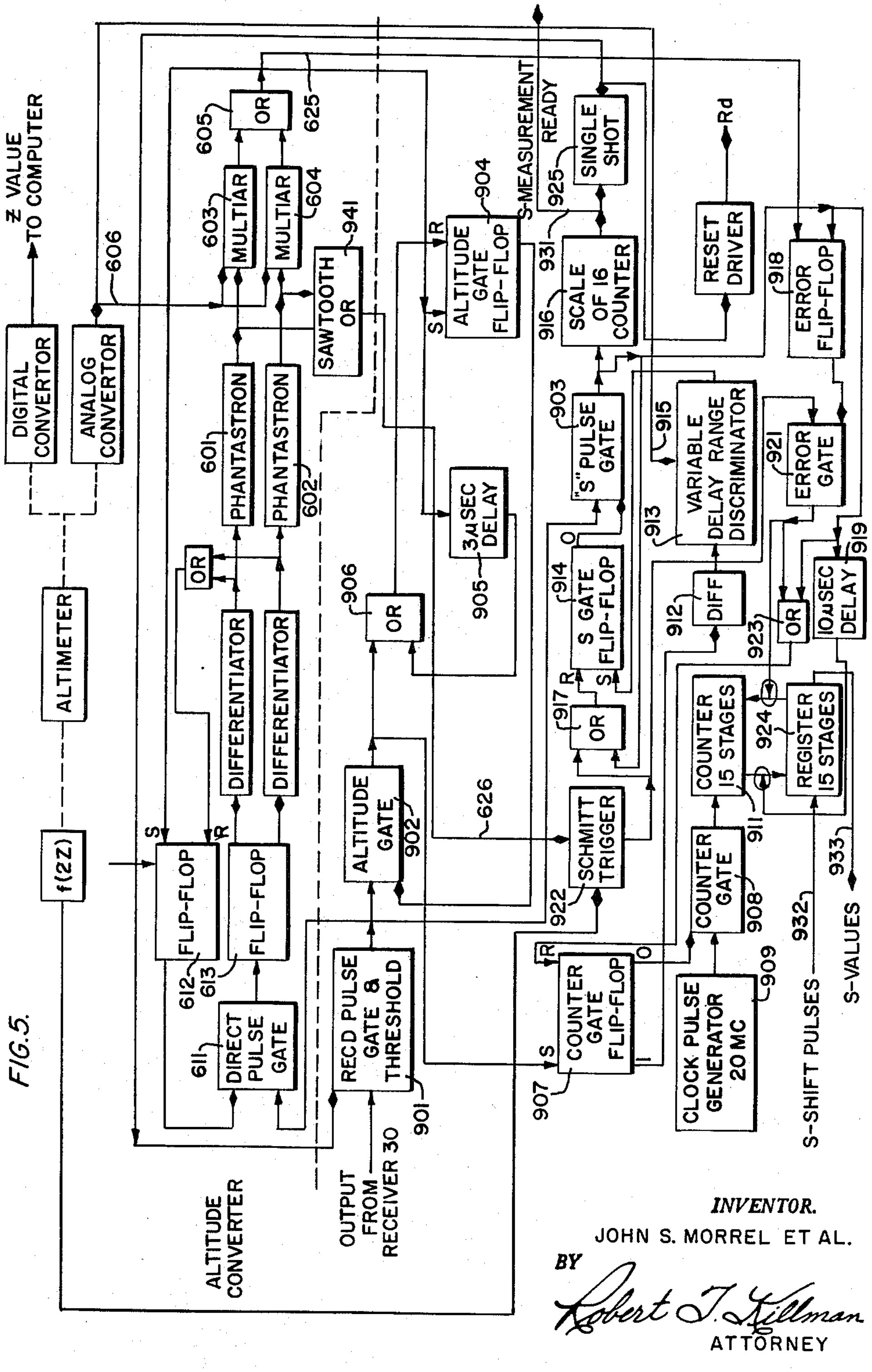
FIG. 5 is a block diagram of an altitude converter and S-measuring unit.

The S-measuring unit 90 (FIG. 3) is shown in detail in FIG. 5 and includes portions of the altitude converter circuit shown in FIG. 4. In FIG. 5 the altitude converter is shown without the switching function to convert it for use in transmitting. Thus, as shown in FIG. 5, the altitude converter is adapted to process received signals and compare the intruder aircraft altitude with the altitude of the protected aircraft. The S-measuring unit shown in FIG. 5 operates on signals derived from the output of receiver 30 which are applied to a received pulse gate 901 which also includes a threshold circuit for rejecting pulse signals below a predetermined noise threshold. The output of the received pulse gate 901 is applied to the DIRECT pulse gate 611 in the altitude converter and is also applied to an altitude gate 902 and an S-pulse gate 903. Each DIRECT pulse which passes through the received pulse gate 901 initiates a time delay in the altitude converter 60 of duration proportional to the altitude of the protected aircraft. A pulse from the altitude converter OR 605 occurring at the end of this altitude controlled time delay sets an altitude gate FF 904 thereby supplying an output from the FF 904 which enables the altitude gate 902. The altitude gate FF 904 will either be reset three microseconds later by means of the pulse signal from OR 605 passing through a three microsecond delay 905 to the input of an OR 906 and thence to the reset input of FF 904 or the FF 904 will be reset by a DIRECT pulse if such a pulse should occur and pass through the altitude gate 902. This circuit establishes the altitude interval and eliminates the possibility of passing both the DIRECT pulse and corresponding ground reflected S pulse through the altitude gate 902.

DIRECT pulses will be passed by the altitude gate 902 if the altitude of the intruder aircraft is within 750 feet of the altitude of the protected aircraft. The DIRECT pulses which pass through the altitude gate 902 are designated ALTITUDE pulses. Each such ALTITUDE pulse passes through OR 906 to reset FF 904 and thus close the altitude gate 902. The DIRECT pulses passing through altitude gate 902 also set a counter gate FF 907 which conditions a counter gate 908 thereby allowing CLOCK pulses from a 20 megacycle clock pulse generator 909 to pass to a fifteen stage counter 911. The ONE output of FF 907 is differentiated in a differentiator 912 the output of which is applied to a variable delay range discriminator circuit 913. After suitable delay the output of range discriminator 913 is applied to set an S gate FF 914. The magnitude of the delay in the range discriminator 913 is determined by an altimeter input 915 to determine the duration of the enabled period of the S pulse gate 903.

Any S pulse which passes through the S pulse gate 903 after arriving at the input thereof directly from the output of the received pulse gate 901 is applied to a scale of sixteen counter 916, an error FF 918, OR 917 and a ten microsecond delay circuit 919 and an OR 923. The S pulse, applied to FF 918 enables an error gate 921 to permit pulses from a Schmitt trigger 922 to pass the error gate 921 thereby providing an input to OR 923 the output of which resets counter-gate FF 907 thereby stopping the passage of CLOCK pulses from the generator 909 through the counter gate 908 to the counter 911. After the delay introduced by the delay circuit 919, which allows for the completion of the flip-flop transitions in the counter 911, the output of the delay circuit 919 produces a transfer pulse to the counter 911 to transfer its count to a fifteen stage register 924. This transfer does not destroy the reading in counter 911 which remains unchanged during readout but rather merely forces each flip-flop in the rgister 924 to assume the same state as each corresponding flip-flop in the counter 911. This circuit thus operates during the time interval between each DIRECT pulse and corresponding S pulse to increase the reading of counter 911 by an amount proportional to the duration of the interval between the DIRECT and S pulses. After each increase the accumulated count in the counter 911 is transferred to the register 924.

The number of measurements to be accumulated is determined by the counter 916 that counts the number of S pulses passing through the S pulse gate 903. Thus the counter 916 set to count sixteen pulses, upon reaching a count of sixteen produces an output which triggers a single shot 925 that produces a three millisecond output gate applied to received pulse gate 901 closing that gate for an interval long enough for the register 924 to be readout and all flip-flops reset by signal $R_d$ in preparation for a subsequent group of measurements of S interval.

The reception of every DIRECT pulse should be followed by the reception of a corresponding S pulse. If this ideal recepition could be guaranteed there would be no need for register 924 as the accumulated count could be read directly from the counter 911. It may be expected however that under certain conditions an occasional S pulse may not be received or if received will be inadequate to actuate the S measuring circuits and in particular fail to close counter gate 908. This would yield an erroneous value for the S measurement since the counter gate 908 would remain open until terminated by a subsequent S pulse. The net result of such an error would be that the range value derived from the set of measurements would be smaller than the range that actually exists. To eliminate such S measurement errors the register 924 is provided and its operation to eliminate such errors is as follows.

The error FF 918 is set by the output of OR 605 which is coincident in time with the leading edge of the altitude gate pulse. The error FF 918 is reset by the S pulse from S pulse gate 903. If no S pulse is received during the S pulse gate interval the error FF 918 will not be reset. In this event error gate 921 remains enabled and the pulse from the Schmitt trigger 922 passes through the error gate 921 to be applied to OR 923 resetting counter-gate FF 907 to close counter-gate 908 thereby stopping the count in counter 911. The output of error gate 921 is also applied to transfer the count from register 924 into the counter 911. By this means the reading of counter 911 is restored to the value that existed prior to the beginning of the faulty measurement in which no S pulse was received. The readout from the register 924 to the counter 911 also leaves the register 924 with the same number of accumulated counts in agreement with the count preceding the erroneous measurement. Likewise the accumulated total in the register 924 is in agreement with the number of S measurements recorded in the counter 916 since in the erroneous measurement when no S pulse was received the counter 916 would not be advanced. Thus a missing S pulse does not produce an erroneous S value.

The Schmitt trigger 922 produces an output which is a function of 2Z, as determined by a nonlinear potentiometer 653 operated by the altimeter. This function of 2Z, terminates the S-gate interval prior to the initiation of the altitude gate and would correspond to the start of the proximity gate in FIG. 2(*c*).

*Operation of the S measuring unit*

Figure 7:
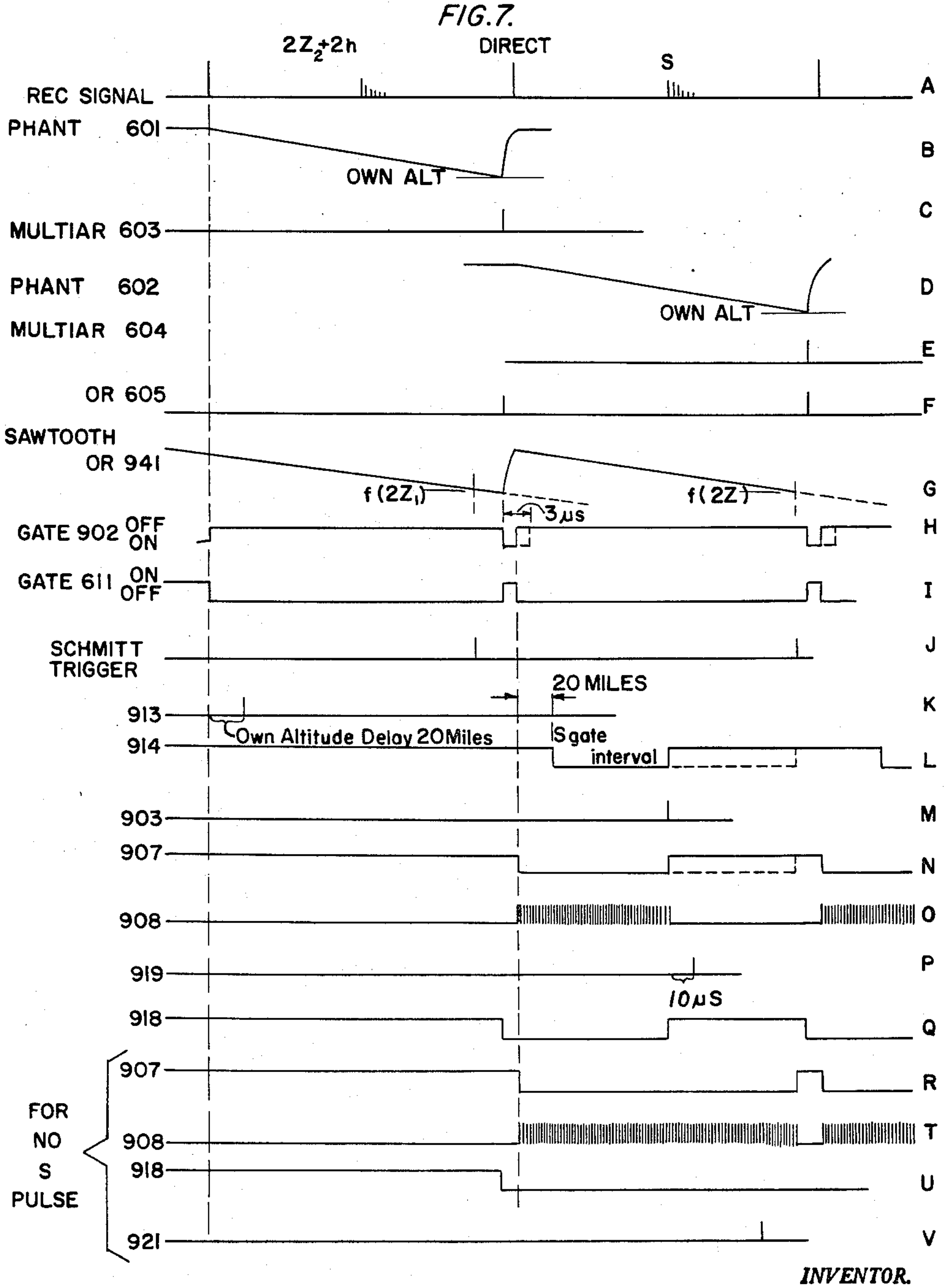
FIG. 7 is a waveform diagram for the S-measuring unit of FIG. 5.

The operation of the S measuring unit of FIG. 5 can be understood from the waveform diagram of FIG. 7 wherein waveform A represents the received signal comprising DIRECT pulses spaced an interval equal to $2Z+2h$ corresponding to twice the altitude of the intruder aircraft plus a fixed delay interval $2h$. The received signal will also include the S pulses, the first one to be received representing the shortest reflective ground bounce signal path between the intruder and the protected aircraft. In addition to the initial S pulse received, but always subsequent thereto, will be a number of additional reflected signals from ground bounce paths which are greater in length than the specular reflection path between the aircraft. A DIRECT pulse which passes the received pulse gate and threshold 901 passes through the direct pulse gate 611 to complement FF 613 and thereby reset FF 612 to close the direct pulse gate 611 as shown in waveform I. This DIRECT pulse which is also applied to one or the other of phantastrons 601 and 602 is effective to start the timing rundown of phantastron 601 as shown in waveform B and the output of multiar 603 in waveform C occurs at the rundown of waveform B reaching the level representing the altitude of the protected aircraft as set in the multiars by a voltage derived from an altimeter controlled potentiometer in unit 50. This pulse from OR 605 also sets FF 612 to open the direct pulse gate 611.

The reception of the next DIRECT pulse in waveform A triggers phantastron 602 to rundown and produce from multiar 604 the output pulse of waveform E. The waveforms C and E and combined in OR 605 to produce waveform F. Similarly the outputs of phantastron 601 and 602 are combined in a sawtooth OR circuit 941 which is arranged to produce the output voltage of the lowest magnitude of the two input voltages applied thereto. Thus as one phantastron recharges to its quiescent level the timing waveform of the other phantastron will appear at the output of OR 941.

The on and off conditions of the altitude gate 902 are shown in waveform H as controlled by the output of altitude gate FF 904. The normally closed altitude gate 902 is opened by the own altitude pulse of waveform F and is closed by the receipt of a DIRECT pulse within three microseconds after the own altitude pulse or by the output of delay 905. During the three microseconds subsequent to pulse F a DIRECT pulse can pass the altitude gate 902. If such a DIRECT pulse does occur within this three microsecond interval it passes gate 902 and through OR circuit 906 resets altitude gate FF 904 to close the altitude gate 902. The three microsecond delay line unit 905 defines approximately a ±750 foot altitude interval within which the intruder must be found before his presence will be recognized by the system. This altitude interval may be adjusted by changing the delay of delay unit 905. The altitude delay introduced by the multiars 903 and 904 will determine the start of the altitude gating waveform H established for gate 902.

The DIRECT pulse which passes the altitude gate 902 is effective to set FF 907 as shown by waveform N thereby passing 20 megacycle CLOCK pulses from generator 909 through the counter-gate 908 to the counter 911. These 20 megacycle CLOCK pulses are applied to the counter 911 as shown by waveform O until the occurrence of an S pulse.

The S gate interval as shown on waveform L is generated from the own altitude delay pulse of waveform K determined by the variable delay range discriminator 913 which produces the output pulse of waveform K a time delay interval corresponding to 20 miles of range after a DIRECT pulse. Any S pulse which is received between the occurrence of a DIRECT pulse and the 20 mile delay pulse of waveform K would correspond to intruder aircraft at a distance greater than 20 miles from the protected aircraft and accordingly the system is arranged to reject such signals. Since the geometry of ground bounce range measurements shows that the delay required to exclude aircraft beyond the 20 mile limit will vary with the protected aircraft's own altitude, the discriminator 913 is controlled via line 915 by the operation of the aircraft's own altimeter.

The S interval gate of waveform L is terminated by the pulse derived from the Schmitt trigger 922, the waveform being shown in waveform J. The pulse in waveform J is derived from the aswtooth waveform G as a function of the level $2Z_1$ where $Z_1$ corresponds to the protected aircraft's own altitude. During the S gate interval of waveform L and S pulse occurring in the received signal A will be passed through the S pulse gate 903 as shown in waveform M. The pulse passing through the S pulse gate 903 passes through OR 923 to reset FF 907 thus closing counter gate 908 to terminate the counting of the 20 megacycle pulses of waveform O. The S pulse passes through OR 917 to reset the S gate flip-flop thereby terminating the S gate (waveform L). At the end of the ten microsecond delay introduced by delay unit 919, which delay permits the counter 911 to complete all the carry operations involved in the completed count, the number in the counter 911 is transferred to the register 924. This transfer is made without altering the count accumulated in the counter 911. The pulse for causing this count transfer is shown in waveform P with a two microsecond delay relative to the S pulse (waveform M).

The error FF 918 which was set by the own altitude pulses of waveform F is reset by the S pulse of waveform M thereby closing error gate 921 to prevent the passage of the Schmitt trigger pulse of waveform J.

In instances where for some reason an S pulse is not received after the reception of a DIRECT pulse, provision is made in the S measuring unit of FIG. 5 to remove the erroneous count from the counter 911 and reinstitute the correct accumulation as it exists in register 924 prior to the erroneous count. The operation of the system for a missing S pulse is shown in the waveforms R, T, U and V. As shown in waveform T the occurrence of a DIRECT pulse initiates the 20 megacycle CLOCK pulses to be counted in the counter 911. This counting continues assuming the S pulse absent since the counter gate 907 remains open as shown in waveform R. Since no S pulse occurs to reset the error FF 918 waveform U for FF 918 remains down thereby enabling the error gate 912 to pass the Schmitt trigger pulse V which is applied through OR circuit 923 to reset the counter 907 and stop the count in counter 911 and which is also applied as a shift pulse to the register 924 to transfer the reading in register 924 into the counter 911. Thus the count in counter 911 is restored to the count that was there present prior to the initiation of the DIRECT pulse following which no S pulse was received. The count in the counter 911 therefore corresponds to the accumulation for the number of measurements counted by the counter 916 since the absence of an S pulse will likewise not advanc ethe count in the counter 916.

At the completion of sixteen S measurements the counter 916 produces on line 931 an S MEASUREMENT READY output which is applied to the S MEASUREMENT READY input to the computer and upon the receipt of SHIFT pulses from the computer on lead 932 the S measurement in the register 924 is transferred to the computer on lead 933. The output on lead 933 comprises only the output of the eleven most significant digit stages of the register 924 thereby conveniently dividing by sixteen the total accumulated in the register 924. Thus the average of sixteen S pulse measurements is used to produce the S value read out on line 933.

*Radar altimeter altitude converter and burst generator*

Figure 6:
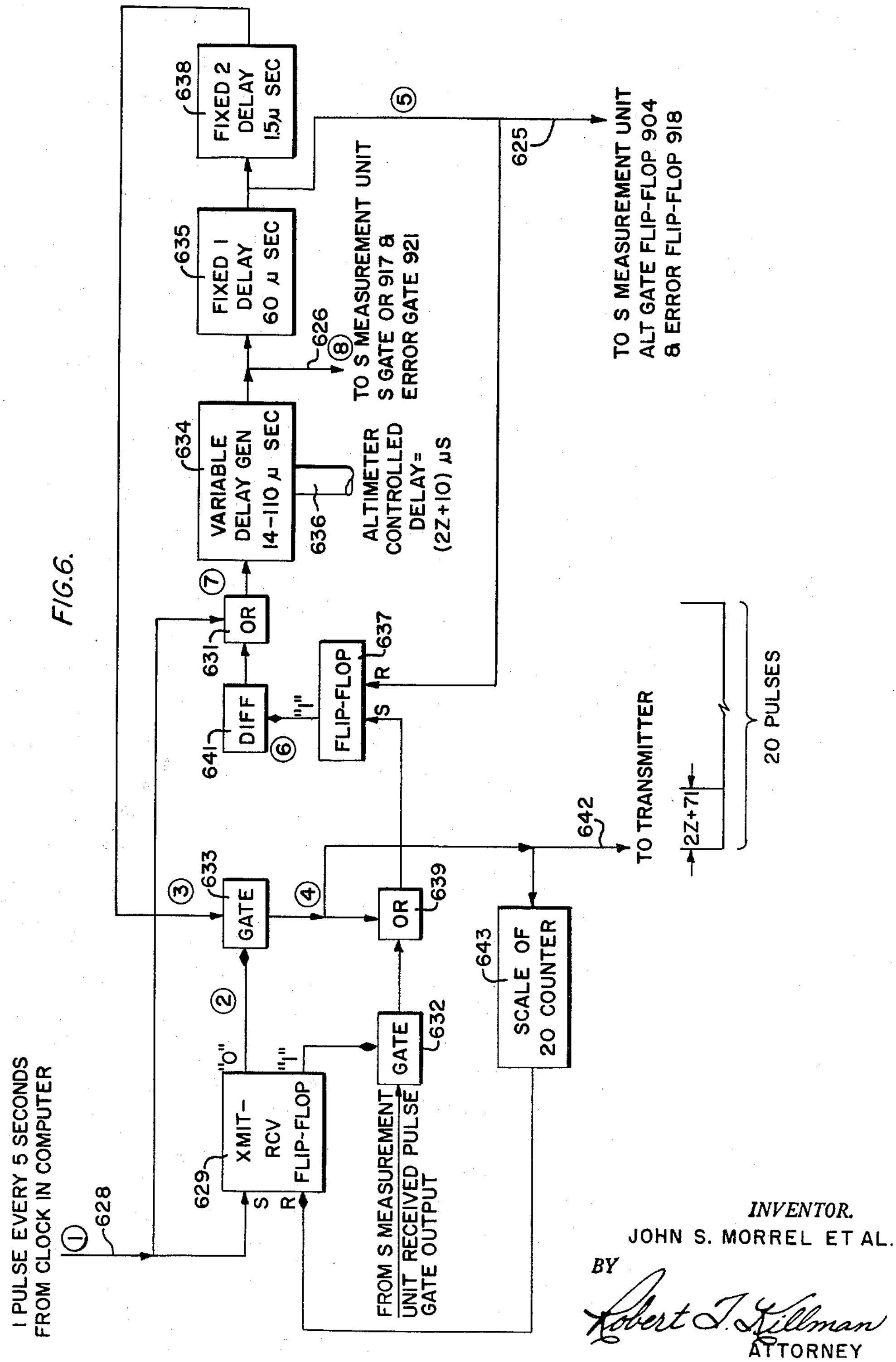
FIG. 6 is a block diagram of a modified altitude converter and burst generator employing radar altimetry.

By employing the modified form of altitude converter shown in FIG. 6 the S-measuring unit 90 can be employed to obtain a measurement of the terrain clearance during the time the CAS burst is being transmitted. This circuitry of FIG. 6 replaces that shown above the dashed line in FIG. 5. An output 625 in FIG. 6 replaces the output of the multiar "OR" 605 of FIG. 5. The Schmitt trigger circuit 922 in the S-measuring unit of FIG. 5 is no longer required, its output to OR 917 and error gate 921 being replaced by output 626 of FIG. 6. The output of the received pulse gate and threshold 901 of the S-measuring unit which in FIG. 5 was applied to the direct pulse gate 611 is applied in FIG. 6 to the input of gate 632.

TRANSMITTING MODE OPERATION

Once every 5 seconds a BURST pulse is obtained on line 628 from the burst clock generator 701. The transmitting mode is initiated by applying this pulse to set FF 629 and to the input of OR 631. When FF 629 is set, gate 632 is disabled to prevent pulses from the receiver from influencing the transmitting mode and gate 633 is enabled. The BURST pulse which passes through OR 631 appears at the output 625 after a delay of $2Z+70$ microseconds produced by a variable delay generator 634 and fixed delay 635. The delay generator 634 produces an adjustable time delay of 14 to 110 microseconds in accordance with a pressure altimeter input 636. The relation between altitude and the delay introduced is $(2Z+10)$ microseconds where Z is the protected aircraft's own altitude (in thousands of feet). This delayed pulse from unit 635 is applied to the S-measuring unit via line 625 to set FF 904 thereby opening the altitude gate 902. The pulse on line 625 is also applied to reset FF 637. The first pulse to traverse the delay units 634, 635 does not change the state of FF 637 as it will normally be in the reset condition.

After a 1.5 microseconds delay introduced by delay unit 638 the pulse from delay 635 passes gate 633 and passes through OR 639 to set FF 637. A differentiator unit 641 produces a pulse output only when FF 637 changes state from reset to set as a result of the pulse applied from OR 639. The pulse output of differentiator 641 passes OR 631 to initiate a second pulse through the delay units 634, 635, 638. This second pulse appears at output 625 resets FF 637 so that 1.5 microseconds later the pulse from delay 638 passing through gate 633 can set FF 637 thereby generating another pulse which will traverse the delay units. By this process pulses will continue to be generated with spacing 2Z+71.5 microseconds as long as gate 633 remains open. The pulses passing through gate 633 are applied on line 642 to trigger the system transmitter and are counted by a scale of 20 counter 643, which upon reaching the count of twenty resets FF 629 thereby turning off gate 633. This twentieth pulse generates a twenty-first pulse which traverses the delay units 634, 635, 638, but is stopped by closed gate 633. Accordingly only 20 pulses are transmitted for each BURST clock pulse received on line 628.

Figure 8A:
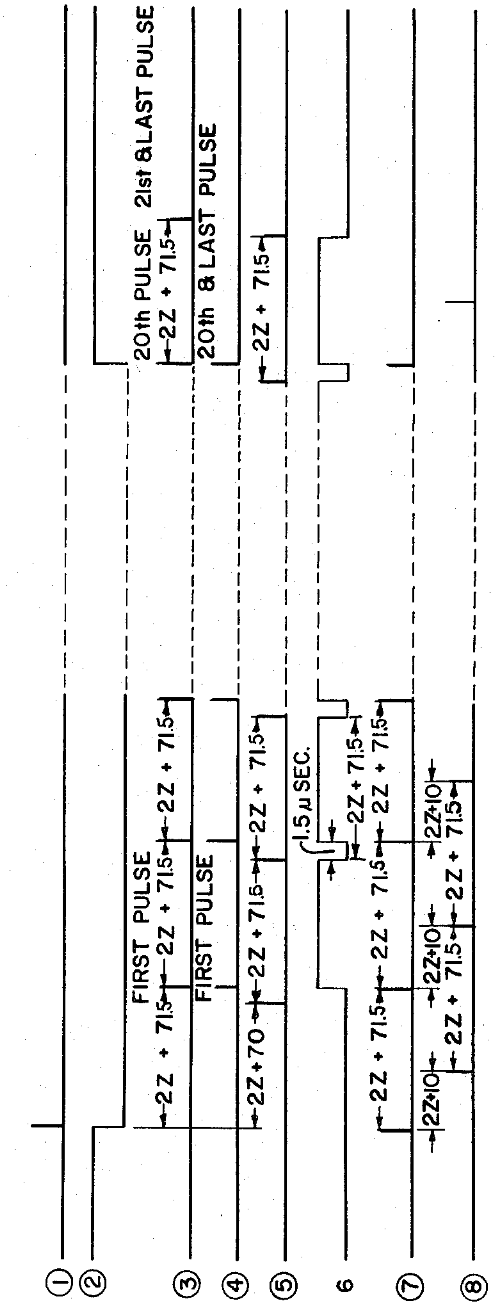
FIGS. 8A and 8B are waveform diagrams for the modified S-measuring unit of FIG. 6 showing operation for altitude converter and burst generator and for ground reflected altimetry respectively.

The pulse and gating waveforms for the transmitting mode operation of FIG. 6 are shown in FIG. 8A. The twenty pulses of waveform 4 are generated on line 642 to trigger the transmitter in response to each BURST pulse of waveform 1 which appears on line 628.

GROUND BOUNCE ALTIMETRY

During the transmission of a pulse by the CAS transmitter 40, the receiver 30 will be disconnected from the antenna 10 during this instant by means of the duplexer 20. Due to leakage, the transmitted pulse will produce a pulse output from the receiver. This pulse will pass through the altitude gate 902 (of the S-measuring unit) which will have been opened by output 625 1.5 microseconds before the occurrence of the transmitted pulse. This output from the altitude gate 902 will open the counter gate flip-flop 907 to pass 20 mc. clock pulses through the counter gate 908 to the counter 911 just as it does for an S measurement. The duplexer 20 will then connect the antenna 10 to the receiver 30 again so that the transmitted pulse which has travelled to the ground and been reflected back to the aircraft will produce a pulse output from the receiver 30. The transit time of this pulse will be $2Z_t$ microseconds, where $Z_t$ is the altitude above the terrain in thousands of feet. (To be more exact the transit time is 2.0334 $Z_t$ microseconds since the propagation time is .0010167 microsecond per foot.) In general the pressure altitude Z will not be the same as the terrain altitude $Z_t$ because of atmospheric pressure variations and terrain height. In order to accommodate for these variations and situations where the terrain is below sea level where it is possible for $Z_t$ to be greater than Z, it is necessary to hold the S-gate 903 open for a period greater than 2Z to insure that the transmitted pulse which returns from the ground will pass through this gate 903. Consequently, output 626 is applied to FF 914 to close the S-gate 903 after a time 2Z+10 microseconds.

Figure 8B:
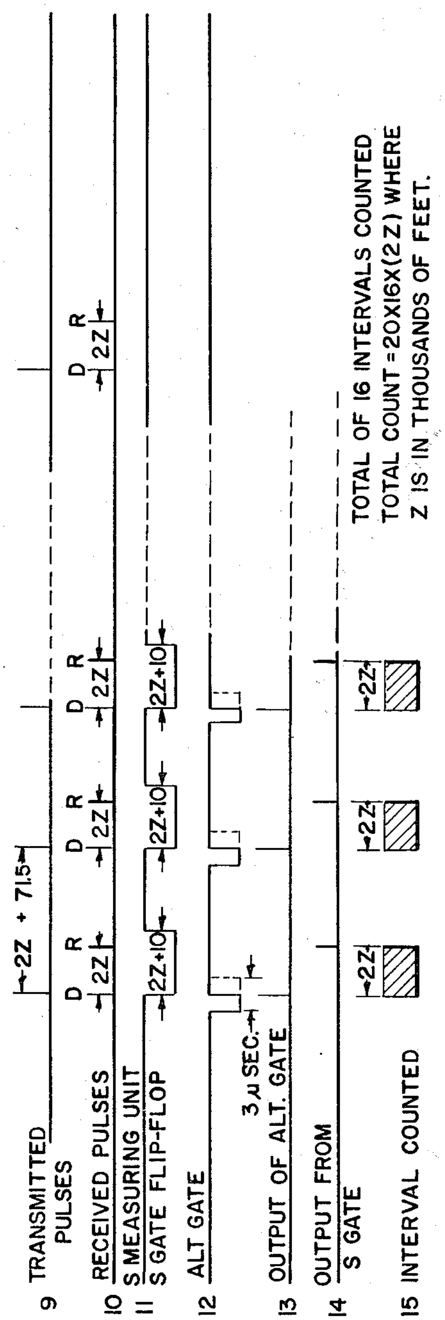

The waveforms for the ground bounce altimetry operation are shown in FIG. 8B. The transmitted pulses of waveform 9 are the same as those of waveform 4 of FIG. 8A. Waveform 10 shows the received transmitter leakage pulse D and the ground echo pulse R. These signals act through the altitude gate 902 and the S gate 903 to provide the waveforms 13 and 14 for controlling the counting interval of counter 911. The counting interval is 2Z as shown in waveform 15.

If the ground return pulse is too weak to pass threshold 901 or should occur later than this time, the counter 911 will be stopped by the output 626 after passage through the error gate 921 which also restores the previous count in counter 911 by transferring the count in register 924 back into the counter 911. For normally received altimetry echo signals the $2Z_t$ readings will be accumulated until 16 measurements have been obtained just as occurs for S-measurements. After 16 altitude measurements have been accumulated the received pulse gate 901 is closed and no further ground bounce altimetry measurements are made. The computer does not process the accumulated altitude reading as though it was S-date since the BURST clock pulse from the computer which initiates the transmission mode also disables a gate 2215 (FIG. 22) to prevent the S MEASUREMENT READY pulse reaching the computer. At the end of the altitude Z measurement a FF 2201 is reset to enable gate 2215 thereby making the S MEASUREMENT READY pulse from true S-measurements available to the computer.

RECEIVING MODE FOR ALTITUDE CONVERTER

In the transmitting mode the circuitry of FIG. 6 performs the function of a burst generator for the transmitter 40 as well as supplying the signals required for ground echo altimetry. In the receiving mode which automatically obtains except during the transmission at five second intervals of a burst of 20 pulses the circuitry of FIG. 6 performs the function of an altitude converter which furnishes the signals required for gating when S-measurements are made. Upon completion of the transmitting mode, gate 633 will be turned off and gate 632 turned on. The first DIRECT pulse from the receiver 30 that passes through the received pulse gate 901 will pass through gate 632 of FIG. 6. This pulse passes through OR 639 and sets FF 627 (initially in reset state) thereby resulting in a pulse output from the differentiator 641. This pulse passes through OR 631 and the delay units 634, 635. The output from the fixed delay 638 is not used and the pulse can go no further since gate 633 is closed. The output on line 625 sets altitude FF 904 which turns on the altitude gate 902 and also resets FF 637. The use of FF 637 thus prevents the S pulse from producing a pulse which would traverse the delay units.

The next DIRECT pulse output from the received pulse gate 901, if it is within 1.5 microseconds of the pulse on line 625 (indicating altitude proximity of 750 ft.), will pass through the altitude gate 902 and turn on the counter gate 908 and (through units 912, 913, 914) S gate 903. This pulse out of altitude gate 906 also resets the altitude gate 904 thereby ending the altitude gate. If no pulse is received within three microseconds of the pulse on line 625 the delayed pulse from delay unit 905 will close the altitude gate. The altitude gate is thus open for 1.5 microseconds before and after the pulse spacing corresponding to own altitude.

The DIRECT pulse from the received pulse gate 901 will also pass through gate 632 and set FF 637 thereby producing a pulse which traverses the delay units. The output 626 through OR 917 and FF 914 closes the S gate 903. The output 625 sets the altitude gate FF 904 to permit altitude gate 902 to pass the next DIRECT pulse. This functioning of the S-measuring unit is thus the same for the altitude converter of FIG. 6, as with the altitude converter shown in FIG. 5.

COMPUTER GENERAL OPERATION

The general organization of the digital computer in accordance with the invention will now be described. The basic problem to be solved by the computer is the determination from S values and altitude data whether sufficient time remains to execute an escape maneuver and to accumulate such data and make calculations relative to a plurality of intruder aircraft. As previously derived the expression (16) provides a criterion for this evaluation for each intruder.

$$i=\sum_{-2}^{+2}(1+5i)\left(\frac{1}{x_i}-x\right)>0 \qquad (16)$$

In the above expression $x$ is equal to S divided by 2Z; 5 is the constant F determined by the minimum escape time, $\tau d$, and the constants of the computation; Z is the altitude of the protected aircraft and $i$ is an integer from −2 to +2 including zero.

Figure 10:
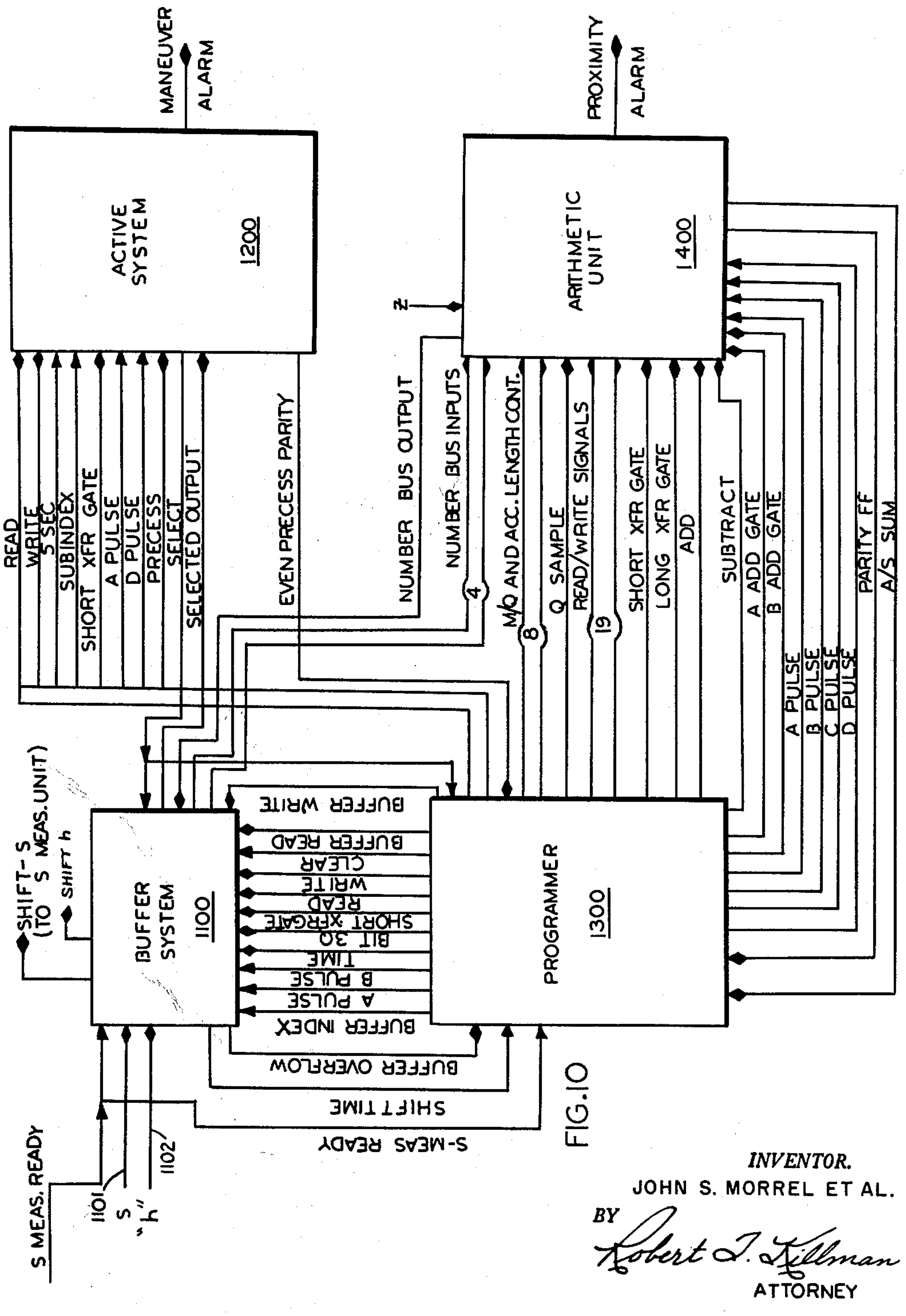
FIG. 10 is a general system block diagram of the computer in accordance with the present invention.
Figure 10A:
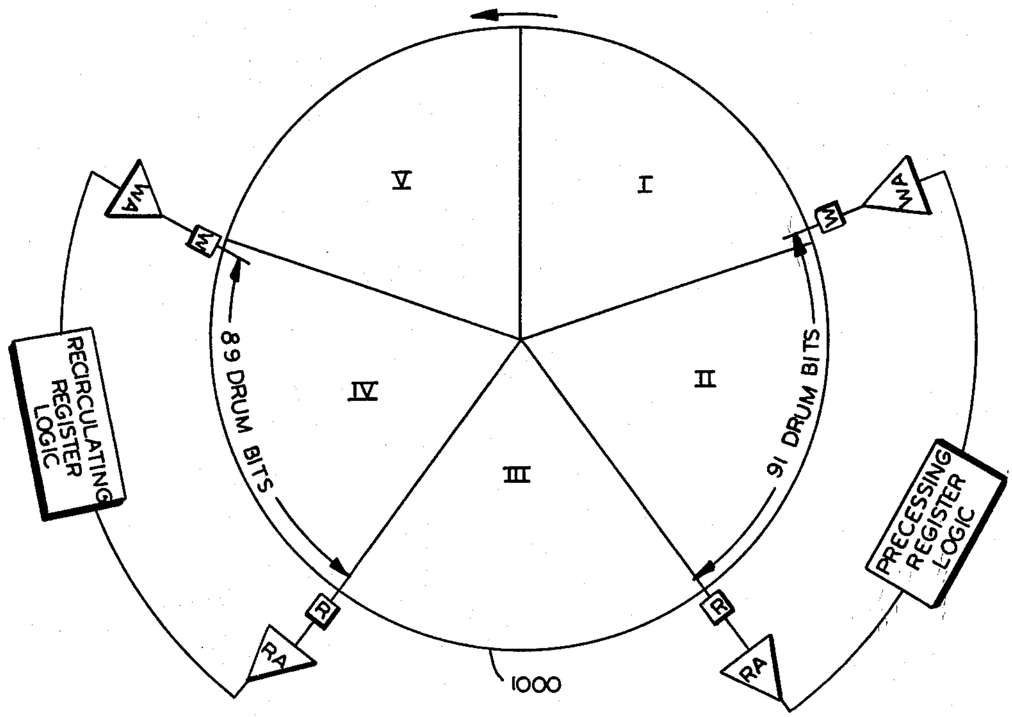
FIG. 10A is a representation of the magnetic storage drum of the computer of FIG. 10.

FIG. 10 shows a general arrangement of the computer which is divided into four general sections: A buffer storage system 1100, an arithmetic unit 1400, an active channel system 1200 and a programmer 1300. The computer operates with a conventional magnetic drum memory 1000 (FIG. 10A). The sections 1100–1400 use binary logic to process the data pertinent to the computer's function.

Since S measurements may arrive on line 1101 at any time the computer must be provided with buffer storage capability. The buffer storage unit 1100 receives data representing the S values applied on line 1101 and altitude separation data, $h$, applied on line 1102. Burst interval information is derived from a burst clock 1303 (FIG. 13A) which may be a precise tuning fork controlled audio oscillator with a suitable count down circuit for establishing accurately the five second interval between bursts of transmission of the protected aircraft. Since all returns from any one aircraft similarly equipped will occur at the same relative time within the basic five second interval, the time of receipt of a signal becomes the label for that signal. All later signals occurring at the same time within subsequent five second intervals will be assumed to be associated with the previous signals bearing that time indication. Incoming data are compared to the protected aircraft's own five second interval for the purpose of addressing individual S and $h$ measurements to the appropriate storage track in the magnetic drum.

The buffer storage unit 1100 is connected with the arithmetic unit 1400 which is under the control of the programmer 1300.

Upon initial receipt of new data, the temporary buffer 1100 holds the TIME, $h$, and S values until the arithmetic unit 1400 is free to perform several computations. One of these is a determination of the value of $S_0$, a calculation which determines whether an immediate threat of collision exists. The second computation removes the value of S from the buffer 1100 and replaces it with a value of Y, where $$Y=\left(\frac{2Z}{S}-\frac{S}{2Z}\right)$$

Data on S values and $h$ are applied from the buffer unit 1100 to the arithmetic unit 1400 and the arithmetic unit 1400 computes Y values from the S and Z data and returns these values to the buffer unit 1100. When the buffer contents have been modified to contain TIME, $h$ and Y, the active system 1200 is given access to these data. The Y values are addressed to an active track storage in the active unit 1200 where they are stored in accordance with the time derived from the register 1304. The active system 1200 stores in a given channel for any one aircraft, TIME, $h$ and five successive Y values. The data for each aircraft under observation are periodically updated as subsequent measurements are received. As a new Y value is added to a channel the oldest Y value will be removed. The successive Y values for five measurements for each aircraft are supplied to the arithmetic unit 1400 which is likewise supplied with the constant terms $1-Fi$ from permanent storage in drum 1000 whereby the multiplication of the individual terms in the summation of Equation 16 may be performed. Whenever five successive values of Y are present, a computation will be performed which determines the value of the summation $$\sum_{i=-2}^{i=+2}(Y)(1-Fi) \text{ where } F=-5 \qquad (17)$$

The magnitude of this quantity (17) in relation to 0 will be supplied to the maneuver alarm portion of the active system 1200 to produce an appropriate indication whenever the value of (17) is negative which indicates that a maneuver is required under the system philosophy.

All of the timing functions for the system and all required control signals are generated in the programmer 1300 and the drum system.

DRUM SYSTEM

The magnetic drum 1000 used as a memory device in the disclosed system is represented in FIG. 10A. The drum 1000 contains three types of memory tracks as follows:

(1) STORAGE ONLY

Control tracks:
- Clock
- Index
- $(1-Fi)$
- Multiplier reset
- Subtract (2) STORAGE WITH PRECESSING Active Tracks (precessing) (90 bits): 10 separate channels (3) RECIRCULATING REGISTERS Buffer tracks: Four recirculating registers for buffer storage (90 bits)

Seven arithmetic recirculating registers:
- Accumulator, 29 bits
- M/Q, 29 bits
- A-register, 30 bits
- Four general purpose registers:
  - S-value, 30 bits
  - Z-value, 30 bits
  - $h$ value, 30 bits
  - Temporary storage, 30 bits Miscellaneous storage:
- Three constant registers (30 bits):
  - $K_1$ needed for proximity criterion
  - $K_2$ needed for proximity criterion
  - $K_3$ needed for proximity criterion Special register, 22 bits: Multiplier storage register for maneuver computation

STORAGE ONLY

Figure 10C:
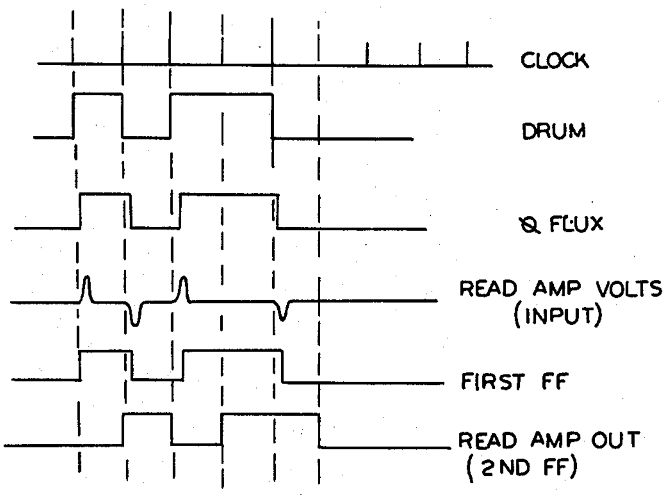
FIG. 10C is a waveform diagram showing the one-bit delay present in the read amplifiers of the active channels.
Figure 10B:
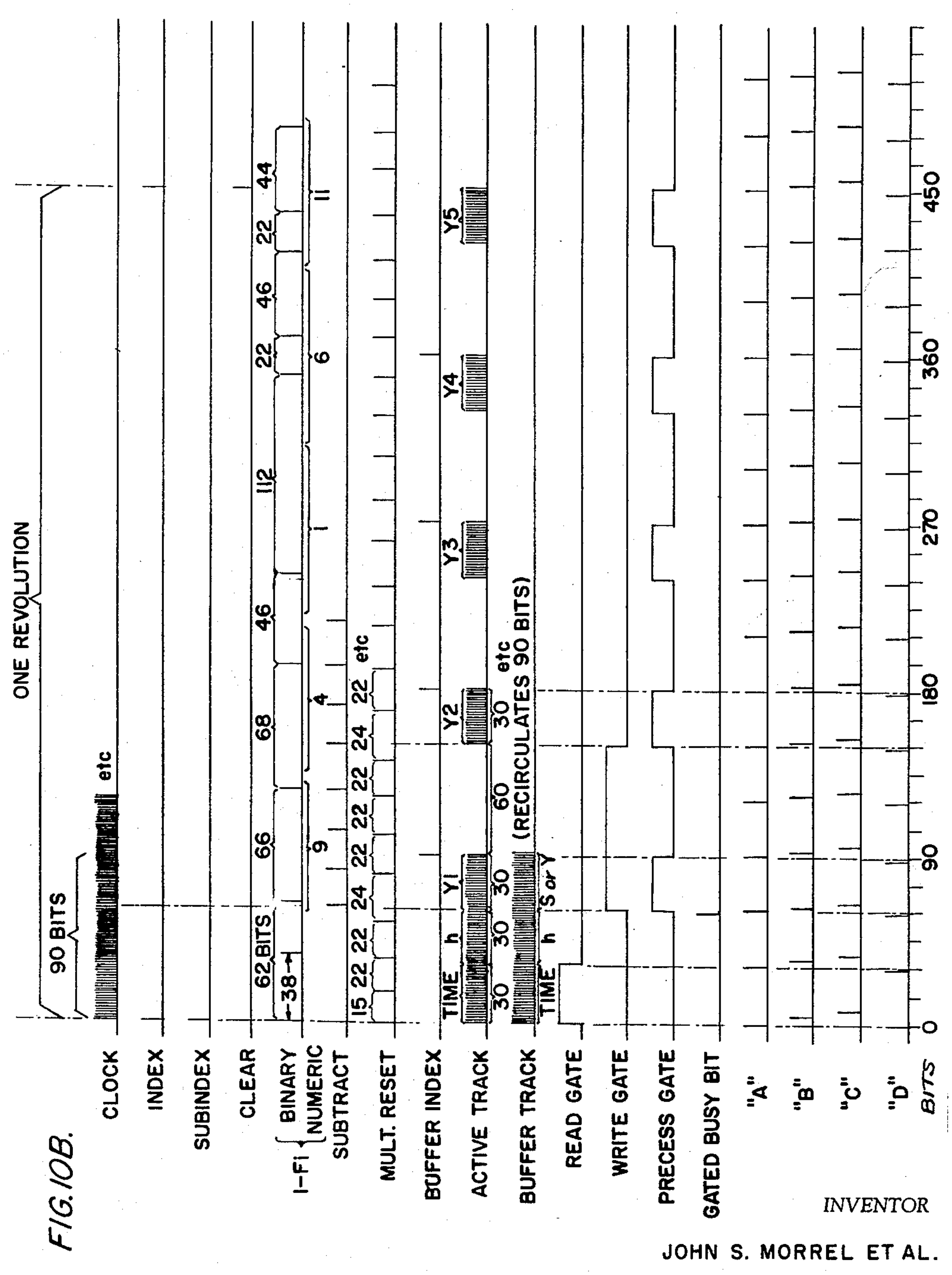
FIG. 10B is a timing diagram of the prerecorded drum pulse tracks on the drum of FIG. 10A in relation to other signals.

The "storage only" tracks are permanently recorded control bit tracks, the timing of which is shown in FIG. 10B for a complete drum revolution. These tracks are equipped with only a read head, since writing in new information or deleting old information is not required. In addition to the drum pulses, CLOCK, INDEX, $(1-Fi)$, MULTIPLIER RESET, and SUBTRACT, FIG. 10B shows the derived SUBINDEX, CLEAR, and BUFFER INDEX pulses and a representation of data in a buffer and active track. Also shown in FIG. 10B are the location in time of the READ, WRITE and PRECESS gates, the GATED BUSY BIT, and the A, B, C and D control pulses.

The read amplifier on the clock track derives one CLOCK pulse for each positive flux change on the drum. There are exactly 450 such changes recorded on the circumference of the drum clock track, and a 3500 r.p.m. a CLOCK pulse rate of 27 kc. is realized. All system functions are keyed to this drum clock. The drum 1000 is divided into five equal sectors I, II, III, IV and V each 90 bits long. Each sector, therefore, can be subdivided into three 30 bit words.

All control track read amplifiers other than that on the clock track are designed to generate a gating waveform which is enabled during any ONE interval on the track being read. These waveforms are sampled by the CLOCK pulse at the end of each bit interval, and the presence of an enabling signal at sampling time will cause the output gate of the amplifier to pass a single CLOCK pulse.

STORAGE WITH PRECESSING

The active storage tracks are capable of being precessed, i.e., having data transfered directly from one part of the drum to another. The drum tracks in the active storage system are divided, circumferentially, into five 90-bit sectors, and each sector contains three 30-bit words. Since the precessing function requires that data be moved exactly one sector-length during precessing, the heads are electrically separated by 90 bits. The read head is the first one encountered by data on the drum in an active track.

The read amplifiers used in the active tracks have flip-flop outputs instead of gates, and the CLOCK pulse merely transfers the waveform recognized by the read amplifier into this output flip-flop. This serves the function of assuring that the output of any read amplifier is at all times in synchronization with the system clock.

This shifting process, however, introduces a one-bit delay into the reading process, so data which should be precessed immediately is actually delayed one bit in reaching the write amplifier (which itself has no delay). The physical head-to-head spacing of the heads in the processing tracks is therefore 91 bits to obtain an electrical spacing of 90 bits. This one bit delay is shown by the waveform of FIG. 10C.

RECIRCULATING REGISTERS

In the recirculating registers, the read and write heads are reversed relative to drum rotation. The write head is the first one encountered by data and as the information passes under the read head, it is returned to the write head and made to recirculate. Here, since there is always one bit of storage introduced by the delay in the shifting process at the output of the read amplifier, the physical head-to-head spacing of these registers is one bit less than their electrical spacing.

Four different register lengths are used in recirculating form. The buffer registers, which contain TIME, *h* and S values for new data entry, are 90 bits long (electrical length). There are also seven utility registers which are used in arithmetic computations, five of which are 30 bits long, while the remaining two have a 29 bit length.

MISCELLANEOUS STORAGE

Constants $K_1$, $K_2$ and $K_3$ which are used in the arithmetic computation of the proximity criterion are stored on three 30-bit registers.

There is one special register which acts as a storage element for the maneuver computation system. This special register is 22 bits long.

BUFFER SYSTEM

Figure 11:
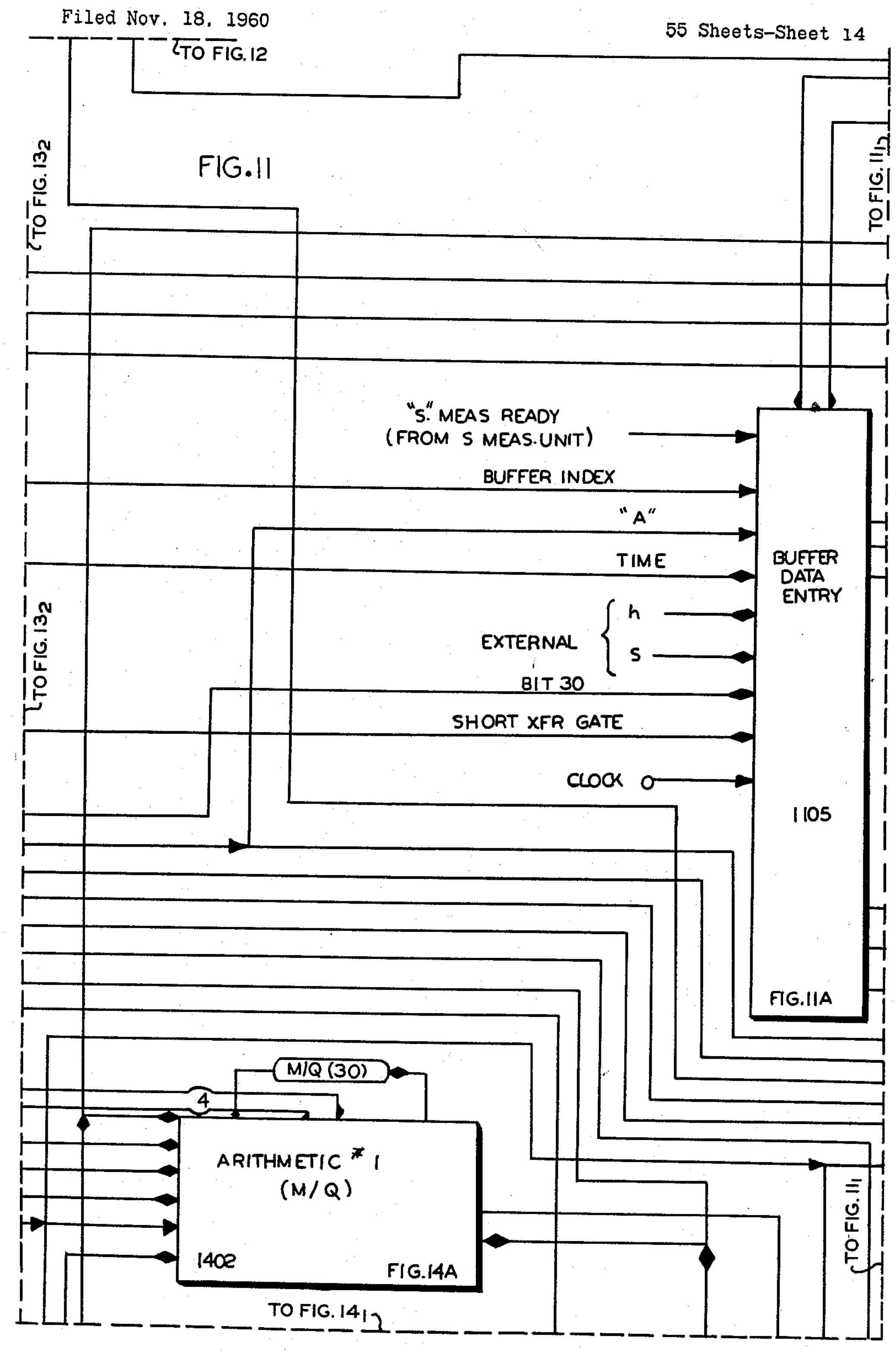
FIG. 11 is a block diagram of the buffer system of the computer.

The buffer system 1100 is made of the five elements shown in FIG. 11. The system comprises a buffer data entry element 1105, three identical buffer stages 1106–1108 and one modified buffer stage 1109.

The buffer data entry 1105 receives an "S-MEASUREMENT READY" signal on line 1104 when a new S entry becomes available and regulates the entry on line 1111 of TIME, *h* and S values into the first available empty buffer stage 1106–1109. As the data are entered, a parity bit is added to each word. If all buffer stages are full, a BUFFER OVERFLOW signal on line 1140 actuates a front-panel indicator, advising the operator of the overload condition. Normally, such an indication would be more likely a symptom of malfunction rather than overload, however.

The four buffer stages 1106–1109 are similar except that the first three 1106–1108 contain gating devices which cause them to be bypassed when they are full. The last stage omits these additional circuits, and in the space which would be otherwise occupied several circuits common to all four buffers have been installed.

Each buffer stage 1106–1109 is capable of the following three operating conditions:

(1) NOT BUSY and NOT READY: empty buffer.

(2) BUSY and NOT READY: Occupied buffer incapable of receiving input, but also incapable of access by the active system 1200. The information in the buffer is accessible to the arithmetic unit 1400, however, so that the Y-value computation can be performed. The data in a buffer in this state are TIME, *h* and S.

(3) BUSY and READY: The S value in a buffer stage so labeled will have been converted to a Y value. The buffer stage is closed to new input and closed to the arithmetic 1400 unit but it is accessible to the active system 1200.

The buffer stages 1106–1109 are capable of being in one and only one of the above three conditions at any one time. The normal routine of operation begins with the entry of TIME, *h* and S values in the first vacant buffer stage. This causes the buffer stage to change from condition (1) to condition (2) (as described above) and blocks further input to that stage. Any input signals arriving at a condition (2) buffer stage will be transferred to the next buffer stage.

As soon as possible, the arithmetic unit will extract the data in this condition (2) buffer stage and will perform the $S_0$ computation, perform the Y computation and replace, in the condition (2) buffer stage, the S value with a Y value. The buffer stage is then set to condition (3). In this stage, the active system 1200 can remove the data contained in the buffer stage and enter it in an appropriate active channel on the drum 1000. After making such an entry, the buffer stage is cleared, i.e., reset to condition (1).

ACTIVE SYSTEM

In the active system of FIG. 12 information is stored in a plurality of active channels 1201 only one of which is shown, connections to the remaining nine channels being as to unit 1201. Each active channel 1201 includes a drum track which is divided into five equal sectors. The drum track has a total capacity of 450 bits on one peripheral track and thus each sector contains 90 bits (three 30-bit words). In the first sector, (defined by the drum INDEX) TIME, *h* and Y values are stored. In each succeeding sector, only the third word (the Y value) is stored. The blank words in the last four sectors are left unused so that computation can take place between Y vales as the drum turns.

At the occurrence of any SUBINDEX pulse (occurring on alternate drum INDEX pulses), the active system 1200 selects the first (oldest in time) available buffer storage which is in the BUSY/READY category. The TIME values in each active drum channel are then simultaneously compared with the selected buffer stage TIME value and if a match is found, the matching active channel is selected for entry of TIME, *h* and S data.

If no match is found, the active drum channels are examined again (during the "*h*" word) and an empty drum channel is allocated for the new entry. The new S value is then written into sector V of the selected channel and the TIME and *h* values are entered in sector I. After each such entry, the summation (17) is executed, the values of $(1-Fi)$ being permanently stored on the drum. As the summation (17) is performed, the Y values on the drum are precessed forward; sector V to sector IV, sector IV to sector III, etc., with the Y value in sector I being discarded. The result of the summation is used only if five Y values have been examined, and the channel is left in readiness for entry of the next Y value. The output obtained after each new entry is thus the result of the last five successive Y calculations. If any one Y value is missed, the data in the storage is erased; thus, channels which cease to receive data are cleared for the entry of new information.

The actual computation of the Y values is under control of an active channel control 1202 and the calculations are performed by a maneuver computation section 1203 in association with an adder-subtractor 1204. Several control pulses are necessary, and these are derived directly from the prerecorded drum tracks previously described. The result of the maneuver computation is compared to zero, and if less than zero, a maneuver alarm is activated.

PROGRAMMER

The programmer 1300 is shown in FIG. 13. The basic timing device in the programmer 1300 is a cycle counter 1301 which counts input CLOCK pulses from the drum clock. The counter 1301 is a five stage binary counter with internal feedback which causes it to recycle after a count of thirty. This is accomplished by sensing a binary count of 10000 and complementing the second stage so that on the next count the counter will advance from 10000 to 10011 instead of 10001. This causes 11111 to be reached on the twenty-ninth rather than the thirty-first count.

The outputs of the five binary stages of cycle counter 1301 are combined with the system CLOCK pulse to generate four output timing pulses:

(1) An "A" pulse, occurring at count 00000 (the 30th count)
(2) A "B" pulse, occurring at count 00001 (the first count)
(3) A "C" pulse, at count 00010 (the second count)

and (4) A "D" pulse, at count 11111 (the 29th count)

The B pulse is also used as an advancing input for a program counter 1304.

Programming of the arithmetic functions is accomplished by the program counter 1304 which has six counting stages of which the first five stages are connected in the same manner as the cycle counter 1301. The total count of the program counter 1304 is thus held to 60 (instead of 64). At a count of 000000, the program counter input is inhibited and operation is normally started by advancing the counter by an external input to 000001.

The counting stages of the counter 1304 are each connected by lines 1306 to the six inputs of sixty separate six input NOR circuits in a program matrix unit 1305. Both the ONE and the ZERO outputs of the stages of counter 1304 are connected to the inputs of 1305 to provide on 60 separate leads a series of 60 sequential program timing pulses for controlling the program of the computer. The 60 leads in the matrix 1305 are available at terminals of a plug board 1352 (FIG. 13D) each lead terminating in three jacks which may be connected by jumpers to the appropriate plug boards of other elements of the computer.

As each program step is generated, electrical commutation of 60 sets of plugboard connectors takes place, and the wired program consists of connections from any of these steps to one or more of four locations as shown in the Program Table and FIG. 13D.

(1) There may be connection to an instruction board 1353 which can be made to energize any one of ten instruction lines during the applicable program step.
(2) Connection to any write in gate 1354 will enable a gate on the output of an arithmetic number bus 1420 (FIG. 14C) and will allow that output to enter only the selected circuit (accumulator, "A"-register, etc.).
(3) Connection to a read out gate 1355 will allow the output of only the selected circuit to enter the number bus.
(4) Connection to a shift plug board 1356 to preset a repeat counter 1326.

Normally, a program step occupies only one word-length (thirty bits) and then ends. There are several operations however, which require more than one word-time. The most obvious of these are the shift operations in which a number is circulated in a long or short register (determined by the direction of shift). If a one-bit change in register length is provided, the number therein will move one bit on each recirculation and the number of words in the program step will determine the length of the shift.

Less obvious as to exact value are the extensions required for multiplication and division. These require 30 words and 17 words, respectively.

In order to lengthen the duration of a program step, the instruction output derived from instruction board 1353 is sampled to determine whether a multiplication or division is required and the presence of a shift value is detected at shift board 1356. The preset inputs thus generated enter a repeat counter 1326 and preset the counter 1326 to some non-zero value. When the repeat counter 1326 is at 00000, the program counter 1304 can be advanced, but when the repeat counter 1326 is at any non-zero setting only it can be advanced and input to the program counter 1304 is inhibited.

The repeat counter 1326 is set to a value of $(33-n)$, where $n$ is the number of words which the program step must occupy. The $n=0$ condition does not exist and when $n=1$ the repeat counter is not used; there is no presetting but only a change in length of the appropriate register for the duration of one word length.

The repeat counter 1326 is counted in the positive direction until a count of 00000 (32 or zero) is reached, ending the repeat counter cycle and reenabling the advance gate input to the program counter 1304.

The instruction signals (ADD, CLEAR & ADD, SUBTRACT, MULTIPLY, DIVIDE, SHIFT LEFT, SHIFT RIGHT, ACCUMULATOR READ, M/Q READ, JUMP ON-) are generated by ten instruction NOR circuits 1357 and serve to make the adjustments necessary within the arithmetic unit 1400 in order to execute the instruction involved.

The program control element 1320 accepts the commands generated by the matrices 1305 and combines these with the basic A, B, C and D pulses from cycle counter 1301 in order to generate gating signals for the arithmetic unit 1400. The gating signals generated are (*a*) two sets of length control signals, (*b*) four gating signals for an adder-subtractor in the arithmetic unit 1400 and (*c*) two general purpose transfer gate signals as follows:

(*a*) Accumulator and M/Q length controls for accumulator and M/Q registers (which are fully discussed hereinafter), which must be capable of being operated in length of 29, 30 or 31 bits, depending on the operation in process.

(*b*) The A and B ADD gates and the ADD and SUBTRACT signals essential to the operation of the adder-subtractor.

(*c*) SHORT and LONG TRANSFER GATES both of which begin at C time, with the SHORT TRANSFER GATE ending at D time (thus omitting the parity bit) while the LONG TRANSFER GATE continues until the following A pulse time.

ARITHMETIC UNIT

The arithmetic unit 1400 contains two major registers, seven subsidiary registers, and auxiliary computation register and a mathematical computation element (A-register and control) 1407 capable of controlling an adder-subtractor 1408. The two major registers are similar in form and are used as an accumulator register 1401 and M/Q register 1402. Four dual recirculating registers 1403, 1404, 1405, 1406 carry the seven registers which store values of S, Z, $h$, $K_1$, $K_2$, $K_3$, and interim data in temporary one-word storage.

Each of these nine registers 1401–1406 has an output which drives (when that output is selected) the number bus 1420. The control circuits of unit 1407 derive A and B values from number bus data for entry in the adder-subtractor 1408. A parity check is made in the control element 1407, and detection of an error will produce a front panel indication.

The A-register of unit 1407 is an auxiliary register which is available for certain computations which require a register in addition to the accumulator and M/Q registers 1401 and 1402. The A-register is of fixed length (30 bits) and is connected to the number bus 1420 and adder-subtractor input gating in a manner suitable for the performance of certain computations as will be described.

The application of these registers and their interrelation with each other as well as with the adder-subtractor and control element is governed by a plug-board program given in the Program Table. This program controls the determination of $S_0$ as well as the evaluation of Y, given S and Z.

DETAILED COMPUTOR DESCRIPTION

BUFFER DATA ENTRY

Referring now to FIG. 11A the detailed logic of the buffer data entry unit 1105 will be described. When an S value is available for entry in the computor, the S MEASUREMENT READY pulse appears at line 1104. This pulse sets FF 1112 to a condition which opens gate 1113 and allows the next BUFFER INDEX pulse on line 1114 to pass gate 1113 and initiate a buffer entry cycle. The pulse passing gate 1113 will reset FF 1112 disabling gate 1113, and set FF 1115, thereby enabling gate 1116 and enabling NOR's 1117, 1118, and 1119. The same pulse also resets FF's 1121 and 1122.

Figure 11C:
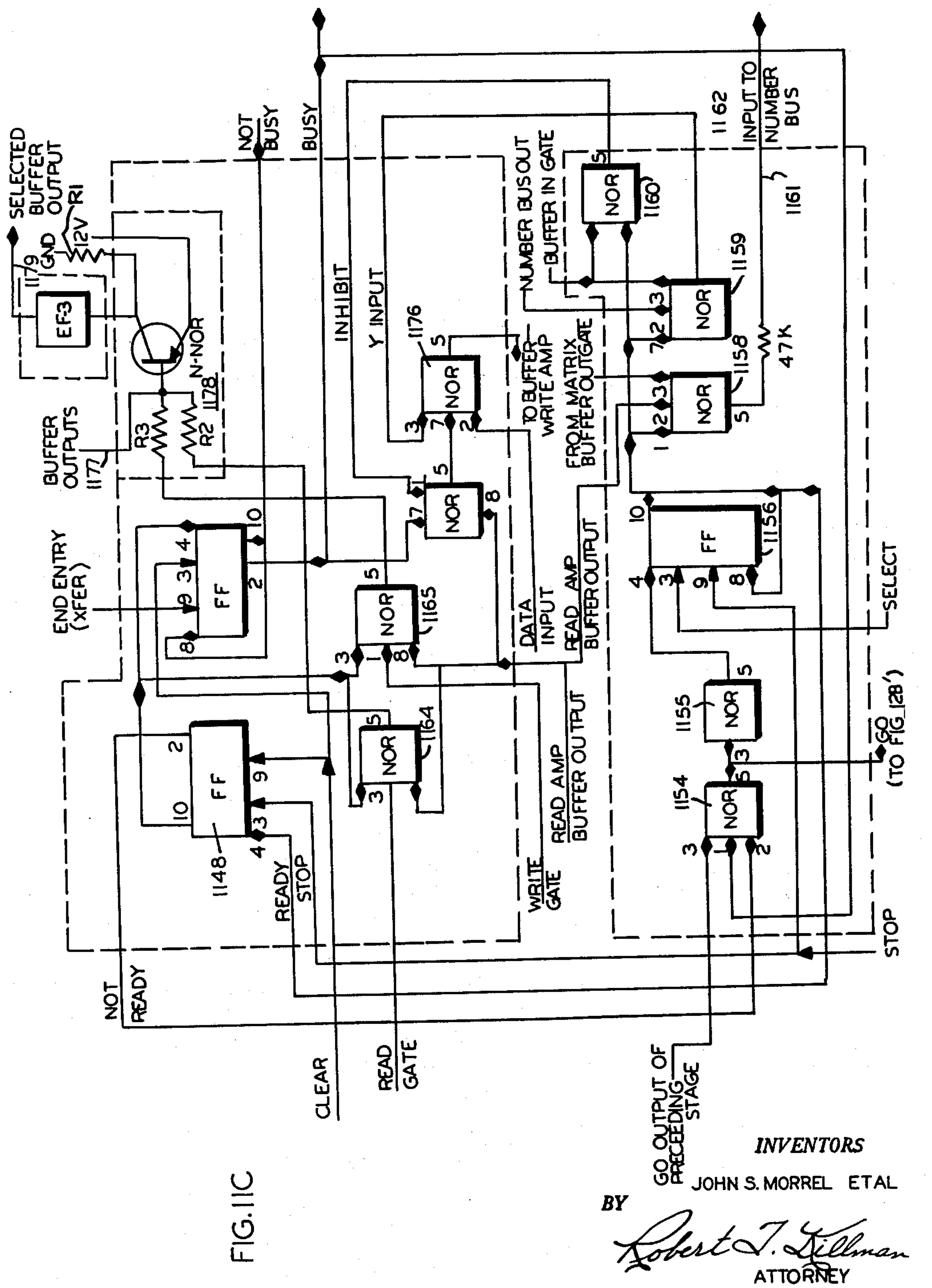
FIG. 11C is a logic diagram of the buffer stage No. 2.

The reset or ZERO outputs of the two FF's 1121 and 1122 enable two more inputs on NOR 1117 which will become fully enabled as soon as the SHORT TRANSFER GATE on line 1123 occurs. The negative output of NOR 1117 is inverted in inverter NOR 1124 and used for two purposes: (1) to enable gate 1125 which provides SHIFT pulses on line 1126 to the TIME storage register 1304 and (2) to enable NOR 1127 and allow TIME bits on line 1128 to enter NOR 1129 from which they will pass to the BUSY, NOT-BUSY NORS 1131, 1133, 1135, 1137 and ANDS 1132, 1132, 1136 and 1138. The operation of the NORS and ANDS 1131–1136 is under the control of BUSY, NOT-BUSY inputs from the first three buffer stages 1106–1108 (FIGS. 11 and 11B) and the stages 1137 and 1138 are controlled by the BUSY, NOT-BUSY inputs from the last buffer stage 1109 (FIGS. 11 and 11C). The operation of the NORS and ANDS 1131–1136 as thus far described permits the entry of TIME values from line 1128 in the first three buffer stages 1106–1108. Entry of TIME values in the last buffer stage is controlled by the NOR 1137 and AND 1138.

After the first 30-bit word (during which the TIME entry takes place) an A pulse occurs on line 1141, advancing the two-stage counter consisting of FF's 1121, 1122 and NOR 1117 is disabled while NOR 1118 is enabled. The entry procedure is now repeated for the entry of an $h$ value from line 1142. At the conclusion of the $h$ entry, the A pulse on line 1141 advances the counter 1121, 1122 one more step and S entry from line 1143 takes place. At the conclusion of the third word (the S-word) the next BUFFER INDEX on line 1114 will occur, resetting FF 1115, and the A pulse on line 1141 which is generated at the same time advances the counter 1121, 1122 one more step, enabling a NOR 1139 which disables a gate 1144 so that further advance of the counter 1121, 1122 becomes impossible. At the end of the S word an END ENTRY pulse is generated by gate 1131 at A pulse time to conclude the three-word entry cycle in the selected buffer.

While each of these entries takes place a parity check is provided by FF 1145 which counts the number of ONES in each word, leaving a NOR 1146 enables at the end of the SHORT TRANSFER GATE on line 1123 if the number of ONES in a word has been even. This causes the parity bit which appears on line 1147 to be added in the bit 30 position as a ONE. If parity count at the conclusion of the SHORT TRANSFER GATE has been odd, NOR 1146 would be disabled and no parity ONE bit would be added. The parity FF 1145 is reset at the start of each new word by the same A pulse on line 1141 which drives the counter 1121–1122. This assures that each word is sampled separately and an individual parity count is made on each.

As previously described for the TIME entry, four sets of control NORS and ANDS 1131–1138 determine the buffer stage into which new data will be entered. The sets are made up of: (1) NOR 1131 and AND 1132 (2) NOR 1133 and AND 1134, (3) NOR 1135 and AND 1136, and finally, (4) NOR 1137 and AND 1138.

A BUSY line and a NOT-BUSY line are connected from the respective buffer stages 1106–1109 to the NOR and AND sets noted above and only one or the other of these lines will be active at any time. If data arrives at NOR 1131 and the NOT-BUSY line thereto is enabled, the data will enter buffer 1106 directly. On the other hand, if the NOT-BUSY line to NOR 1131 is disabled and the BUSY line to AND 1132 is enabled, the data will be transferred to the next stage (NOR 1133), where the same decision is made. New information is thus always entered in the first empty buffer stage encountered.

If all four buffers 1106–1109 should show a BUSY indication, the data leaving at the end line 1140 of the NORS and ANDS 1131–1138 will act as an overflow signal and will be used to actuate a front panel indicator. Because of the speed with which data is removed from the buffers, however, an overflow indication is more likely to indicate some malfunction rather than an actual overload. In either case, however, the alarm is meaningful to the operator.

BUFFER STAGES

Referring now to FIG. 11B the logic for any one of the buffer stages 1106–1108 is shown. Each buffer stage must be capable of accepting new input data on line 1151, providing that data to the arithmetic unit 1400, or delivering processed data to the active system 1200, and the three functions must be kept in isolation from one another.

Initially, the buffer stages is in the NOT BUSY/NOT READY condition, as indicated by the presence of an UP level at terminal 2 of FF 1148 and at terminal 10 of FF 1149. At the end of a data entry sequence, the END ENTRY pulse on line 1152 will change the state of FF 1149, providing a BUSY indication to the appropriate entry control ANDS 1132–1136 of FIG. 11A and enabling gate 1153. Later END ENTRY pulses on line 1152 will then be transferred through gate 1153 to the succeeding buffer stage END ENTRY inputs.

The buffer is now in the BUSY/NOT READY state, a condition which is recognized by NOR 1154. The GO output from a preceding stage is not present as an input to NOR 1154 in the first buffer stage (it will be described for the final stage shown in FIG. 11C). When NOR 1154 has BUSY, NOT READY inputs, it provides a DOWN level on its output and, through the inverting action of NOR 1155 enables an input of FF 1156 to pass a SELECT pulse.

When the arithmetic unit 1400 is ready to process a new S value, a SELECT pulse will enter, via line 1157, one of the buffer stages, and the selection will always be unique, since a buffer stage can be selected only if it is in the BUSY/NOT READY state and the preceding buffer stage is not in that state. This will prevent two successive buffers from being selected simultaneously when incoming data is particularly heavy.

The selection of a buffer by setting FF 1156 enables NORS 1158, 1159, 1160, which allows the arithmetic unit 1400 to have free access to the contents of the buffer both in removing information on line 1161 and introducing information on line 1162. This access continues until the STOP pulse is generated on line 1163 at the end of a computation, resetting FF 1156 and setting FF 1148 which has been enabled by the set output of FF 1156. The buffer is now in the BUSY/READY state.

When the active system 1200 again begins (at the next SUBINDEX pulse) to process data READ and WRITE gates on lines 1171, 1172 will affect NOR 1164 and NOR 1165 of the buffer, and will cause the contents of the buffer to be used in making a buffer-active channel comparison and transfer. After the transfer into an active channel takes place, a CLEAR pulse on line 1166 will reset both FF 1148 and FF 1149 and the buffer will be returned to the NOT BUSY/NOT READY condition. In this condition NORS 1167, 1168 are enabled, as is gate 1169, which permits succeeding READ, WRITE and CLEAR pulses on lines 1171, 1172, and 1166 to be passed on to later buffer stages.

The recirculating loop made up of a drum track, a write amplifier and head supplied from line 1173 and a read head and amplifier supplying signals to line 1174 is completed through NOR's 1175 and 1176. The loop is broken by disabling NOR 1175 during NOT BUSY periods by the absence of a BUSY output from FF 1149 and during entry of new data from the arithmetic unit 1400 which produces an inhibit output from NOR 1160. Thus while new data are entering through NOR 1176, the interruption of the loop produced by disabling NOR 1175 permits the removal of old data appearing at line 1174 through NOR's 1164 or 1165 (during READ or WRITE gates respectively) to line 1177.

Tho logic shown in FIG. 11C is functionally similar to that in FIG. 11B and includes a GO output from a preceding buffer stage applied to NOR 1154. The major difference lies in the fact that FIG. 11C is the last of the buffer stages, and consequently, it contains no provision for transferring the READ, WRITE and CLEAR signals to a successive stage. Other than this deletion, the circuit description for corresponding portions of FIG. 11C is identical to that for FIG. 11B.

The logic of FIG. 11C includes several circuits which serves the entire buffer system. There is a NOR 1178 which is used to combine the output leads from all four buffer stages 1106–1109 to produce the selected buffer signals during buffer-active channel transfer. Since the NOR 1178 is a special purpose device, it is shown schematically rather than appearing as a logic unit. The input resistors to this NOR 1178 are located with the associated driving circuits, for example the resistors connecting line 1177 with NOR's 1164 and 1165 in FIG. 11B. The input resistors related to inputs to NOR 1178 which originate in FIG. 11C are shown in FIG. 11C. The NOR 1178 thus supplies on line 1179 the output of the selected buffer.

Referring to FIG. 12A the logic of an active channel 1201 is shown. Each active channel element 1201 retains all data related to any one intruder aircraft from which data are being received. Upon receipt of a new entry for any aircraft, the active channel for that aircraft automatically precesses all of its stored data, preparing the channel for the next entry at the same time. There is provision for ten of these channels in the present disclosed embodiment of the invention.

The read head and write head for each active channel 1201 are separated by 90 bits on the drum (including the one bit stored in the read amplifier). Thus, when the read head is entering sector III of the drum, the write head will be at the beginning of sector II. This connection is not normally used for recirculating however, since the read head precedes the write head in encountering data on the drum. The configuration is, on the other hand, used for precessing data; i.e., for transferring data ahead by one sector length along the drum. The exact manner in which this takes place will be developed in the following discussion.

The entry of new data becomes possible at any SUBINDEX time when the SUBINDEX pulse on line 1251 sets FF 1252, enabling one input of NOR 1253 the output of which will drive through NOR 1254 the channel write amplifier. Following the SUBINDEX pulse, the READ gate on line 1255 will be ON for one word length (30 bits), enabling the reset input to FF 1252. The read amplifier output on line 1256 of the active channel is compared in EXCLUSIVE OR (X-OR) 1257 during this time with the output on line 1258 which is line 1179 of FIG. 11C of the selected buffer stage, and if any discrepancy appears, the X-OR 1257 will enable gate 1259 and cause FF 1252 to be reset, disabling NOR 1253. If a match occurs between the buffer TIME word (the first word in the buffer stage) and the active TIME word on line 1256 (the first word following the SUBINDEX) in any active channel, the FF 1252 in that channel will be left in the set condition and the buffer contents (TIME, *h*, *y*) are entered.

If, however, the buffer contents mark a new entry which has no matching TIME label in any active channel, all of the FF's 1252 will be reset during this time (30 bits after SUBINDEX). This condition is sensed in the active channel control 1202 (FIG. 12B) and a GATED BUSY BIT on line 1284 is generated, which again sets all FF's 1252 in those channels which are empty.

The full or empty condition of any active channel is indicated by the condition of FF 1274 and FF 1269. Normally, both of these are set to the ON condition (indicating a full channel) by any data entering the write amplifier from NOR 1254. They are also sampled on their OFF sides by an ERASE SAMPLE pulse on line 1268 which occurs at 5-second intervals. Usually, an ERASE SAMPLE pulse will set FF 1274 to its OFF state, and the data entering the channel during the next receiving sequence will restore it to the ON condition. However, if the five-second period between ERASE SAMPLE pulses produces no new input data, the next pulse will be allowed to enter FF 1269, the OFF input of which is gated open only when FF 1274 has been set to the OFF state previously. The GATED ERASE signal, which immediately follows the ERASE SAMPLE pulse, will then enter NOR 1271, accompanied by the OFF side output of FF 1269. An ERASE signal is thus generated by NOR 1271 on line 1273, which wipes the channel clear.

On the next data measurement, the GATED BUSY BIT input of FF 1252 will be gated open by FF 1269, and the channel will accept new data as described above. The entry of this data restores FF 1274 and FF 1269 to the ON condition.

At the conclusion of *h* time, only one NOR 1253 in only one selected active channel 1201 will have its inputs enabled by having its associated FF 1252 set, the FF 1252 in the next higher stage reset (line 1262) and the WRITE gate on line 1263 ON. The READ gate starts at SUBINDEX and lasts one 30-bit word. The WRITE gate starts 60 bits after SUBINDEX and has a duration of 90 bits. During WRITE time, the contents of the buffer register (the Y value) appearing on line 1258 will be written into the third word position of sector V in the selected active channel. The WRITE GATE on line 1263 remains ON for the next two word intervals, and as the buffer repeats its contents, the TIME and *h* values will be written into Sector I, words 1 and 2 in the selected active channel.

While the Y value was being written into sector V, the Y value stored in sector I was being read out on line 1256 and delivered through NOR 1264 to the multiplier line 1212 FIG. 12C. There it is used in the summation computation. As the drum continues to rotate, a PRECESS gate on line 1265 will be generated during each Y value time, thereby causing the Y value in any section to be simultaneously read out on line 1256, applied to the multiplier and by means of NOR 1266 transferred to the next lower numbered sector position. Since sector V is being written while sector I is being read, precessing is inhibited during this time, and the presence of the WRITE gate is used. Note that when the WRITE gate on line 1263 is present NOR 1267 disables NOR 1266 and circulation through the precessing loop is not possible.

At time intervals longer than five but shorter than ten seconds, ERASE SAMPLE pulses on line 1268 (from gate 1277 FIG. 12B) occur which set FF 1274 and enable the set input of FF 1269. If any data occurs in the output of NOR 1254 after that time, FF 1274 is reset and the set input of FF 1269 is disabled. However, if there is no output from NOR 1254 for the interval before the next ERASE SAMPLE, the next ERASE SAMPLE pulse will set FF 1269, enabling NOR 1271. Immediately after the ERASE SAMPLE pulse, a GATED ERASE signal (FIG. 12B FF 1276) on line 1272 will cause the ERASE input 1273 to the write amplifier to be actuated, clearing the channel. This serves to clear channels in which one report is missed (a condition which invalidates any other data in storage) and also clears channels which are of no further interest because the transmitting aircraft is out of range.

The active channel control element 1202 shown in FIG. 12B directs three separate functions which the active channel system requires: (1) the ERASE signals, (2) generation of the SELECT signals, and (3) checking of parity in the precessing loop.

The system is presently intended to erase any channel which omits or fails to receive any one data burst from any one target. To accomplish this within the active channels, an ERASE SAMPLE signal and a GATED ERASE signal are generated. The ERASE SAMPLE signal is a SUBINDEX pulse gated on a one-per-five-seconds interval, and the GATED ERASE signal is a gating level lasting for two drum revolutions after each ERASE SAMPLE (between successive SUBINDEX pulses).

The 5-sec. pulses generated by the burst clock are allowed to set FF 1275, enabling one side of FF 1276 and also enabling gate 1277. The next SUBINDEX passes gate 1277 and becomes an ERASE SAMPLE pulse. This SUBINDEX pulse also resets FF 1275 and sets the enabled side of FF 1276. The output of FF 1276 is the GATED ERASE signal, and is delivered to the active channels. The next following SUBINDEX pulse restores FF 1276 to its OFF state, ending the GATED ERASE signal.

The GATED BUSY BIT is a pulse used to sample empty active channels during a data entry cycle. It is also used to set the control FF in those channels during an erasing interval. The GATED BUSY BIT is thus required to be present if all active channels are reset during the *h* word of a data entry sequence, or, if an erase cycle is in progress.

The first of these conditions is satisfied by gating an A pulse into FF 1279 at the end of a READ GATE. The FF 1279 is reset at D time, thus generating a gate which encompasses the *h* word of the data input interval. If, during this same interval, all of the active channel inputs to NOR 1280 on line 1282 indicate that those channels have been reset (FF 1252 reset), NOR 1280 will generate an output which will be inverted by NOR 1290 and used to gate the A pulse on line 1283 to line 1284. This A pulse occurs at the end of the *h* interval.

The second condition is satisfied by connecting an output of FF 1276 to NOR 1290 (used as an OR circuit in this application) so that during an erase cycle, the A pulse will again be gated through to line 1284.

The generation of a SELECT pulse is obtained with the circuit of FIG. 12B' and is conditioned on two bases: first, the last arithmetic operation must be ended; and second, there must be unprocessed data in at least one buffer. This set of conditions is determined by allowing the STOP pulse (which marks the end of the arithmetic sequence) to set FF 1285 enabling one input of NOR 1286. If any buffer has a GO output (negative) applied to NOR 1287, the other input to NOR 1286 will also be enabled. If these two inputs to NOR 1286 are enabled, an enamling level appears at gate 1288 and the next SUBINDEX will become a SELECT pulse on line 1289.

Parity checking of the active channels 1201 is accomplished by OR connecting the outputs of NOR's 1254 of the active channels in OR 1291. Only one of the active channels 1201 is writing at any time, and that one will have its ONE'S sampled by a gate 1292 which drives the complement input of FF 1293. If the output of FF 1293 indicates even parity at the end of the word (i.e., at B pulse time on line 1294), an alarm will be actuated by the EVEN PRECESS PARITY output.

Referring now to FIGS. 12C and 12D, the logic of the maneuver computation will be described. The maneuver computation forms the summation of $(1-Fi)\cdot Y$ for five different Y values and five different values of $(1-Fi)$. In the disclosed system, where $F=-5$, the values of $(1-Fi)$ are: −9, −4, 1, 6 and 11. These values are permanently recorded on the drum in a location suitable for serial entry of the bits, and a SUBTRACT signal is also recorded on the subtract control track for each bit in the first two values. The $(1-Fi)$ values thus are recorded as the four bit binary numbers: −1001, −0100, 0001, 0110 and 1011 with the bits of each $(1-Fi)$ word spaced at 21 bit intervals.

A FF 1211 (FIG. 12D) is employed to control the add-subtract function in the adder-subtractor 1204. Normally, every MULTIPLIER RESET pulse occurring at the end of each maneuver accumulator word (21 bits in register 1219) returns FF 1211 to the ADD state. If subtraction is necessary, the SUBTRACT pulse associated with each $(1-Fi)$ bit immediately makes the change.

Input to and output from the adder-subtractor of FIG. 12D are processed by the circuitry of FIG. 12C. If a $(1-Fi)$ one bit appears at the input to FF 1209 prior to the Y value, NOR 1213 is enabled and the Y value enters the "B" input of the adder-subtractor 1204, the output of which is placed in storage in a 21-bit FF register 1219. Twenty-one bits later, a MULTIPLIER RESET pulse resets FF 1209. During the period in which FF 1209 was set, GATE 1223 was enabled in order to allow data to be shifted into the 21 bit register 1219. The 21 bit length for the maneuver accumulator register and the computation time are determined as follows:

| | Bits |
|---|---|
| Basic Y value length | 13 |
| Multiplying Y by a four bit number $(1-Fi)$ | 4 |
| Adding five similar numbers in the summation $\Sigma(1-Fi)\cdot Y$ | 3 |
| Sign | 1 |
| Total register length required | 21 |

When FF 1209 is reset by the MULTIPLIER RESET pulse, the GATE 1223 is closed and NOR 1213 is disabled, ending the entry sequence.

The next bit time will be a $(1-Fi)$ bit position, and if a pulse occurs (indicating a ONE in that position), the FF 1209 will reopen, again allowing the entry of data to the adder-subtractor 1204 through NOR 1213 and allowing shift pulses to pass GATE 1223.

The MULTIPLIER RESET pulse which terminated the first word period also advanced the counter composed of FF 1216 and FF 1217 from its initial condition. In that initial condition, NOR 1224 was fully enabled, generating a binary ZERO output which disabled NOR 1225. After the flip-flop counter 1216, 1217 has been advanced, however, NOR 1225 is enabled, and the output of the multiplier register 1299 is passed as to NOR 1210. Since the 21 bit register is one bit shorter than the 22 bit multiplier register 1299, the word entering NOR 1225 will be the original Y value, delayed one bit with respect to the contents of the 21 bit register. If the $(1-Fi)$ bit is a ONE in this word interval, this shifted Y value is added to that already in storage.

This procedure is repeated four times, for the four $(1-Fi)$ bits associated with each $(1-Fi)$ value. Each bit may be a ONE or a ZERO, and a partial product either is or is not entered in the 21 bit register, depending on the condition of FF 1209. After four multiplier reset pulses have occurred, FF 1216 and FF 1217 are returned to their original conditions. This disables NOR 1225, preventing any further entry of data into the 21 bit register, and also blocking recirculation through the multiplier register 1299.

Outputs from FF 1216 and 1217 are also selected so that NOR 1221 is enabled during the 21 bit interval which just precedes the fourth MULTIPLIER RESET pulse. The output of NOR 1221 is inverted by NOR 1215 and enables GATE 1222 during this interval. When the fourth MULTIPLIER RESET pulse does occur, it passes GATE 1222 and becomes a MULTIPLIER SAMPLE pulse, used in the maneuver alarm circuit.

The entire procedure above is repeated for each Y value, and the final summation is stored in the 21 bit FF register at the end of the fifth Y value. This last MULTIPLIER RESET pulse, as a MULTIPLIER SAMPLE pulse, samples the maneuver alarm circuit and causes an alarm to be actuated if the output of the adder-subtractor 1204 at that time is negative.

The MANEUVER ALARM is derived from five FF's 1126, 1227, 1228, 1229 and 1230 which are initially reset by the SUBINDEX pulse. Each word appearing on line 1212 is sampled through NOR 1210 during entry and any ONES present will gate FF 1226 to be set by the CLOCK input. If any ONE had occurred during the word, FF 1226 is set and the next MULTIPLIER SAMPLE pulse will reset FF 1226 and also pass the enabled gate 1231 to be registered in counter FF's 1227, 1228, 1229. If no ONES are present FF 1226 will remain reset, indicating the lack of a Y value for that interval.

If four successive Y values exist, the counter (FF's 1227, 1228, 1229) will be advanced to the 100 state, partially enabling NOR 1232. If, then, at the end of the fifth ($1-Fi$) interval, FF 1226 is set and the output of the accumulator 1219 is a ONE, indicating a negative sign for the summation in inequality (16), NOR 1232 will be fully enabled. For this condition the gating input of FF 1230 will be enabled and the next MULTIPLIER SAMPLE pulse will pass gate 1231 and will set FF 1230 to actuate a maneuver alarm device via line 1234.

The adder-subtractor which is employed with the maneuver computation circuitry of FIG. 12C is shown in FIG. 12D. The adder is a serial device and the CARRY (or BORROW) bit is delayed through a FF 1235 and reentered in the circuit. The external inputs are the A and B values and the ADD and SUBTRACT control lines from FF 1211. A SUM or DIFFERENCE output is the only output from the unit. The analysis of the adder-subtractor follows:

For an OR circuit, the output is expressed as $$f_{OR}=A+B$$

where the inputs are A or B, but where the same inputs are applied to a NOR, the output is given as $$f_{NOR}=\bar{A}+\bar{B}$$

Thus, OR 1236, NOR 1237 and NOR 1238 operate as a half-adder to yield the output:

$$\overline{\bar{A}+B}+\overline{\bar{A}+\bar{B}}$$

or $$\bar{A}\bar{B}+AB$$

This output of NOR 1238 is then combined with the CARRY (or BORROW) output of FF 1235 in a second half-adder composed of OR 1243, NOR 1244 and NOR 1245 to generate a SUM (or DIFFERENCE) output of NOR 1245 which is $$\bar{C}(A\bar{B}+\bar{A}B)+C(AB+\bar{A}\bar{B})$$

This is the correct expression for either the SUM or DIFFERENCE of two numbers A and B, and the only difference is in the generation of the CARRY or BORROW bit C.

The outputs of NOR 1237 and NOR 1246 are combined in NOR 1239 to produce ($AC+BC+AB$). When the ADD control line is UP the output of NOR 1239 is inverted in NOR 1240, reinverted in NOR 1241, and used as a CARRY signal to FF 1235. The same signal is inverted in NOR 1248 to drive the opposite input of FF 1235. The outputs of NOR 1244 and NOR 1249 are combined in NOR 1242 to produce [$\bar{A}B+B(AB+\bar{A}\bar{B})$]. When the SUBTRACT line is UP, the output of NOR 1242 becomes the driving signal for the delay FF 1235. The CLOCK input controls the delay FF 1235 and keeps its output in step with the rest of the system. The SUM (or DIFFERENCE) output is always available as the output of NOR 1245.

SYSTEM TIMING

All of the timing signals in this equipment are generated in the system timer element of FIG. 13A. The basic timing source for both units is an extremely accurate 409.6 cycle tuning-fork oscillator 1301. This oscillator 1301 drives a clipper and a pulse generator 1310. This pulse signal is counted down by an eleven-stage counter 1302 in order to generate one pulse precisely every five seconds at the output 1303.

The outputs of each side of each stage in the counter 1302 are connected to the respective inputs of corresponding stages of a storage register 1304, and upon receipt of an S MEASUREMENT READY signal the contents of the counter 1302 as of that time are transferred to the storage register 1304. The TIME value thus extracted and stored in register 1304 can then be read out as TIME input to a buffer stage when SHIFT TIME pulses appear on shift input line 1305.

The location (in time) of the various signals used in the computer will depend on the relative location of the A, B, C and D pulses generated by a cycle counter (FIG. 13B) and the location of the fifteen 30-bit words which make up one drum revolution. The first step in this direction is the separation of three words within one sector of the drum. This is accomplished by the circuitry of FIG. 13A'.

In FIG. 13A', A pulses are able to pass gate 1306 as long as the three stage ring counter 1307 is not in the W3 (word 3) state in the fifth sector which is defined by S10, S21, S31 being UP. That is, during W3 in sector V, gate 1306 is disabled and the counter 1307 is not driven by the A pulse at INDEX time, and instead, the INDEX pulse is allowed to reset the counter 1307 to the W1 (word 1) state. From this point, the counter 1307 will advance its UP output from stage to stage with successive A pulses. At the conclusion of each W3 interval in sectors I–IV, a BUFFER INDEX pulse is generated by an A pulse passing enabled gate 1308 at A time. The only omitted BUFFER INDEX is the one coinciding with INDEX time which is inhibited by the disabling of gate 1306 as above described.

For convenience in the later discussion, the three word intervals will be referred to as W1, W2, and W3, and the signal which is UP during W1 and W2 is labeled $\overline{W3}$.

The BUFFER INDEX pulses are used to keep track of the sectors in the drum system. These pulses are counted in a three stage counter 1309, with the counter modified to count the following special sequence: 111, 000, 100, 101, 110. Such sequence assures five equal unique output times. As in counter 1307, there is no count at INDEX time and the INDEX pulse is allowed to reset the counter 1309 to the 111 state.

The several special signals required for internal data processing are generated partly on the drum and partly by the logical arrangement of FIG. 13A''. The INDEX pulses are counted down by FF 1311, and the output gates 1312 and 1313 cause alternate INDEX pulses to serve as SUBINDEX and CLEAR signals.

After a SUBINDEX the output of FF 1311 which drives gate 1312 is UP for one full revolution, and this is used as an enabling level for NOR's 1314, 1315, 1316 and 1317.

NOR 1314 selects the W3 signal and produces a gate on line 1318 during every W3 time in the revolution following a SUBINDEX. This gate on line 1318 is the PRECESS control signal.

NOR 1315 isolates the first word of the first sector of the selected revolution and generates the READ gate on line 1319 during this time. NOR 1316 and 1317 combine the second and third words of sector 1 and the first word of sector 2 to create a WRITE gate on line 1321. NOR 1317 and NOR 1322 combine to generate a HEAD SWITCH signal which turns on the active channel write heads only during WRITE time or PRECESS time.

The first use of the system drum clock is made in the cycle counter of FIG. 13B. The cycle counter 1325 is a five stage FF counter modified to count to 30 instead of 32. To preserve the constants of the system the basic 27 kc. signal derived from the drum CLOCK track is applied to the input of gate 1323, and allowed to pass only when the circuitry of a clock start control 1324 is satisfied as to the condition of the system. The function of control 1324 is the inhibition of drum clock pulses and the K registers (FIG. 14B) until a predetermined point. This assures that the constant values stored in the three K registers will not be accidentally destroyed or displaced in time when the equipment is turned ON and OFF in the following manner.

When the CAS is placed in operation D.C. is applied to the equipment and all units started are capable of operating immediately, but the cycle counter 1325 can run only through the first A pulse, after which NOR 1326 and NOR 1327 hold gate 1323 disabled. Sufficient time for the counter 1325 to settle into this condition is allowed by the delay in an R-C network 1328 which drives clipper 1329. After the input to clipper 1329 has built up to the proper level, the output rises, enabling NOR 1331, and providing an enabling level to FF 1332. The next INDEX pulse sets FF 1332 providing an enabling signal on line 1333 for the K registers and for gate 1323. The system is thus started in synchronism with an INDEX pulse and will so remain until power is removed. When power is removed, the enabling signal to clipper 1329 is removed quickly, while the D.C. to the system decays more slowly. The rapid drop to the input of clipper 1329 causes it to change state, which disables one gating input of FF 1332 and enables the other side. The next A pulse to FF 1332 will end the operation of the K registers and will terminate input to the cycle counter 1325 by inhibiting gate 1323 thereby preserving the constant values in the K registers.

The cycle counter 1325 is a five stage binary counter, with feedback to add a 1 in the $2^1$ position whenever the counter total reaches 10000. The count therefore jumps from 10000 to 10011, skipping 10001 and 10010. The maximum count is thus reached in 30 intervals instead of 32, to define the 30-bit word used in implementing the system.

Four NOR circuits are used in counter 1325 to combine the outputs of the five FF stages to obtain the intervals which control the A, B, C and D pulses at the following times:

At end of 11111 interval: A pulse (first pulse in word)
At end of 00000 interval: B pulse (second pulse in word)
At end of 00001 interval: C pulse (third pulse in word)
At end of 11110 interval: D pulse (29th pulse in word)

The intervals are selected by the four aforementioned NORs, the outputs of which are applied as enabling inputs to gates 1334, 1335, 1336 and 1337. The outputs of the gates 1334–1337 derived from the drum clock are the actual A, B, C and D pulses.

A FF 1338 and gate 1339 serves to mark the end of a computation for the active channel system so that a new processing sequence can be started at the proper time. When the STOP instruction from the program matrix 1351 is generated, the next B pulse sets the FF 1338 and enables gate 1339. The next CLEAR pulse resets the FF 1338 and generates through gate 1339 the STOP pulse which is used by the active channel.

REPEAT COUNTER

The repeat counter of FIG. 13C utilizes a five stage FF counter 1341 to delay the advance of a program counter 1360 (FIG. 13E) for operations requiring more than one word-length. The repeat counter can be pre-set by applying gating levels to input terminals 1342 to condition NOR's 1340 to permit the next B pulse passing gate 1343 to establish the desired preset. The counter 1341 is always set to (33−$n$) where $n$ is the number of words required in the program step. The advanced pulses (D-pulses) which would normally drive the program counter 1360 are then used to advance the repeat counter 1341 instead.

The outputs of this counter 1341 are connected to NOR 1344 so that whenever the repeat counter 1341 is in a non-zero condition, gate 1345 is enabled allowing it to pass the ADVANCE pulses. When the repeat counter 1341 is restored to an all-zeros state, gate 1345 is disabled, the input to the repeat counter 1341 is cut off and the program counter 1360 is advanced instead, because of an enabling signal derived from inverter 1346 which produces the PROGRAM ADVANCE gate.

The inputs 1342 to the repeat counter preset circuitry are six in number and provide for word counts of 2, 4, 8, 15, 17 and 30 bits as shown. The inputs 2, 4, 8 and 15 are derived from the shift plug board 1356. The 17 and 30 bit shifts are obtained respectively from the DIVIDE and MULTIPLY outputs of NOR's 1357 of FIG. 13D.

MATRICES

The matrices and their associated plugboards shown in FIG. 13D allow a wide range of versatility in program selection. The twelve outputs of the six-stage program counter 1360 are used as inputs for 60 six-input NOR's 1351, and the outputs of these NOR's 1351 are connected to a bank of plugboard connectors 1352. From this panel 1352, connections can be made to any one (or more) of four other plugboards: Instructions board 1353. WRITE IN gates board 1354, READ OUT gates board 1355 and SHIFT board 1356 for selecting delay length for shifting purposes.

The program matrix NOR's 1351 at any given time will provide one unique output on the sixty available lines to plug board 1352. Plug board 1352 is connected by the program connections hereinafter described to the boards 1353, 1354, 1355. The board 1353 supplies the inputs to ten NOR's 1357 which supply the instruction signals shown to the program control circuit of FIG. 13F. Board 1354 supplies the inputs to ten NOR's 1358 to produce the WRITE gates shown for the arithmetic unit while board 1355 supplies inputs to eleven NOR's 1359 to produce the READ gates shown for the arithmetic unit. The shift plug board 1352 supplies preset inputs 2, 4, 8 and 15 to the repeat counter (FIG. 13C). The NOR's 1357, 1358, 1359 provide outputs generated on a selected line for each of several inputs. For example, although program step 26 in board 1352 is ON for only one out of 60 steps, the MULTIPLY instruction from NOR's 1357 may be connected through board 1353 to steps 7, 13, 26, 31 and 40 and will be enabled at each of those times.

PROGRAM COUNTER

The program counter shown in FIG. 13E includes a six-stage binary counter 1360 with internal feedback around the first five stages similar to that in the cycle counter. The 111111 count is therefore reached at 60 instead of 64 counts.

Two preset inputs are also provided. One input on line 1361 jumps the count to 111111 and another input on line 1362 resets to 000000. For the 000000 condition a gate 1363 is inhibited and prevents the counter 1360 from advancing. Each pre-set is accomplished by the voltage level enabling input on either line 1361 or 1362 and a B pulse.

When the counter 1360 is in the all-zeros state, operation of a program sequence is started by generating in the active channel control a SELECT pulse which sets the counter to 000001. The outputs of each stage of counter through emitter followers.
1360 are delivered to the prgram matrix (1351 FIG. 13D)

PROGRAM CONTROL

The program control shown in FIG. 13F is primarily concerned with the coordination of special gating functions which are unique to a particular instruction.

A pair of FF's 1366, 1367 are driven by A, C and D pulses to produce two transfer gates: there is a SHORT TRANSFER GATE on line 1368 starting at C time and ending at D time and there is a LONG TRANSFER GATE on line 1369 which also starts at C time but continues until A time. The difference between the two lies primarily in the fact that the longer gate includes a parity bit.

A circuit made up of FF 1371, FF 1372, and 1373 and OR 1374 determines whether the adder-subtractor in the arithmetic unt will be in the ADD or SUBTRACT mode. Every A pulse normally sets FF 1372 so that the SUBTRACT mode will prevail, unless one of the following conditions exists:

(1) The instruction is ADD, or CLEAR AND ADD, or MULTIPLY, or
(2) The instruction is DIVIDE and the last quotient bit was negative.

In either of these conditions, the B pulse immediately following the A pulse will reset FF 1372 to the ADD state. B pulses also reset FF 1371, which will remain reset (ONE input to AND 1373) unless the sign bit on line 1375 out of the adder-subtractor during the preceding word was a ZERO, which indicates a positive sign thereby setting FF 1371 to disable AND 1373.

The output of FF 1371 which is connected to AND 1377 is UP for a negative quotient and the other output of FF 1371 provides on line 1376 a Q SAMPLE signal to the M/Q register. When a "jump on-" signal appears as an input to AND 1377, if the adder-subtractor output 1375 is then negative, the program counter 1360 will be advanced to 111111. This advance of the program counter 1360 is independent of the division process and appears here only because it makes use for the determination of sign of the same adder-subtractor output as does the division quotient. The program control as thus far described has examined the sign of equation $$R^2+4Z(Z-h+10)-(S+R)^2<0$$

to generate an alram if required by the $S_0$ computation.

An OR 1378 and OR 1379 sample the instruction lines ADD, SUBTRACT, MULTIPLY, DIVIDE, CLEAR & ADD, SHIFT LEFT & SHIFT RIGHT in order to generate A and B add gates for the arithmetic unit. A similar sampling is accomplished by OR 1381, OR 1382, and OR 1383, which condition FF's 1384, 1385, 1386, 1387 for the control of accumulator and M/Q register length. By way of example, if the instruction is Multiply, the ADVANCE pulse will reset all four FF's 1384–7 and the next B pulse will then set all four. The accumulator and M/Q register will thus be set to the $N-1$ state. The function of the two FF's in each set of length controls may be understood by examining FF 1384 and FF 1385. There are four possible states for the two FF's and three desired outputs: N, $N+1$ and $N-1$. With FF 1384 reset, FF 1385 will be without effect (see FIG. 14A) and the N output will prevail. When FF 1384 is set, however, the $N\pm1$ output conditions the NOR's 1411, 1413 (FIG. 14A) which are selected by the state of FF 1385 and thus the condition of FF 1385 will control the accumulator register length setting.

Parity checking is carried out in OR 1380, NOR 1388, AND 1389, AND 1390 and FF 1391. If the program step in use calls for output from the accumulator or M/Q registers, OR 1380 enables AND 1389 and disables AND 1390. The output of the arithmetic unit parity FF 1437 (FIG. 14C) is then sampled by FF 1391 and if there is a parity error, the correct bit is added via line 1392 to the word in the parity bit location. When the word being examined is derived from any location other than the accumulator and M/Q registers, parity should be correct and error will indicate a parity failure. Therefore, AND 1389 is disabled in such a situation, and AND 1390 is enabled. If even parity is detected (i.e. AND 1390 is enabled by the parity FF 1437) at the end of a word, a signal is provided (EVEN ARITHMETIC PARITY) which operates a front-panel alarm.

ACCUMULATOR AND M/Q REGISTERS

The accumulator and M/Q registers must each be capable of having a length of N, $N-1$ or $N+1$ bits (where $N=30$ in the present system), subject to some external control. The logical configuration which provides this is shown in FIGURE 14A. These two registers are similar and only the M/Q register is shown in FIG. 14A. The differences for the accumulator register will be described hereinafter.

The register which is being driven is basically a recirculating drum register which has a basic length of twenty-nine bits. Two additional stages of delay are incorporated in the control circuits in the form of a two-stage shift register FF's 1409, 1410, and the length of the recirculating loop is determined by allowing the recirculation to be direct or delayed by one or two bits through FF's 1409, 1410.

The direct output of the read amplifier is connected to NOR 1411, connected as an AND gate and the outputs of the two delay stages, FF's 1409, 1410, are connected to two NOR's 1412, 1413 also AND connected. The four input lines (labeled N, $N-1$ and $N\pm1$) are connected to the three NOR's 1411–1413 so as to select only one of the three and allow only that one to pass signal to a combining NOR 1414. Note that the $N+1$ and $N-1$ inputs are ineffective in themselves and either must be combined with the $N\pm1$ input in order to actuate NOR 1411 or 1413.

The output of NOR 1414 is combined with the inverse of the register WRITE signal from inverter 1415 in order to prevent recirculation while some new data is being entered in the register. All input is combined in NOR 1416 and directly entered in the write amplifier. In addition to the recirculating data input, two other sources of information exist for NOR 1416.

In the accumulator the portion of FIG. 14A to the left of the dashed line is omitted and the write amplifier is driven by the SUM or DIFFERENCE output of the adder-subtractor.

The circuit of FIG. 14A which is used for the M/Q register receives a Q-SAMPLE on line 1418. The quotient on line 1419 is generated by the joint action of two signals. One of these is the Q SAMPLE on line 1418 which exists during bits 30, 0 and 1 of two successive words; the other signal is a divide or multiply instruction. The Q-SAMPLE is present as a binary ONE only if the sign of the preceding value has been positive.

The third source of input to the NOR 1416 is the output of the number bus 1420, combined with the SHORT TRANSFER GATE and a WRITE signal for the M/Q register.

Associated with each of the M/Q and accumulator registers is a NOR 1421 which has an output to the number bus input 1422. The NOR 1421 is gated by a READ gate and the SHORT TRANSFER GATE.

ARITHMETIC REGISTERS

There are eight 30-bit recirculating registers 1403–1406 (FIG. 14) in the computer. In FIG. 14B, the description of one register will be given, the operation of the remaining registers being identical.

Read amplifier output enters NOR 1423 and NOR 1424. From NOR 1424, it will normally pass to NOR 1425 and be entered into the drum track again. If the track is being written in, the WRITE signal on line 1426 inhibits NOR 1424 and enables NOR 1427. When the LONG TRANSFER GATE and number bus output are also present, the number bus data enters the write amplifier.

When the register is being read, the READ gate on line 1428 is combined with the LONG TRANSFER GATE to enable NOR 1423, and the contents of the register are made available as number bus input 1422.

A REGISTER AND CONTROL LOGIC

The A register control logic is shown in FIG. 14C. This register is a general purpose, fixed-length register used for certain arithmetic computations. The output of the read amplifier normally enters NOR 1429 and passes directly to NOR 1431, from which it is reentered into the write amplifier. This recirculation is inhibited as a result of the A-register WRITE gate on line 1432 only during the time the A-register is being written in.

When the A-register is being read, the A-register READ GATE is combined with a LONG TRANSFER GATE in NOR 1433, and the output is taken directly to the number bus input 1422 of the number bus NOR 1434. All other number bus inputs are equipped with an input resistor at the origin of the signal, and these are tied together at the NOR input 1422.

When writing data into the A-register, the WRITE signal and LONG TRANSFER gate and the output on the number bus 1420 are combined in NOR 1435 and entered in the write amplifier.

Number bus output 1420 is continuously monitored by gate 1436 and FF 1437 and an indication of parity condition is constantly available at the output of FF 1437. This is the source of the PARITY FF signal.

NOR 1438 and 1439 allow a SHORT TRANSFER gate to be generated by FF 1441 only if there is a B ADD GATE present. FF 1441 will be set only if the multiplier bit (in a multiplication process) is a "1." When this condition is satisfied and a SHORT TRANSFER gate is present, number bus output 1420 becomes B input (line 1442) to the adder-subtractor.

The combination of A ADD gate, accumulator output, and SHORT TRANSFER gate in NOR 1443 produces A input out of NOR 1444 to the adder-subtractor. The A ADD gate is also inverted on line 1445 for use in the accumulator register of FIG. 14A as an inhibiting signal. In addition, the output of the accumulator (FIG. 14A) is entered in the FIG. 14D adder-subtractor A input whenever an A ADD gate is present during a SHORT TRANSFER gate. The presence of the A ADD gate is used to inhibit recirculation of the FIG. 14A register while this data is processed. The output of the FIG. 14D adder-subtractor thus enters the FIG. 14A accumulator directly through NOR 1417.

The following program table gives the wired program connections for the plug boards of FIG. 13D.

The sequence of steps from 1 through 18 accomplish the $S_0$ computation and the steps 19 through 40 compute Y from the S and Z data and replace S values by Y values in the buffer. Step No. 1 starts when a buffer is full.

*Program Table*

$K_1$ 10,000 counts
$K_2$ 100 counts
$K'_3$ 10 counts

| Step | Instruction plug board 1353 | Read out gate 1355 | Write in gate 1354 | Shift plug board 1356 | Remarks |
|---|---|---|---|---|---|
| 1 | Transfer | | Z | | |
| 2 | Transfer | Buffer | h | | |
| 3 | Transfer | Buffer | S | | |
| 4 | Clear & Add | S | | | |
| 5 | Add | $K_2$ | | | |
| 6 | Transfer | Accumulator | A-Reg. & M/Q | | $(S+R_0)^2$. |
| 7 | Multiply | A-Reg | | | |
| 8 | Transfer | Accumulator | Temp. Storage | | |
| 9 | Clear & Add | Z | | | |
| 10 | Subtract | p=(30-h) | | | |
| 11 | Add | $K'_3$ | | | |
| 12 | Transfer | Accumulator | A-Register | | 4Z(Z−p+10). |
| 13 | Transfer | Z | M/Q | | |
| 14 | Multiply | A-Reg | | | |
| 15 | Shift Left | | | 2 bits | |
| 16 | Subtract | Temp. Storage | | | $4Z(Z-p+10)-(S+R)^2$. |
| 17 | Add | $K_1$ | | | Add $R_0^2$ to above; if (−): |
| 18 | Jump on (−) | | | | Jump to 111111. |
| 19 | Clear & Add | Z | | | |
| 20 | Shift Left | | | 15 | 2 Z in divisor position. |
| 21 | Transfer | Accumulator | A-Register | | |
| 22 | Clear & Add | S | | | |
| 23 | Shift left | | | 8 | S in dividend position. |
| 24 | Shift Left | | | 2 | |
| 25 | Shift Left | | | 1 | |
| 26 | Divide | A-Reg | | | S/2Z=X. |
| 27 | Transfer | M/Q | Store | | |
| 28 | Clear & Add | S | | | |
| 29 | Shift Left | | | 15 | S in divisor position. |
| 30 | Transfer | Accumulator | A-Register | | |
| 31 | Clear & Add | Z | | | |
| 32 | Shift Left | | | 8 | 2 Z in dividend position. |
| 33 | Divide | A-Register | | | 2Z/S=1/X. |
| 34 | Clear & Add | M/Q | | | |
| 35 | Shift Left | | | 4 | |
| 36 | Shift Left | | | 1 | 1/X−X=Y. |
| 37 | Subtract | Store | | | |
| 38 | Shift Right | | | 4 | |
| 39 | Transfer | Accumulator | Buffer | | Enter Y in Buffer. |
| 40 | Stop | | | | Jump to 00000. |
| ↓ | | | | | |
| 59 | Stop. | | | | |

The logic circuits used in the computer are shown by the schematic circuit diagrams of FIGS. 15–20 inclusive with the respective logic block shown in FIGS. 15A-20A. The function and operation of these circuits are well known and they will be only briefly described. The flip flops of FIG. 15 have pulse inputs 5 and 7 and gated pulse inputs 3 and 9 which require gating levels on inputs 4 and 8 respectively to change the state of the flip flop.

The gate of FIG. 16 is a single-shot which produces a square pulse output on terminal 5 if an enabling level on terminal 2 and a pulse on terminal 1 coincide.

The NOR of FIG. 17 is conventional and the symbol of FIG. 17A is used with the understanding that unused inputs are grounded.

In FIG. 19 if both diode inputs 8 and 2 are +12 v. the output 5 is +12 v. For the OR of FIG. 20 if either input 8 or 2 is +12 v. the output 5 is +12 v.

FIG. 18 produces an output at ground potential if both inputs are ground or both +12 v. If the inputs are different i.e. one ground and one +12 v. the output is +12 v. This is an EXCLUSIVE-OR circuit.

The following additional comments will be helpful in understanding the disclosure.

Emitter followers are employed as required for impedance transformation without signal phase reversal. Such logic units are labeled EF and the schematic therefor is given with the number bus NOR 1434 of FIG. 14 $C_1$.

NOR's with a single input are used as inverters for signal phase reversal.

Some of the flip flops (FF) have designations of D for a diode included in input leads from terminals 5 and 7. If designated W the diode is replaced by a wire.

Some of the logic units are designated F or S for fast or slow depending on the switching speed required.

In some figures (FIG. $13B_1$ for example) a diode AND gate is shown schematically with a resistor capacitor and diode, while other figures (FIG. 13C for example) use the diode in the FF logic unit to form the AND gate.

ALTITUDE SEPARATION *h* MEASUREMENT

The altitude separation *h* measuring unit gives the separation in feet between the intruder and the protected aircraft. This distance is determined by measuring the time interval between the DIRECT pulses from the intruder aircraft and the end of the altitude interval of the protected aircraft. This time interval does not give the quantity *h* directly but gives the quantity $30-h$ because *h* is defined to be zero when the direct pulse falls in the center of the altitude interval. The constant 30 arises from the fact that there are 60 counts in the 3 ms. altitude interval when the clock pulse rate is 20 mc.

As an illustration, if the DIRECT pulse from the intruder came ½ microsecond after the beginning of the altitude interval the count would be 50 and $h=-20$. This would mean that the intruder is 500 feet below the protected aircraft since each count is equivalent to 25 feet altitude separation.

FIG. 21 shows the additional equipment necessary for operation with units of FIG. 5 for obtaining a *h* measurement. A DIRECT pulse passing through the altitude gate 902 sets a counter gate FF 2101 to enable a counter gate 2102 to pass twenty megacycle clock pulses from generator 909 to an eleven stage counter 2103. Counter gate 2101 is reset at the end of the altitude interval by the output from the three microsecond delay 905. The count accumulated in counter 2103 is transferred by the delay pulses from unit 919 to an *h* register 2104. The connection between the counter 2103 and the register 2104 is arranged for correction of the counter 2103 by an output of error gate 921 in the event a count is missed, as previously described for the S measurement. The *h* register 2104 is supplied with *h*-SHIFT pulses from the computer to readout to the computer on line 2105 the binary value representing the quantity $(30-h)$.

The stages of the *h* register 2104 are connected to a binary to-analog converter 2106 which operates a meter 2107 which has a scale calibrated from plus 750 feet to minus 750 feet. The meter 2107 and the converter 2106 produce a midscale reading for a count of thirty in the register 2104 and this reading is designated "0" on the meter scale since a count of thirty in register 2104 corresponds to a value of $h=0$. Counts greater than 30 produce negative values of *h* indicating the intruder is beneath the protected aircraft. All counts less than 30 produce positive values of *h* indicating the intruder is above the protected aircraft. The pilot of the protected aircraft can therefore determine by observing the meter 2107, when a maneuver alarm is given by the equipment, whether to maneuver up or down to avoid a collision.

Z MEASUREMENT

The S measuring unit of FIG. 5 is adapted for measuring the altitude, Z, of the protected aircraft by the equipment shown in FIG. 22. This equipment is alternative to the equipment described with reference to FIG. 6. In FIG. 22, the units numbered to correspond to units in FIG. 5 are the same elements and are reproduced in FIG. 22 to show the connection between the elements of FIG. 5 and the additional equipment shown in FIG. 22 necessary for the computation of Z.

A radar altitude measurement is initiated by a transmitter command pulse from line 628 of FIG. 6 setting FF 2201 to enable a gate 2202 which has a second input from the S MEASUREMENT READY signal from line 916. The S MEASUREMENT READY signal is produced on the sixteenth count in counter 916 in response to echoes of the transmitted signal from the terrain beneath the aircraft in a manner similar to the accumulation of sixteen counts during an S measurement. When this S MEASUREMENT READY pulse passes gate 2202 it is delayed twenty microseconds by delay unit 2203 and applied through a single-shot 2204 to transfer the count in the S register 924 to a Z register 2205. The output of the single-shot 2204 is also applied to reset FF 2201 thereby disabling gate 2202.

The operation of the equipment indicated in FIG. 22 to measure altitude accumulates a total count in the S register 924 until sixteen separate measurements have been entered. The S register 924 is operated to correct the counter 911 in the event that a count is missed in the manner previously described for the S measurement. The delay provided by delay single-shot 2203 provides a sufficient time for the S register 924 to reach the final total value of the sixteen measurements prior to transferring the average value of those measurements to the Z register 2205. The average of the sixteen measurements is obtained by transferring only the eleven most significant bits to the Z register 2205. Upon the application of Z-SHIFT pulses on line 2206 from the computer, Z register 2205 reads out the binary value of Z on line 2207. Since the actual interval counted to determine Z produces a count proportional to 2Z the count may be divided by two by transferring the eleven most significant bits in the S-register 924 to the ten most significant stages of the Z register 2205 and forcing the least significant stage to be always ZERO thereby omitting the least significant bit in the number supplied on the line 2207 to the computer.

The readout of Z data from the Z register 2205 is through a NOR 2208 which receives the output of the Z register 2205 via lead 2207. The NOR 2208 is controlled by the Z WRITE gate applied on line 2209 and by the DATA GATE applied on line 2211. SHIFT pulses are applied to to the Z register on line 2206 by a gate 2212 which also is enabled by the Z WRITE gate to pass GATED CLOCK pulses applied on line 2213.

The Z register 2205 has a recirculating connection 2214 to maintain Z data available when a plurality of aircraft are considered as intruders and Z data is required several times during any given five second interval. Upon the occurrence of the Z WRITE gate, the gate 2212 is enabled to permit the GATED CLOCK pulses on line 2213 to shift out of the Z register 2205 the eleven bit number representing the quantity Z averaged over 16 measurements as previously described. This binary quantity passes through NOR 2208 and becomes Z data to the computer through the shift connections of FIG. 23 during Z WRITE time determined by the Z WRITE gate and during the DATA GATE which is applied to line 2211. The DATA GATE is derived from the circuit of FIG. 24, and permits only an 11 bit number to be transferred thereafter, preventing further output from the Z register to the Z data line and preventing the binary bit existing at the output of the Z register 2205 from being effectively transmitted for the remainder of the word time.

In addition to the shift out of Z data, the circuit of FIG. 22 includes a gate 2215 which is enabled by the output of flip-flop 2201 to pass the S MEASUREMENT READY signal on lead 913 to the computer via the circuit of FIG. 23 by connection to terminal 2303. Gate 2215 serves the function of interrupting transmission of the S MEASUREMENT READY pulse to the computer whenever the flip-flop 2210 is set by the signal from the line 628, thereby avoiding the possibility of the computer considering an altitude measurement to be an S measurement. The passage of the S MEASUREMENT READY pulse through gate 2202, delay 2203 and driver 2204 to reset flip-flop 2201 enables gate 2215 in order that the next S MEASUREMENT READY signal from line 913 can be passed to the computer for normal S measurements.

The circuit of FIG. 24 is employed to provide the correct number of SHIFT pulses for the type of data being shifted, the correct number of shift pulses appearing on the GATED CLOCK output lead. The circuit also provides the DATA GATE output which is coincident with the duration of the SHIFT pulses for the purpose of preventing the final bit in a register representing a data input after the data word has been shifted. The circuit of FIG. 24 passes computer CLOCK pulses through gate 2401 to supply the GATED CLOCK output. The GATED CLOCK pulses are also applied to the four-stage flip-flop counter 2402 which is connected to NORS 2403 and 2404. The NOR 2403 is connected to the counter 2402 to produce an output after eleven counts, with the output supplied as one input to a NOR 2405. In a similar manner, the NOR 2404 is connected to the counter 2402 to supply an output after a count of seven to another input of the NOR 2405. The remaining input of the NOR 2405 is supplied from the SHORT TRANSFER gate. The output of the NOR 2405 is inverted in NOR 2406, the output of which is the DATA GATE applied to the shift control gates in the Z register readout circuit of FIG. 22. The DATA GATE is also applied to control the gate 2401. The counter 2402 has reset inputs connected to the A pulse.

The operation of the circuit of FIG. 24 is as follows. An A pulse resets the counter 2402 at the beginning of each word time and the C time starts the SHORT TRANSFER gate to enable NOR 2405 and produces a DATA GATE output. The DATA GATE output enables gate 2401 so that CLOCK pulses are counted in the counter 2402 and simultaneously supplied to the appropriate registers by the GATED CLOCK output lead which is connected to the GATED CLOCK input of FIG. $11A_2$ and FIG. 22. When the counter 2402 has reached a count of 11, the NOR 2403 is satisfied and NOR 2405 is not satisfied, thereby disabling gate 2401 and ending the DATA GATE output. Thus, eleven pulses are supplied out of the GATED CLOCK lead and the DATA GATE output lasts for the duration of the eleven shift pulses so supplied. In the event that the portion of the computer computation requires that *h* data be supplied, the *h* gate input to NOR 2404 will be available to satisfy all of the inputs of NOR 2404 when the count of seven is reached by the counter 2402. Thus, NOR 2405 will be disabled at the count of seven, and the DATA GATE will end at the count of seven and the GATED CLOCK output will be limited to seven shift pulses, which is the number of shift pulses required for shifting out *h* data. Thus, the circuit of FIG. 24 supplies eleven shift pulses to the circuit of FIG. $11A_2$ and FIG. 22 for all shift times except *h* shift time, at which time it supplies seven shift pulses for shifting out *h* data. The DATA GATE output of FIG. 24 is applied to the NOR circuits 1131, 1133, 1135 and 1137 of FIG. $11A_2$ for the purpose of preventing the final bit of the register readout from being available after the shift sequence has ended.

FIG. 23 shows the interconnections between the computer and the S, Z and *h* measuring circuits for the data and SHIFT pulses. The data signals pass through a level setter 2301 for each quantity. Such a device is necessary because the ONE and ZERO voltages in the computer are +12 and 0 volts, respectively, whereas in the S-measuring unit these voltages are 0 and −6 volts. The difference is overcome by connecting the S-measuring units zero level to the computers +12 volt level. The following signals between the two units are necessary:

(*a*) Computer to S-measuring unit
  (1) Shift-S (pulse)
  (2) End entry (pulse)
(*b*) From S-measuring unit to computer
  (1) S-values (level)
  (2) S-measurement-ready (level in, pulse out).

Corresponding data and SHIFT connections are required for *h* and Z.

The two pulse signals from the computer are capacitively coupled to the S-measuring unit and referenced to the −6 v. D.C. level. The S-MEASUREMENT-READY signal applied to terminal 2303 is a level change which is differentiated to trigger single-shot 2305 to generate the pulse signal at terminal 2304 required by the computer.

The S-values are levels which are converted to the +12 to 0 volts range used by the computer and made available as input to the buffer.

The circuitry necessary for these transformations has been shown in schematic form in FIG. 23. A zener diode 2302 is used to convert the 0 to −6 volt swing in the S-measuring unit to a +12 to +6 volt swing in the computer.

The operation of the system will now be described with reference to FIGS. 11–14 assembled as shown in FIG. 25.

The entry of data to the disclosed system is initiated by receipt of an S MEASUREMENT READY pulse which arrives from the S measurement unit. Upon receipt of this pulse three words of data are entered in the first available buffer stage 1106–1109. These are TIME, *h* and S, each of which is a thirty bit word. The TIME word is derived from the test logic and system timing unit. The *h* and S values are derived from the external *h* and S measuring units. All of this information is entered in the buffer data entry unit 1105 from which it will be placed in the first available buffer stage. BUFFER INDEX pulses occur simultaneously with INDEX pulses and every ninety bits thereafter, and these ninety bit intervals are used to control the entry of data in a particulars buffer stage. Pulses which are derived from the cycle counter 1301 are used in finding the individual words and their entry into the buffer since the A pulses occur at the beginning of every thirty bit interval beginning with INDEX time. There is one INDEX pulse per drum revolution. The bit thirty signal which arrives from the cycle counter is used to establish a parity bit within each thirty bit word in the system. The SHORT TRANSFER gate generated by the program control 1320 allows entry of information only during the data portion of the thirty bit interval. CLOCK pulses which synchronize the timing of all the words in the system are obtained directly from the drum.

The new data entering the buffer data entry unit 1105 becomes the input to a series of gates which, in turn, are controlled by the outputs of control elements within each buffer stage. These gates determine whether or not a particular buffer stage contains any information. Each buffer stage is said to be in any one of three conditions. The NOT BUSY-NOT READY condition defines a buffer stage which contains no information. The BUSY-NOT READY condition defines a buffer stage which contains information which has not yet been processed by the arithmetic unit. The BUSY-READY state defines a buffer stage which contains information which has been processed by the arithmetic unit and is available for entry in an active channel 1201. The TIME, *h* and S values which have become available to the buffer data entry unit are thus entered in the first of the four buffer stages which is both NOT BUSY and NOT READY. Upon completion of this ninety bit sequence during which the three thirty bit TIME, *h* and S words are entered an END ENTRY pulse is generated which terminates the entry sequence. When the next S measurement ready pulse arrives the buffer stage which has just been filled will no longer be able to accept new information and the new data will be automatically transferred by the gating within the buffer data entry unit to the next buffer stage.

The gates which controlled the entry of new data into a particular buffer stage are the NOR and AND circuits 1131 through 1138. The transfer of TIME, *h* and S information is controlled by CLOCK pulses which are gated on the shift time shift *h* and shift S lines. The SHIFT TIME signals drive a shift register in the test logic and system timing unit and TIME information is then made available to buffer data entry. Similarly the *h* and S values are caused to enter buffer data entry by delivering the SHIFT H and SHIFT S pulses to the external *h* and S measuring units. When a buffer stage is placed in the BUSY and NOT READY condition, the transfer from NOT BUSY to BUSY being accomplished by the END ENTRY pulse, that buffer stage becomes available to the arithmetic unit, FIG. 14. This arithmetic unit contains a total of ten arithmetic registers 1401–1406. Two of these, the accumulator and M/Q registers, are thirty bits long and contain within the arithmetic No. 1 (1401 and 1402) control elements capability for lengthening or shortening these registers by one bit. Therefore, either the accumulator or M/Q registers may have a length of 29, 30 or 31 bits, depending upon the immediate demands of the computation program.

The other eight registers controlled by arithmetic No. 2 (1403–1406) and the A register and control elements 1407 are each thirty bits in length and contain no provision for lengthening or shortening. These arithmetic units are used to hold S value, *h* value, Z value and three constants 100, 20 and 10,000 and an A-register which is used as an auxiliary arithmetic computation storage register. An adder-subtractor 1408 is used as the basic arithmetic unit for this system. The arithmetic unit will operate on the information contained in a buffer stage by following a 38-step program. The first eighteen steps of this program are concerned only with immediate proximity danger for the target defined by the information in the buffer stage. If no immediate proximity danger exists the remainder of the program is executed and the result is the computaion of a value defined as Y, a value based upon the S value contained in the buffer stage.

The arithmetic program for Y computation is controlled by the pulses and gating levels generated by the cycle counter 1301, repeat counter 1326, program counter 1304, matrices and plug boards 1305 and program control units 1320. The cycle counter 1301 generates A, B, C and D pulses which occur at the beginning of the first, second, third and thirtieth bits of a thirty bit cycle. These pulses, in turn, drive the program counter 1304 which generates the individual steps of the arithemtic program. Each program step has a basic length of thirty bits which for certain operations requiring more than a single program step may be lengthened by the action of the repeat counter 1326. The repeat counter 1326 also acts to inhibit further advance of the program counter for some predetermined number of program steps. The outputs of the program counter drive the matrices and plug boards 1305 on which the entire program may be prewired. These plug boards generate three main groups of control signals, READ gates, WRITE gates and instructions. There is also a fourth set of control signals which control the pre-setting at the repeat counter for those instructions which must occupy more than one program step. The instructions which are generated on the plug boards are ten in number.

The fundamental principle of the arithmetic unit involves allowing the outputs of all storage registers to be simultaneously available to the input of an AND circuit known as the number bus. The output of the number bus is in like manner at all times available to the input of each and every storage register. The matrices and plug boards, however, generate READ and WRITE gates for the various instructions which open only selected output gates and only selected input gates. Therefore, the input to the number bus at any time will be the output of only those storage registers whose output is invloved in the computation in process and the output of the number bus will be connected only to that storage register which is to receive the result of the arithmetic computation.

For example, for an addition (ADD) instruction, the output of the storage register whose contents are to be added will become input to the number bus. The output of the number bus will become one input to the adder-substractor 1408 which by a control signal derived from the program control unit will be held in the add condition. The second input to the adder-subtractor 1408 register to the contents of the accumulator 1401 and the tractor 1408 will add the contents of the selected storage register to the content of the accumulator 1401 and the resulting summation will be entered as input to the accumulator 1401. The CLEAR AND ADD instruction is identical to the ADD instruction except that the contents of the accumulator 1401 are not entered in the adder-subtractor 1408. That is, the accumulator 1401 is cleared as the new information is added. The result of this operation is the transfer of information from any storage register to the accumulator 1401.

A simple TRANSFER instruction causes data contained in any storage register to be transferred to any other storage register by opening the read gate on the register from which data are being taken and opening the WRITE gate in the register in which the information is being placed. This causes data to flow out of the register with the open read gate through the number bus and into the register with the open WRITE gate. A SUBTRACT instruction is identical to an ADD instruction except that the program control unit holds the adder-subtractor 1408 in the subtract state. The A reset pulse which enters the adder-subtractor clears any bit which may be contained in the carry flip-flop within the adder-subtractor at the termination of each thirty bit word. This prevents any CARRY from any one word from being propagated into the next word of the same or the succeeding computation step.

The MULTIPLY instruction is more complex in that a number of partial products must be assembled to obtain a final product. To perform a multiplication, the multiplicand is first transferred to the A register 1407. The multiplier is placed in the M/Q register 1402. The computer is now ready to accept the MULTIPLY instruction. At the beginning of a MULTIPLY instruction the accumulator 1401 and M/Q registers 1402 are reduced to 29 bit lengths. The A register which is not adjustable remains at 30 bits. This length change is accomplished by the accumulator and M/Q length control circuits contained in the program control unit 1320. The control elements are flip-flops 1384 through 1387 in that unit. Because the M/Q register is one bit shorter than the standard thirty bit length the information therein contained will appear to move one bit to the right at the end of each thirty bit cycle. With reference to the same thirty bit cycle the information contained in the A register will experience no motion at all.

Throughout a multiplication instruction, the adder-subtractor 1408 is held in the add condition. At the beginning of this arithmetic operation (the MULTIPLY instruction), the first bit of the M/Q register is sampled. If that bit is a ONE, an OR gate is opened in the A register and control unit which allows the contents of the A register 1407 to enter the adder-subtractor and be added to the contents of the accumulator 1401. The accumulator is empty at the start of a MULTIPLY instruction, so that this information is the only data contained therein at the end of the first word. At the conclusion of the thirty bit interval because of the shorter length of the M/Q register the bit which will now be sampled is that which was the second bit in the original M/Q word. Again, if this bit is a ONE, the gate in the A register will be opened and if a ZERO, the gate will be closed. Note at this point, however, that the accumulator which is also 29 bits in length will have shifted one bit to the right relative to the word contained in the A register. Therefore, if the contents of the A register are now added to the accumulator they will appear one bit to the left of the information already contained in the accumulator. In effect, adding the contents of the A register during this second word time is adding a partial product one bit displaced to the left from that already contained in the accumulator. This is repeated for each successive bit in the M/Q register with successive partial products being displaced one bit further to the left for each thirty bit word interval. The presence of a ZERO in any bit position in the M/Q register causes ZEROES to be entered in that partial product position. That is, no information will be added to the accumulator during that word time. The shifting of the A register, however, continues during each word time so that later partial products will always appear in the correct relative position.

Since there are thirty bits in the entire system word the multiply operation occupies a total of thirty program steps. In order to cause the program step to occupy this thirty word interval the repeat counter 1326 is preset to a value which inhibits advancing the program counter for thirty successive words. A thirty word program is therefore generated during which the contents of the A register are multiplied by the contents of the M/Q register, the partial products being added and placed in storage in the accumulator.

The DIVIDE instruction occupies less time but is somewhat more complicated. During a DIVIDE instruction the accumulator 1401 is set to 31 bits in length and the M/Q register is set to 31 bits in length. The quotient resulting from a division operation will appear in the M/Q register. The dividend will be placed in the accumulator prior to the start of the divide instruction and the divisor will be placed in the A register. The division process is a sequence of successive additions or subtractions each depending upon the result of the previous operation. At the start of the DIVISION instruction, the dividend and divisor are aligned so that most significant bit of each occurs in the same bit position. The divisor is then subtracted from the dividend and the sign of the resulting difference is examined by the program control unit. If the sign of the difference was positive then the subtraction was a valid one and the quotient bit resulting from that subtraction will be a ONE. This ONE will be entered as Q sample in the M/Q register. If the sign had been negative, indicating that the divisor was larger than the dividend in the particular alignment mentioned above, then the quotient bit will be a ZERO.

Because of the relative lengths of the accumulator and A register the next word interval will find the divisor shifted one bit to the right relative to the dividend. During this next interval if the preceding subtraction yielded a positive result a subtraction will again be performed. If, on the other hand, the first subtraction produced a negative sign then the second operation will be an addition rather than a subtraction. As the division process continues the divisor is shifted one bit to the right for each successive addition or subtraction and the decision as to whether the operation will be an addition or a subtraction is based upon the sign of the next preceding computation. If a particular stage of the operation yields a positive result the next operation will be subtraction. If the operation yields a negative result the next will be an addition. At the same time, positive results cause ONES to be entered in the quotient while negative results cause ZEROES to be entered in the quotient. Notice that the quotient is constructed beginning with the most significant bit.

Because of the lengths of the words involved and the accuracy required of the final result it is only necessary to compute seventeen bits of quotient. Therefore, the division process occupies seventeen program steps. As in the case of multiplication, this lengthening of the standard one word program step is accomplished by pre-setting the repeat counter and allowing it to inhibit the program counter for for seventeen word lengths.

The shifting operations SHIFT LEFT and SHIFT RIGHT which are used to place words in registers at the correct position for certain operations merely involve lengthening or shortening a particular register while the word therein is circulated. The shifting operations are always accomplished in the accumulator. Shifting right requires that the accumulator be shortened while shifting left requires that it be lengthened. Each word cycle causes the word in the accumulator to be moved one bit position. Therefore, the number of word cycles required for a particular shift is determined by the number of bits of shift involved. Again, the repeat counter will delay advancing of the program counter for the proper number of steps. The arithmetic program shows steps in multiples of 1, 2, 4, 8 and 15 steps only. This is true because these are the basic steps provided in the arithmetic computation.

The parity flip-flop output of the A register and control unit provides parity information to the program control unit with reference to the information circulating in the arithmetic system. The parity flip-flop monitors the output of the number bus at all times and parity indications are processed by the program control unit to actuate appropriate panel indicators.

The result of the 38 step program using the operations described above is the computation of a value of Y where Y has the value $$\frac{2Z}{S}-\frac{S}{2Z}$$

The next to last step in the arithmetic computation transfers this value of Y from the accumulator to the buffer. The program has been organized so that at the time of this transfer the Y word in the buffer stage being used is coincident in time with the output of the arithmetic unit. The Y word is therefore placed in the space formerly occupied by the S value so that at the completion of this transfer the buffer stage which formerly contained TIME, $h$ and S value now contains TIME, $h$ and a Y value. That buffer stage is now in the BUSY AND READY condition and can no longer accept new information nor can the information contained therein be processed by the arithmetic unit.

The only unit which now has access to that buffer is the active channel system. The first subindex pulse following an arithmetic computation causes a comparison operation to begin during which the contents of all active channels are compared with the contents of the buffer stage just processed. Each active channel is made up of five sectors around the periphery of the drum. Each sector contains ninety bits. The first sector contains within its ninety bits a TIME word, an *h* word and the Y word. Each of the other four sectors also contains a Y word at a physical position within the sector which corresponds to the Y word in the first sector.

At SUBINDEX time the TIME word in each of the active channels is in time coincidence with the TIME word contained in the buffer stage being examined. Beginning at SUBINDEX time a READ gate is generated which enables the output of the buffer stage and enables control circuits within each active channel so that the TIME word in the buffer stage can be compared with the TIME words in each active channel. At the conclusion of the TIME word if any active channel has had its time value exactly match that contained in the buffer stage that active channel will be the only one remaining enabled, all other active channels being disabled. If none of the active channels matched the information in the TIME word in a buffer stage all channels will be reset and during the following thirty bit interval a GATED BUSY BIT pulse will be generated which will enable all active channels which contain no data at all. Of these, the one active channel which is empty and adjacent to a group of filled active channels will be selected for the entry of the new information. Thus far two word intervals following SUBINDEX time have passed.

During the third word interval following subindex, the Y value contained in the buffer stage will be entered in sector V of the selected active channel. A WRITE gate is generated during this time which both controls the writing within the active channel and simultaneously enables read-out from the buffer stage. This WRITE gate continues not only during Y time but also during the buffer TIME and *h* intervals which will immediately follow the Y interval, the buffer stage being ninety bits long and continuously recirculating. During the TIME and *h* interval, these words are written into the selected active channel. If the active channel is newly selected the time word will be written for the first time. If, however, an active channel had been selected which already contained this TIME value, the TIME word is nonetheless rewritten.

During the time that the new Y value is being written into sector V of the selected active channel, that same channel was reading out the contents of the Y value in sector I. This Y value was transferred as Y input to the maneuver computation section 1203. As the drum continues to rotate each Y value is selectively picked out of its sector, this selection being controlled by the PRECESS gate generated by the test logic and system timing unit. The test logic and system timing unit also generates the READ and WRITE gates used in this entry operation. When the Y value in sector II is read out to maneuver computation it is simultaneously transferred to the Y position in sector I and when the Y value in sector III is read out it is transferred to sector II and so forth, with the new Y value in sector V being transferred to sector IV as it is read out. Therefore, as new data is entered in sector V it is continually precessed during each computation procedure to the next higher channel position. The contents of the Y word in sector I will always be the oldest Y value in the channel while the contents of sector V will after a computation and precessing operation be the same as the contents of sector IV.

In determining whether or not an active channel is empty the GATED BUSY BIT in entering that active channel must pass through a gate which is controlled by an erase circuit in each active channel. The operation of this system requires that five successive Y values be produced in order for a valid maneuver computation to be performed. If any one Y value is missing the usefulness of the remaining Y values is destroyed and the information is no longer of any value. Therefore, an ERASE SAMPLE pulse is generated at five second intervals which acts to set the second stage of a two stage counter. During the five second interval following each erase sample pulse the input to the active channel storage register is sampled and if any new information is entered in this active channel the counter is reset. Only if two successive erase sample pulses are received with no data entry intervening can the erase sample counter be completely reset. If this happens (if two erase sample pulses do arrive with no intervening data), the system assumes that the data which should have been contained within a five second interval has been missed and an ERASE signal will be provided to the active channel storage register which will completely remove any data contained in that register. A register thus erased is treated as an empty register when new active channels are being selected.

The maneuver computation unit collects the Y values generated by a selected active channel during a precessing operation and multiplies each successive Y value by the appropriate coefficient necessary for its position in the computation. The same coefficient is always applied to each sector, that is, a particular coefficient is always used in sector I, another for sector II, another for sector III, etc. However, since the Y values are precessed the five Y values which span the last five 5-second intervals are those which are treated by the maneuver computation section.

Multiplication by the coefficients within the maneuver computation section is a greatly simplified version of the multiplication contained in the main arithmetic unit. The multiplier is a $1-Fi$ value. This is a four bit number and it is stored on the drum in correct time position to perform the multiplication function. When a Y value enters the maneuver computation it is immediately multiplied by the least significant bit of the applicable $1-Fi$ value. At the same time this Y input is passed on to a multiplier recirculating register. The multiplier recirculating register is 22 bits long, one bit longer than the multiplier accumulator register, a 21 bit register which is part of the maneuver computation system. Because of the extra bit length in the multiplier register the Y value is caused to shift left one bit during each 21 bit cycle. At the conclusion of each 21 bit cycle, a MULTIPLIER RESET pulse resets the input gate to the maneuver computation system and only the presence of another $1-Fi$ bit can allow the contents of the multiplier register to be reentered. Four partial products are thus generated for each Y input value. Each of these partial products occupies a 21 bit interval for a total length of 84 bits. The maneuver computation accumulator register is then allowed to be idle for a total of 6 bits until the next Y input becomes available. The same multiplication operation is then repeated for the next $1-Fi$ bit and the new Y value, four partial products again being formed. This is repeated for each successive Y value until five Y values or a total of twenty partial products have been entered in the maneuver computation accumulator register. Three of the $1-Fi$ coefficients are positive and when these are being applied the adder-subtractor 1204 which operates in conjunction with the maneuver computation system is placed in the add condition. Two of the coefficients are negative, however, and when these are used, a SUBTRACT pulse appears on the drum prerecorded in the appropriate bit position and sets the adder-subtractor 1204 to its subtract condition. The A and B values leaving maneuver computation 1203 and entering the adder-subtractor 1204 are the two inputs to the adder-subtractor 1204. The SUM leaving the adder-subtractor 1204 becomes input to the maneuver computation accumulator. CLOCK and SUB-INDEX pulses are used to control timing and synchronization of the processing of the Y value summation.

If at the conclusion of the summation of five $(1-Fi)Y$ values, a condition exists which indicates that a maneuver is necessary, an alarm circuit is actuated which illuminates a front panel indicator.

It will be understood that the particular constants and arbitrary values set forth herein for the particular embodiment disclosed can be modified to adapt the system to the conventions finally established for air traffic control. For example, the altitude interval which is considered dangerous or the proximity limit can be readily altered in the present system as will be apparent to those skilled in the art.

While the preferred operation of the system contemplates the exchange of data between two fully equipped craft, it will be understood that the term data exchange and similar references to receiving data transmitted from another craft include the situation where one craft is fully equipped and the other is a minimum equipped craft having provision for transmission only.

Although equal altitudes have been designated as the condition for further evaluation of the signals to determine if a collision threat exists, it will be apparent that predicted altitude will be an important condition for climbing or descending aircraft. Hence, reference in the claims to altitude selection should be considered to encompass both conditions.

The present disclosure presents the maneuver alarm and maneuver indication in extremely simple form, but it will be appreciated that the data can be applied to other indicators or utilized for automatic maneuver control if desired. Accordingly, the term indicator or similar recitations in the claims is to be construed as including any such utilization of the threat evaluation data.

Many modifications of the present invention will now be apparent to those skilled in the art. For example, many diverse data exchange and computational arrangements can be conceived for achieving the desired result within the basic concepts of the invention. Such arrangements, as well as modifications of the disclosed embodiment will be within the spirit of the invention which is to be considered as not limited to the disclosed embodiment or modifications thereof, but only by the scope of the appended claims.

We claim:

1. The method of avoiding collision between craft having relative motion in a reference plane comprising the steps of transmitting altitude signals by each craft in said reference plane for the preliminary evaluation of collision threat and for the determination of the range between said craft without transponding action, providing identifying characteristics individual to the transmission from each craft, using on each craft said identifying characteristics for sorting and separately storing range values pertaining to a plurality of said craft, utilizing successive stored range values for a particular craft for evaluating the threat of collision with that craft, updating said stored values as subsequent ranges are determined to the respective craft, initiating a maneuver alarm whenever the evaluation of collision threat meets first predetermined conditions and discarding the stored values for any particular aircraft when the evaluation thereof meets other predetermined conditions.

2. The method of obtaining an indication of the threat of collision between aircraft comprising the steps of broadcasting periodically data bursts coded with the pressure altitude of the transmitting aircraft, receiving in said aircraft said data bursts over both direct and ground reflected paths, eliminating from consideration in the receiving aircraft signals received with altitude coding which is outside predetermined limits of the pressure altitude of the receiving aircraft, measuring the terrain clearance altitude in the receiving aircraft and utilizing the direct and ground reflected signals from aircraft within said predetermined limits of the receiving aircraft's pressure altitude together with the terrain clearance altitude of said receiving aircraft to evaluate the threat of collision between said aircraft.

3. A cooperative collision avoidance system for aircraft comprising means on each aircraft for periodically broadcasting data bursts representative of the altitude of the transmitting aircraft, means on each protected aircraft for receiving asid transmissions, means for separating signals received from aircraft within a predetermined altitude interval of the receiving aircraft, means for timing the separation between the direct and ground reflected path signal selected by said separating means, and means for combining quantities representing said separation and the altitude of said receiving aircraft to determine the approximate time to nearest approach, and means for producing an indication if said approximate time falls below a predetermined value.

4. A cooperative collision avoidance system for aircraft comprising means on all aircraft for periodically broadcasting bursts of pulses with the pulses in each burst spaced in accordance with the transmitting aircraft's own altitude, means on each protected aircraft for receiving said transmissions, means for eliminating received signals for which said pulses are not spaced within predetermined limits corresponding to the receiving aircraft's altitude, means for timing the separation between the direct and ground reflected pulses of received signals which are within said predetermined limits, and means for combining a plurality of quantities representing successive values of said timing with a quantity representing the receiving aircraft's own altitude to produce a maneuver alarm.

5. A system according to claim 4 in which the means for transmitting spaced pulses and the means for eliminating received signals are controlled by standardized barometric pressure devices and the quantity representing the receiving aircraft's own altitude is representative of terrain clearance irrespective of pressure altitude.

6. Apparatus for transmitting and receiving signals in an aircraft for a cooperative collision avoidance system comprising means for periodically broadcasting bursts of pulses with the pulses in each burst spaced in accordance with the altitude of said aircraft, means for receiving similar transmissions from other nearby aircraft, means for eliminating received signals for which said pulses are not spaced within predetermined limits corresponding to said altitude, means for timing the separation between the direct and ground reflected pulses of received signals which are within said predetermined limits, and means for combining a plurality of quantities representing successive values of said timing with a quantity representing altitude to produce a maneuver alarm.

7. Apparatus according to claim 6 in which the means for transmitting spaced pulses and the means for eliminating received signals are controlled by a barometric pressure device and the quantity representing altitude used to produce a maneuver alarm is derived from a terrain clearance altimeter device.

8. Apparatus for transmitting and receiving signals in an aircraft for a cooperative collision avoidance system comprising means for periodically transmitting signals coded with pressure altitude data for said aircraft, means for receiving from other aircraft signals which are coded with corresponding altitude data, means for determining the difference between the direct and ground reflected path lengths for said received signals, and means combining a plurality of values representing successive values of said difference with a value representing the terrain clearance altitude of said aircraft for computing a maneuver alarm.

9. Apparatus according to claim 8 in which said value for terrain clearance is obtained by measuring the shortest echo interval of said periodically transmitted signals.

10. Apparatus for a protected aircraft in a cooperative collision avoidance system comprising means for measuring values representative of the range to other aircraft within a predetermined altitude zone relative to said protected aircraft, means for separating and storing measured range values for each of said other aircraft, means for combining a plurality of stored values for each of said other aircraft representing successive values of range to each aircraft to compute the approximate time to nearest approach to the respective other aircraft, and means for initiating a maneuver alarm for any of said approximate time values less than a predetermined minimum value.

11. In a collision avoidance system means in a protected aircraft for deriving range values to a plurality of other aircraft within an altitude danger zone, means for identifying said range values with indicia individual to said other aircraft, buffer storage means for said range values from a plurality of said other aircraft, a plurality of active storage channels each capable of storing a plurality of said range values, means for transferring said range values in buffer storage to storage in respective ones of said active channels in accordance with said indicia, and means responsive to the accumulation in any active channel of a predetermined plurality of range values of the same indicia for computing a maneuver alarm.

12. Apparatus according to claim 11 including means responsive to the arrival of new data in said active channels for precessing stored data therein and the discard of the oldest range value in excess of said predeterminted plurality.

13. In a collision avoidance system means in a protected aircraft for receiving altitude data from other aircraft within an altitude danger zone together with direct and ground reflected signals for the determination of range to said other aircraft, means for identifying said range values with indicia individual to said other aircraft, means for sorting and separately storing said range values from said other aircraft, means for computing the threat of collision for a fixed plurality of said range values from any one of said other aircraft, and means for up-dating said stored range values as subsequent measurements are received and discarding the oldest range value in excess of said fixed plurality.

14. In a collision avoidance system means in a protected aircraft for transmitting timed pulse bursts with the pulses spaced in accordance with the altitude of said protected aircraft, means for receiving similar signals from other aircraft at corresponding altitudes, means for determining the difference between the direct and ground reflected path lengths for said received signals, buffer storage means for storing words representing said path length difference for a plurality of said other aircraft together with a time indicia established by the time of arrival of said similar signals relative to said transmitted timed pulse bursts, a plurality of active channels each capable of storing a plurality of said path length words, means for transferring words in said buffer storage to respective active channels in accordance with said indicia, means responsive to the accumulation of a predetermined number of said words in any active channel for computing a quantity related to the time of nearest approach to the respective other aircraft, means for precessing data in said active channels upon the arrival of a new entry and discarding the oldest word in excess of said predetermined number, and maneuver alarm means responsive to said quantity corresponding to a time to nearest approach less than a fixed value.

15. Apparatus according to claim 14 and including means for comparing the word in buffer storage with a predetermined minimum range value, and means for initiating said maneuver alarm if the range represetned by said word is less than said minimum range value.

References Cited in the file of this patent

UNITED STATES PATENTS

| | | |
|---|---|---|
| 2,533,889 | Keizer | Dec. 12, 1950 |
| 2,554,893 | Brunn | May 29, 1951 |
| 2,837,738 | Valkenburgh | June 3, 1958 |
| 2,860,334 | Cowdery et al. | Nov. 11, 1958 |
| 3,097,354 | Blowney et al. | July 9, 1963 |
| 3,114,145 | Vielle et al. | Dec. 10, 1963 |

FOREIGN PATENTS

| | | |
|---|---|---|
| 835,185 | Great Britain | May 18, 1960 |

OTHER REFERENCES

"Radar Offers Solution to Midair Plane Collisions," by J. Q. Brantley, Electronics, November 1954, pp. 146–150.

"Research and Development on Aircraft Proximity Warning and Collision Avoidance Techniques," Bendix Radio, April 30, 1958, pp. 66–70.

"Anti-Collision Device Tests Promising," by P. J. Klass. Aviation Week, vol. 69, No. 1, Sept. 1, 1958.

"Anti-Collision System Appears Promising," by P. J. Klass. Aviation Week, vol. 72, No. 7, Feb. 15, 1960, pp. 67, 69, 71 and 75.